(12) United States Patent
Packard et al.

(10) Patent No.: US 8,768,240 B2
(45) Date of Patent: Jul. 1, 2014

(54) SYSTEMS AND METHODS FOR PRODUCING, DELIVERING AND MANAGING EDUCATIONAL MATERIAL

(75) Inventors: Ronald Jay Packard, McLean, VA (US); Benjamin Patrick Graff, Reston, VA (US); Adam Paul, Lovettsville, VA (US); Bror Valdemar Haug Saxberg, McLean, VA (US)

(73) Assignee: K12 Inc., Herndon, VA (US)

( * ) Notice: Subject to any disclaimer, the term of this patent is extended or adjusted under 35 U.S.C. 154(b) by 943 days.

(21) Appl. No.: 12/541,513

(22) Filed: Aug. 14, 2009

(65) Prior Publication Data

US 2011/0039248 A1    Feb. 17, 2011

(51) Int. Cl.
*G09B 7/00*    (2006.01)

(52) U.S. Cl.
USPC .......................................... 434/362

(58) Field of Classification Search
CPC .............. G09B 7/00; G09B 5/12; G09B 3/00; G06Q 90/00; G06F 3/01
USPC .................................. 434/322, 323, 350–365
See application file for complete search history.

(56) References Cited

U.S. PATENT DOCUMENTS

| | | |
|---|---|---|
| 3,405,457 A | 10/1968 | Bitzer |
| 4,804,328 A | 2/1989 | Barrabee |
| 5,002,491 A | 3/1991 | Abrahamson et al. |
| 5,010,495 A | 4/1991 | Willetts |
| 5,203,705 A | 4/1993 | Hardy et al. |
| 5,204,813 A | 4/1993 | Samph et al. |
| 5,310,349 A | 5/1994 | Daniels et al. |
| 5,318,450 A | 6/1994 | Carver |
| 5,385,475 A | 1/1995 | Sudman et al. |
| 5,437,555 A | 8/1995 | Ziv-El |
| 5,584,699 A | 12/1996 | Silver |
| 5,597,312 A | 1/1997 | Bloom et al. |
| 5,602,982 A | 2/1997 | Judd et al. |
| 5,692,906 A | 12/1997 | Corder |
| 5,721,827 A | 2/1998 | Logan et al. |
| 5,727,950 A | 3/1998 | Cook et al. |
| 5,788,504 A | 8/1998 | Rice et al. |
| 5,810,605 A | 9/1998 | Siefert |
| 5,823,788 A | 10/1998 | Lemelson et al. |

(Continued)

OTHER PUBLICATIONS

International Search Report and Written Opinion for PCT/US10/45453, mailed on Apr. 14, 2011, 20 pages.

(Continued)

*Primary Examiner* — Robert J Utama
*Assistant Examiner* — Sadaruz Zaman
(74) *Attorney, Agent, or Firm* — Cooley LLP

(57) ABSTRACT

A method includes arranging a plurality of learning objectives to define a learning objective sequence of an educational material. Each learning objective from the plurality of learning objectives is associated with a content including at least one of a learning object, an assessment or a teaching strategy item. A temporal content is inserted into the learning objective sequence at a position within the learning objective sequence based on a time associated with the presentation of the temporal content to a user. The time can include, for example, a date of a holiday, a number of times the user has logged in, or the like. An educational material including the content associated with each learning objective from the plurality of learning objectives and the temporal content is produced. The content and the temporal content are arranged to define at least one learning path within the learning objective sequence.

21 Claims, 21 Drawing Sheets

(56) References Cited

U.S. PATENT DOCUMENTS

| | | | |
|---|---|---|---|
| 5,829,983 A | 11/1998 | Koyama et al. | |
| 5,870,731 A | 2/1999 | Trif et al. | |
| 5,904,485 A | 5/1999 | Siefert | |
| 5,907,831 A | 5/1999 | Lotvin et al. | |
| 5,915,973 A | 6/1999 | Hoehn-Saric et al. | |
| 5,957,699 A | 9/1999 | Peterson et al. | |
| 5,967,793 A | 10/1999 | Ho et al. | |
| 5,974,446 A | 10/1999 | Sonnenreich et al. | |
| 6,002,915 A | 12/1999 | Shimizu | |
| 6,017,219 A | 1/2000 | Adams, Jr. et al. | |
| 6,022,221 A | 2/2000 | Boon | |
| 6,039,575 A | 3/2000 | L'Allier et al. | |
| 6,064,856 A | 5/2000 | Lee et al. | |
| 6,077,085 A | 6/2000 | Parry et al. | |
| 6,118,973 A | 9/2000 | Ho et al. | |
| 6,141,528 A | 10/2000 | Remschel | |
| 6,146,148 A | 11/2000 | Stuppy | |
| 6,149,438 A | 11/2000 | Richard et al. | |
| 6,149,441 A * | 11/2000 | Pellegrino et al. | 434/350 |
| 6,164,975 A | 12/2000 | Weingarden et al. | |
| 6,186,794 B1 | 2/2001 | Brown et al. | |
| 6,234,802 B1 | 5/2001 | Pella et al. | |
| 6,267,601 B1 | 7/2001 | Jongsma et al. | |
| 6,285,993 B1 | 9/2001 | Ferrell | |
| 6,289,382 B1 | 9/2001 | Bowman-Amuah | |
| 6,293,801 B1 | 9/2001 | Jenkins et al. | |
| 6,301,462 B1 | 10/2001 | Freeman et al. | |
| 6,302,698 B1 | 10/2001 | Ziv-El | |
| 6,322,366 B1 | 11/2001 | Bergan et al. | |
| 6,325,632 B1 | 12/2001 | Chao et al. | |
| 6,347,333 B2 | 2/2002 | Eisendrath et al. | |
| 6,347,943 B1 | 2/2002 | Fields et al. | |
| 6,353,447 B1 | 3/2002 | Truluck et al. | |
| 6,358,053 B1 | 3/2002 | Rosenfield et al. | |
| 6,381,444 B1 | 4/2002 | Aggarwal et al. | |
| 6,397,036 B1 | 5/2002 | Thean et al. | |
| 6,449,627 B1 | 9/2002 | Baer et al. | |
| 6,470,171 B1 | 10/2002 | Helmick et al. | |
| 6,496,681 B1 | 12/2002 | Linton | |
| 6,505,031 B1 | 1/2003 | Slider et al. | |
| 6,507,726 B1 | 1/2003 | Atkinson et al. | |
| 6,533,583 B1 | 3/2003 | Sportelli | |
| 6,554,618 B1 | 4/2003 | Lockwood | |
| 6,587,831 B1 | 7/2003 | O'Brien | |
| 6,622,003 B1 | 9/2003 | Denious et al. | |
| 6,626,679 B2 | 9/2003 | Skeans et al. | |
| 6,633,742 B1 | 10/2003 | Turner et al. | |
| 6,643,493 B2 | 11/2003 | Kilgore | |
| 6,652,283 B1 | 11/2003 | Van Schaack et al. | |
| 6,652,287 B1 | 11/2003 | Strub et al. | |
| 6,663,392 B2 | 12/2003 | Leyva et al. | |
| 6,688,889 B2 | 2/2004 | Wallace et al. | |
| 6,704,541 B1 | 3/2004 | Ciarallo et al. | |
| 6,704,741 B1 | 3/2004 | Lively, Jr. | |
| 6,711,378 B2 | 3/2004 | Kashima | |
| 6,712,615 B2 | 3/2004 | Martin | |
| 6,729,885 B2 | 5/2004 | Stuppy et al. | |
| 6,755,657 B1 | 6/2004 | Wasowicz | |
| 6,755,659 B2 | 6/2004 | LoSasso et al. | |
| 6,775,518 B2 | 8/2004 | Norcott et al. | |
| 6,782,396 B2 | 8/2004 | Greene et al. | |
| 6,789,047 B1 | 9/2004 | Woodson | |
| 6,790,045 B1 | 9/2004 | Drimmer | |
| 6,801,751 B1 | 10/2004 | Wood et al. | |
| 6,813,474 B2 | 11/2004 | Robinson et al. | |
| 6,865,368 B2 | 3/2005 | Hoyashita et al. | |
| 6,871,043 B2 | 3/2005 | Sanda | |
| 6,884,074 B2 | 4/2005 | Theilmann | |
| 6,898,411 B2 | 5/2005 | Ziv-el et al. | |
| 6,905,341 B1 | 6/2005 | Whitaker et al. | |
| 6,909,874 B2 | 6/2005 | Holtz et al. | |
| 6,928,260 B2 | 8/2005 | Betz et al. | |
| 6,944,596 B1 | 9/2005 | Gray et al. | |
| 6,965,751 B2 | 11/2005 | Koga et al. | |
| 6,965,752 B2 | 11/2005 | Allen et al. | |
| 6,966,780 B2 | 11/2005 | Perry | |
| 6,976,031 B1 * | 12/2005 | Toupal et al. | 1/1 |
| 6,978,115 B2 | 12/2005 | Whitehurst et al. | |
| 6,988,138 B1 | 1/2006 | Alcorn et al. | |
| 6,996,366 B2 | 2/2006 | L'Allier et al. | |
| 6,999,954 B2 | 2/2006 | Taggart et al. | |
| 7,007,034 B1 | 2/2006 | Hartman, Jr. et al. | |
| 7,029,280 B2 | 4/2006 | Krebs et al. | |
| 7,043,193 B1 | 5/2006 | Vashi et al. | |
| 7,050,753 B2 | 5/2006 | Knutson | |
| 7,052,277 B2 | 5/2006 | Kellman | |
| 7,137,821 B2 | 11/2006 | Jorgensen et al. | |
| 7,149,468 B2 | 12/2006 | Patz et al. | |
| 7,153,140 B2 | 12/2006 | Ivanir et al. | |
| 7,210,938 B2 | 5/2007 | Packard et al. | |
| 7,260,355 B2 | 8/2007 | L'Allier et al. | |
| 7,264,475 B1 | 9/2007 | Eck et al. | |
| 7,286,793 B1 | 10/2007 | Miele | |
| RE39,942 E | 12/2007 | Fai et al. | |
| 7,357,640 B2 | 4/2008 | Berman | |
| 7,362,997 B2 | 4/2008 | Hartenberger | |
| 7,369,808 B2 | 5/2008 | Wessner et al. | |
| 7,664,784 B2 * | 2/2010 | Venkatesan et al. | 707/627 |
| 7,882,041 B2 | 2/2011 | Gibbons et al. | |
| 7,927,105 B2 | 4/2011 | Griffin et al. | |
| 7,974,569 B2 | 7/2011 | Mansfield et al. | |
| 8,175,511 B1 | 5/2012 | Sordo et al. | |
| 2001/0003828 A1 | 6/2001 | Peterson et al. | |
| 2001/0018178 A1 | 8/2001 | Siefert | |
| 2001/0023059 A1 | 9/2001 | Toki | |
| 2001/0032105 A1 | 10/2001 | Frye et al. | |
| 2001/0039594 A1 | 11/2001 | Park et al. | |
| 2001/0041330 A1 | 11/2001 | Brown et al. | |
| 2001/0044728 A1 | 11/2001 | Freeman et al. | |
| 2001/0049087 A1 | 12/2001 | Hale | |
| 2002/0106615 A1 | 8/2002 | Murray et al. | |
| 2002/0164564 A1 | 11/2002 | Fretwell, Jr. | |
| 2002/0173971 A1 | 11/2002 | Stirpe et al. | |
| 2002/0188583 A1 | 12/2002 | Rukavina et al. | |
| 2002/0194584 A1 | 12/2002 | Suorsa et al. | |
| 2003/0017442 A1 | 1/2003 | Tudor et al. | |
| 2003/0049593 A1 | 3/2003 | Parmer et al. | |
| 2003/0064354 A1 | 4/2003 | Lewis | |
| 2003/0077559 A1 | 4/2003 | Braunberger et al. | |
| 2003/0165800 A1 | 9/2003 | Shaw et al. | |
| 2003/0186200 A1 | 10/2003 | Selix | |
| 2003/0232317 A1 | 12/2003 | Patz | |
| 2004/0009462 A1 * | 1/2004 | McElwrath | 434/350 |
| 2004/0014016 A1 | 1/2004 | Popeck et al. | |
| 2004/0018479 A1 | 1/2004 | Pritchard et al. | |
| 2004/0023191 A1 | 2/2004 | Brown et al. | |
| 2004/0024569 A1 | 2/2004 | Camillo | |
| 2004/0030781 A1 | 2/2004 | Etesse et al. | |
| 2004/0076941 A1 | 4/2004 | Cunningham et al. | |
| 2004/0091848 A1 * | 5/2004 | Nemitz | 434/365 |
| 2004/0115597 A1 | 6/2004 | Butt | |
| 2004/0126750 A1 * | 7/2004 | Theilmann et al. | 434/362 |
| 2004/0153508 A1 | 8/2004 | Alcorn et al. | |
| 2004/0214152 A1 | 10/2004 | Hoyashita et al. | |
| 2004/0219493 A1 | 11/2004 | Phillips | |
| 2004/0259067 A1 | 12/2004 | Cody et al. | |
| 2005/0084829 A1 | 4/2005 | Peters | |
| 2005/0086296 A1 | 4/2005 | Chi et al. | |
| 2005/0108030 A1 | 5/2005 | Kim | |
| 2006/0026213 A1 | 2/2006 | Yaskin et al. | |
| 2006/0068367 A1 | 3/2006 | Parke et al. | |
| 2006/0099561 A1 | 5/2006 | Griph | |
| 2006/0166174 A1 | 7/2006 | Rowe et al. | |
| 2006/0252023 A1 | 11/2006 | Cui | |
| 2006/0259351 A1 | 11/2006 | Yaskin et al. | |
| 2007/0143751 A1 | 6/2007 | Butler et al. | |
| 2007/0172809 A1 | 7/2007 | Gupta | |
| 2007/0184424 A1 | 8/2007 | Packard et al. | |
| 2007/0184425 A1 | 8/2007 | Packard et al. | |
| 2007/0184426 A1 | 8/2007 | Packard et al. | |
| 2007/0184427 A1 | 8/2007 | Packard et al. | |
| 2007/0196807 A1 * | 8/2007 | Packard et al. | 434/350 |
| 2008/0050715 A1 * | 2/2008 | Golczewski et al. | 434/350 |
| 2008/0057480 A1 | 3/2008 | Packard et al. | |

(56) References Cited

U.S. PATENT DOCUMENTS

| | | |
|---|---|---|
| 2008/0059484 A1 | 3/2008 | Packard et al. |
| 2008/0182232 A1 | 7/2008 | Bannwolf et al. |
| 2009/0018986 A1 | 1/2009 | Alcorn et al. |
| 2009/0182716 A1 | 7/2009 | Everhart et al. |
| 2009/0197234 A1 | 8/2009 | Creamer et al. |
| 2010/0009330 A1 | 1/2010 | Yaskin |
| 2010/0028847 A1 | 2/2010 | Downing |
| 2010/0041008 A1 | 2/2010 | Perez et al. |
| 2010/0081120 A1* | 4/2010 | Nanjiani et al. ............ 434/322 |
| 2010/0145729 A1 | 6/2010 | Katz |
| 2011/0010306 A1 | 1/2011 | Gonzalez et al. |
| 2011/0039242 A1 | 2/2011 | Packard et al. |
| 2011/0039244 A1 | 2/2011 | Packard et al. |
| 2011/0039245 A1 | 2/2011 | Packard et al. |
| 2011/0039246 A1 | 2/2011 | Packard et al. |
| 2011/0039247 A1 | 2/2011 | Packard et al. |
| 2011/0039249 A1 | 2/2011 | Packard et al. |
| 2011/0055100 A1 | 3/2011 | Perreault et al. |
| 2011/0065082 A1 | 3/2011 | Gal et al. |
| 2011/0177483 A1 | 7/2011 | Needham et al. |
| 2012/0022906 A1 | 1/2012 | Snyder et al. |
| 2012/0028230 A1 | 2/2012 | Devereux |
| 2012/0040326 A1 | 2/2012 | Larson-Rutter et al. |

OTHER PUBLICATIONS

"Towards Intelligent Learning Management Systems," AIED Workshop, Jul. 20, 2003.

Santos, Lara, "Adaptability Support in a Learning Management System," DI-FCUL TR-09-06, Mar. 2009.

Wayman et al., "Software Enabling School Improvement Through Analysis of Student Data," Report No. 67, Jan. 2004.

Non-Final Office Action for U.S. Appl. No. 12/541,276, mailed Feb. 24, 2012.

Non-Final Office Action for U.S. Appl. No. 12/541,469, mailed Dec. 29, 2011.

Non-Final Office Action for U.S. Appl. No. 12/541,501, mailed Dec. 21, 2011.

Non-Final Office Action for U.S. Appl. No. 12/541,507, mailed Feb. 14, 2012.

Non-Final Office Action for U.S. Appl. No. 12/541,522, mailed Dec. 22, 2011.

Non-Final Office Action for U.S. Appl. No. 12/541,517, mailed Feb. 1, 2012.

* cited by examiner

SYSTEMS AND METHODS FOR PRODUCING, DELIVERING AND MANAGING EDUCATIONAL MATERIAL

CROSS-REFERENCE TO RELATED APPLICATIONS

This application is related to U.S. patent application Nos. 12/541,276, 12/541,469, 12/541,501, 12/541,507, 12/541,522 and 12/541,517, each entitled "Systems and Methods for Producing, Delivering and Managing Educational Material," each filed on Aug. 14, 2009, each of which is incorporated herein by reference in its entirety.

BACKGROUND

This invention relates to systems and methods for producing and delivering educational material, and more particularly, to systems and methods of virtual schooling.

Some known systems allow for authoring of educational material via a computerized system by allowing the author to select specific lessons or educational objects (videos, lectures, etc.) from a database. Such known systems, however, require that the author select each item independently and manually sequence the items. Accordingly, authoring educational material using such known systems can be cumbersome, time consuming, and labor intensive. Moreover, such known systems do not provide any mechanism to ensure that the resulting educational material complies with standards and/or other learning objectives. Accordingly, in such known systems, the author often reviews the course manually to ensure compliance with standards and/or learning objectives.

Further, educational material produced using such known systems is generally not tailored to an individual student's needs. Moreover, such known systems and methods are not conducive to updating the educational material based on controlled experiments, student experience, to include different aesthetic characteristics (i.e., "skins"), to accommodate different capabilities of various computer systems through which the educational material is delivered or the like.

Thus, a need exists for improved systems and methods for producing and/or delivering educational material. Additionally, a need exists for systems and methods for ensuring that educational material complies with standards and/or other learning objectives. Further, a need exists for systems and methods for producing and/or delivering educational material customized to accommodate an individual student's needs, the capabilities of the delivery platform or the like.

SUMMARY

In some embodiments, a method includes arranging a plurality of learning objectives to define a learning objective sequence of an educational material. Each learning objective from the plurality of learning objectives is associated with a content including at least one of a learning object, an assessment or a teaching strategy item. A temporal content is inserted into the learning objective sequence at a position within the learning objective sequence based on a time associated with the presentation of the temporal content to a user. The time can include, for example, a date of a holiday, a number of times the user has logged in, or the like. An educational material including the content associated with each learning objective from the plurality of learning objectives and the temporal content is produced. The content and the temporal content are arranged to define at least one learning path within the learning objective sequence.

DETAILED DESCRIPTION

Figure 1:
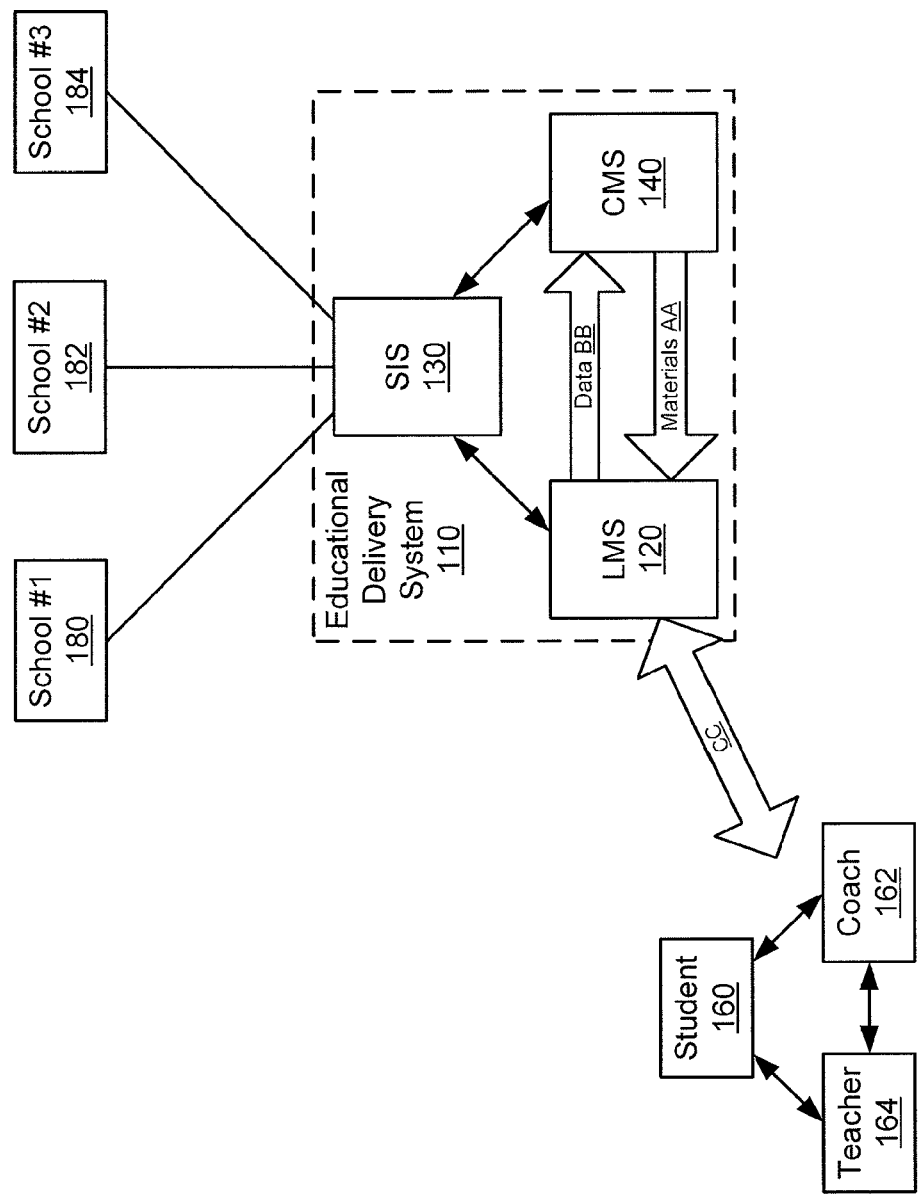
FIG. 1 is a schematic block diagram of an educational delivery system, according to an embodiment.

Systems and methods for producing and delivering educational material are described herein. In some embodiments, for example, a method includes selecting a subset of learning objectives from a plurality of learning objectives. Each learning objective from the plurality of learning objectives is associated with a content including at least one of a learning object, an assessment or a teaching strategy item. The subset of learning objectives is arranged to define a learning objective sequence. An educational material including the content associated with each learning objective from the subset of learning objectives is produced. The content is arranged to define at least one learning path within the learning objective sequence.

As used herein the term "educational material" refers to any item, product, collection of information, database, website, learning object (e.g., course, learning activity, learning module, unit), assessment, assessment item and/or the like associated with learning that is produced, delivered and/or managed by the educational delivery systems and methods disclosed herein. Educational material can include, for example, an elementary school course covering a particular topic (e.g., fourth grade math). In other embodiments, educational material can include the components included within the course, such as, for example, assessment tests, lesson plans, educational activities, text books, audio files, videos, pictures, graphs, physical supplies or the like. Educational material can include, for example, remedial programs configured to help students overcome deficiencies in specific skills, abilities and/or knowledge. One example of such a remedial program is a collection of content to help a student master fractions. Such content, all of which is considered as "educational material" can include, for example, practice worksheets, assessment tests, physical manipulatives or the like.

In some embodiments, educational material can include educational games (e.g., computer games, physical games or the like). In such embodiments, the educational games can include audio, visual and/or tactile components. In some embodiments, educational material can include seminars. In some embodiments, educational material can include test preparation programs (e.g., preparation programs for the SAT, LSAT, ACT, GMAT, GRE, etc.) and the components that make up such programs. In some embodiments, educational material can include supplemental educational services, enrichment education, tutorials and/or the like. In some embodiments, educational material can include therapeutic material designed to enhance and improve a student's ability to learn. For example, educational material can include a visual therapy game that links eye exercises with reading exercises to help children overcome dyslexia.

In some embodiments, each learning objective from the subset of learning objectives is associated with at least one other learning objective from the subset of learning objectives. Such an association allows the learning objective sequence to be automatically defined. In some embodiments, each learning objective from the subset of learning objectives is associated with a standard and/or a learning philosophy item (e.g., a research result or the like). In such embodiments, the method can optionally include producing a report summarizing the degree to which the educational material satisfies the standard and/or learning philosophy. In such a manner, a course developer can automatically develop educational material that satisfies one or more standards and/or learning philosophy items.

In some embodiments, a method includes receiving a first datum associated with a student's knowledge of a first learning objective and a second datum associated with a profile of the student, a request by the student and/or the student's knowledge of a second learning objective associated with the first learning objective. The first datum can be, for example, the student's score on assessment items related to the first learning objective. A subset of educational content from a plurality of educational content associated with the first learning objective is selected based on the first datum and the second datum. The subset of educational content includes at least one of a learning object, and assessment or a teaching strategy item. An educational material including the subset of educational content is produced. The subset of educational content is arranged to define a learning path associated with the student.

In such embodiments, the educational content can be dynamically tailored and/or adapted to a particular student's needs. For example, in some embodiments, the first datum can be associated with a student's lack of understanding of fourth grade fractions and the second datum can be that the student is a visual learner. Accordingly, educational content designed to help a visual learner understand fourth grade fractions can be delivered to the student. In other embodiments, any number of factors, including comparison to like students who have previously encountered this sequence, can be used to determine the subset of educational content.

In some embodiments, a method includes identifying at least one learning objective from a plurality of learning objectives associated with an educational material. A subset of assessment items from a plurality of assessment items is selected. Each assessment item from the plurality of assessment items is associated with the at least one learning objective. The selecting is performed based on at least one of a type of assessment item, a format of assessment item or a difficulty of assessment item. An assessment including the subset of assessment items is produced.

In such embodiments, an assessment can be dynamically produced for a student. As such, each time a student takes an assessment for a particular topic, the questions on the assessment and/or the order in which the questions are presented can be different. Additionally, the assessment can be tailored to a particular student's needs, to test for particular areas of weakness, to address common misconceptions or the like. Further, in some embodiments, each assessment item of a dynamically delivered assessment can be delivered to the student in response to a previously completed assessment item. Accordingly, a student's skill level can be accurately determined. In some embodiments, the subset of assessment items can be associated with one or more standards and/or learning philosophies. In such embodiments, an assessment that satisfies one or more standards and/or learning philosophies can be automatically developed.

In some embodiments, a method includes arranging a plurality of learning objectives to define a learning objective sequence of an educational material. Each learning objective from the plurality of learning objectives is associated with a content including at least one of a learning object, an assessment or a teaching strategy item. A temporal content is inserted into the learning objective sequence at a position within the learning objective sequence based on a time associated with the presentation of the temporal content to a user. The time can include, for example, a date of a holiday, a number of times the user has logged in, or the like. An educational material including the content associated with each learning objective from the plurality of learning objectives and the temporal content is produced. The content and the temporal content are arranged to define at least one learning path within the learning objective sequence.

In some embodiments, a method of publishing an educational material includes receiving a first datum associated with a plurality of functional characteristics associated with a content of an educational material. A second datum associated with a capability of a delivery system to execute the plurality of functional characteristics associated with the content is received. A third datum (e.g., a validation report) associated with a difference between the plurality of functional characteristics associated with the content and the capability of the delivery system is produced. The educational material is then produced based on the third datum such that a plurality of functional characteristics associated with the resulting educational material corresponds to the capability of the delivery system. In some embodiments, the method optionally includes amending the content such that at least one functional characteristic from the plurality of functional characteristics associated with the content is suppressed.

In some embodiments, a computer system for delivering an educational material includes a delivery engine, a feedback engine and a notification engine. The delivery engine is configured to deliver to a student a portion of the educational material, including the content arranged to define a set of learning paths associated with a learning objective. The portion of the educational material includes a subset of the content associated with a subset of the set of learning paths. The feedback engine is configured to receive a datum associated with a number learning paths within the subset of the set of learning paths. Said another way, the datum represents the number of learning paths received by a student. The notification engine is configured to produce a notification in response to the datum.

In some embodiments, a method of administering a pilot test of educational material using the systems described herein includes receiving data associated with a characteristic of a set of students from an educational delivery system. The characteristic can include, for example, a demographic characteristic, a geographical location, a score of an assessment associated with a learning objective from the plurality of learning objectives, a time to complete the assessment, a number of attempts to complete the assessment and/or an indicator of knowledge of the learning objective based on prior educational experience. A first group of students and a second group of students are automatically selected from the set of students based on the data such that first group of students is substantially identical to the second group of students. A first educational material is delivered to the first group of students. The first educational material includes a first content associated with a set of learning objectives, which is arranged to define at least a first learning path. A second educational material is delivered to the second group of students. The second educational material includes a second content associated with the set of learning objectives, which is arranged to define at least a second learning path.

FIG. 1 is a schematic block diagram of an educational delivery system 110, according to an embodiment. The educational delivery system includes a content management system (CMS) 140, a learning management system (LMS) 120 and a student information system (SIS) 130. As described in detail herein, the CMS 140 is a system that facilitates the production, development, management and revision of educational material. The CMS 140 produces, manages, updates, stores and/or revises educational material. As shown by the arrow AA in FIG. 1, the educational material is conveyed to the LMS 120 for delivery to a student 160, a teacher 164 and/or a learning coach 162 (e.g., a parent or guardian).

In some embodiments, for example, the CMS 140 stores, includes and/or references items related to the production of educational material such as standards (e.g., state educational standards), educational research, resources and/or assessment items. As described in more detail herein, the CMS 140 allows a course developer to use standards, educational research, resources and/or assessment items to build, produce, update and/or revise educational material. In some embodiments, for example, a course developer can assemble resources and/or assessment items associated with standards and/or educational research to develop an educational course.

As described in more detail herein, having standards and educational research within and/or accessible by the CMS 140 allows the CMS 140 to produce, develop, manage and/or revise educational material that is associated with a body of research and/or any number of different sets of learning standards (e.g., state learning standards). Additionally, this arrangement allows the CMS 140 to produce, develop, manage and/or revise educational material according to a research-based philosophy of learning rather than simply producing educational material corresponding to one or more particular standards. For example, the CMS 140 can produce develop, manage and/or revise a fourth grade math course that includes learning activities tailored to include methods of learning based on educational research. As described in more detail herein, because the educational material can also be associated with any number of different standards, the CMS 140 can map the fourth grade math course to any number of standards to demonstrate compliance with the standards.

As described in further detail herein, in some embodiments, educational research, student feedback, test results or the like can be received and/or compiled by the LMS 120 and conveyed the CMS 140, as shown by the arrow BB in FIG. 1. This provides the CMS 140 with feedback from the LMS 120 related to the effectiveness of various types of learning objects, assessments, and/or other educational material. In some embodiments, the CMS 140 can also receive educational research data from the SIS 130. In such embodiments, for example, the CMS 140 can receive attendance statistics from the SIS 130 that correspond to test scores received from the LMS 120. The CMS 140 can use this research to update educational research, learning objects, and/or assessments, as described in further detail herein. By receiving such data, the CMS 140 can dynamically revise the educational material produced to maintain compliance with changing standards to be tailored for a particular student or the like.

The LMS 120 is a computer-based system that facilitates the delivery of educational material produced and/or developed by the CMS 140. As shown by the arrow CC in FIG. 1, the LMS 120 delivers educational material to an end-user, such as a student 160, a teacher 164 and/or a learning coach 162 (e.g., a parent). In other embodiments, an end-user can also include a school administrator, such as, for example, a principal.

In some embodiments, a "three-body" model for learning is used in conjunction with the educational delivery system 110. The "three-body" model includes the student 160, the teacher 164 and the learning coach 162 each having a different role. In some embodiments, for example, the student 160, the teacher 164 and the learning coach 162 interact with the LMS 120 and with each other in different ways. Such a "three-body" model can be used to effectively include learning coaches as well as teachers in the education of a student to provide more hands-on education, to improve educational efficiency, or the like. The roles of the different end-users are similar to the roles described in U.S. Pat. No. 7,210,938 entitled "System and Method of Virtual Schooling," which is incorporated herein by reference in its entirety.

In some embodiments, a student 160 can use the LMS 120 to participate in and/or receive a lesson, a learning activity, an assessment, and/or the like. In such embodiments, the student 160 might not be able to access portions of LMS 120 intended for the learning coach 162 and/or the teacher 164. For example, notes and/or teaching strategies available to the learning coach 162 and/or the teacher 164 (e.g., teacher's manuals, answer keys for assessments) might not be available to the student 160. In some embodiments, the student 160 can access the LMS 120 to perform administrative actions such as, for example, review progress, select courses and/or the like. In such embodiments, administrative actions intended for the learning coach 162 and/or the teacher 164, such as, for example, entering attendance, might not be available to the student 160.

Similarly, in some embodiments, the learning coach 162 can use the LMS 120 to review materials needed for the day, view the progress of the student 160, view teaching strategies and/or the like. In such embodiments, the learning coach 162 might not be able to access portions of the LMS 120 intended for the teacher 164, such as, for example, grading, changing a course, and/or the like. Similarly, the teacher 164 can use LMS 120 to perform various tasks related to their role as a teacher. In some embodiments, the teacher 164 can access substantially all the information in LMS 120 that is accessible by the student 160 and the learning coach 162, as well as access other functions specific to the teacher (e.g., grading).

In some embodiments, the LMS 120 can include, for example, a graphical user interface (GUI) that delivers the educational material to the end-user. In some embodiments, for example, a learning object can be developed by the CMS 140 and presented to the end-user via the GUI of the LMS 120. In such embodiments, the LMS 120 can deliver text, pictures, videos, Flash animation, audio and/or the like to the end-user via the GUI.

In some embodiments, the LMS 120 can also manage the delivery of tangible and/or physical educational materials. In such embodiments, for example, the LMS 120 can manage the delivery of text books, lab supplies, manipulatives, workbooks, letters, report cards, and/or the like to the student 160, the learning coach 162, and/or the teacher 164. In such embodiments, the LMS 120 ensures that the student 160, the learning coach 162 and/or the teacher 164 have the educational materials needed to perform their role during the educational process. For example, the LMS 120 can track the shipping of physical materials to the student 160, the learning coach 162, and/or the teacher 164 and/or provide a shopping list to the student 160, the learning coach 162, and/or the teacher 164 that specifies the items used in the upcoming lessons in the course.

In some embodiments, the LMS 120 is configured to be used in a hybrid learning environment similar to the hybrid learning environments shown and described in U.S. patent application Ser. No. 11/850,199 entitled "Multimedia System and Method for Teaching in a Hybrid Learning Environment," filed on Sep. 5, 2007, which is incorporated herein by reference in its entirety. In such embodiments, a student 160 can receive a portion of a course in a traditional classroom and another portion of the course at a location remote from the traditional classroom, via, for example, the GUI of the LMS 120. In such embodiments, the LMS 120 can be used to deliver a portion of the course to the student 160 and the teacher 164 can deliver a portion of the course to the student 160. In other embodiments, the teacher and the GUI of the LMS can cooperatively deliver the educational material to the student.

The LMS 120 also receives data from the student 160, the teacher 164 and/or the learning coach 162. As described herein, the data received by the LMS 120 can be used in conjunction with the CMS 140 to tailor the delivery of the educational material to the student 160, the teacher 164 and/or the learning coach 162. Similarly stated, the LMS 120 can deliver educational material in response to data and/or indications received from the student 160, the teacher 164 and/or the learning coach 162. Similarly stated, the educational material can be adapted for a particular student 160 based on the data.

In some embodiments, the data received by the LMS 120 from the student 160, the teacher 164 and/or the learning coach 162 can include an indication that a learning activity has been completed, an indication that a learning activity has been skipped, an indication of attendance, an indication of the time spent on a learning activity, an indication of the time spent on an assessment, responses to assessment items (e.g., answers to test questions), responses to surveys, an indication that a student 160 has received educational material needed for a learning activity, and/or the like. In some embodiments, the data received by the LMS 120 from the student 160, the teacher 164 and/or the learning coach 162 can include identifying information, such as, for example, demographic information (e.g., age, race, etc.), family information (e.g., number of siblings, education of parents, etc.), location (e.g., address, city, state, country, etc.), program though which the student 160 is enrolled (e.g., home school, state charter school, supplemental education, etc.), contact information (e.g., address, email, phone number, etc.), interests and/or the like.

The SIS 130 is a computer-based system that facilitates the management and/or administration of a school and/or other learning facility. In some embodiments, for example, the SIS 130 can be used to monitor attendance, monitor compliance with standards, monitor the grade level of enrolled students, and/or the like. In some embodiments, the SIS 130 can be used to store and/or monitor personal information instead of and/or in addition to the LMS 120.

As shown in FIG. 1, the SIS 130 can manage multiple schools 180, 182, 184. In some embodiments, the schools 180, 182, 184 can be various types of schools. For example, the first school 180 can be a virtual charter school, the second school 182 can be a home school, and the third school can be a tutoring center. In other embodiments, any type of school can be managed by the SIS 130, such as, for example, an after-school and/or at home supplemental education program, a traditional brick-and-mortar school, a school employing a hybrid learning environment, a company's training institution, an online college and/or the like.

In some embodiments, the student 160, the teacher 164 and/or the learning coach 162 described above can be associated with one or more schools 180, 182, 184. In such embodiments, a school administrator (not shown in FIG. 1) can also be associated with the one or more schools 180, 182, 184. A school administrator can be responsible for the administration of the one or more schools 180, 182, 184. Similarly stated, a school administrator can supervise the teachers 164 associated with the one or more schools 180, 182, 184, deal with discipline problems associated with the students 160 of the one or more schools 180, 182, 184 and/or the like. In other embodiments, the student, the teacher and/or the coach are not associated with a school. In such embodiments, the student can be home schooled, the educational material can be supplemental educational material, and/or the like.

In some embodiments, the SIS 130 includes a graphical user interface (GUI) through which an end-user can interact with the SIS 130. In other embodiments, an end-user can use the GUI of the LMS to interact with the SIS. In such embodiments, the LMS can act as an intermediary between the SIS and the end-user. Additionally, in such embodiments, a school administrator, such as a principal, can have a role as an end-user in the LMS.

Figure 2:
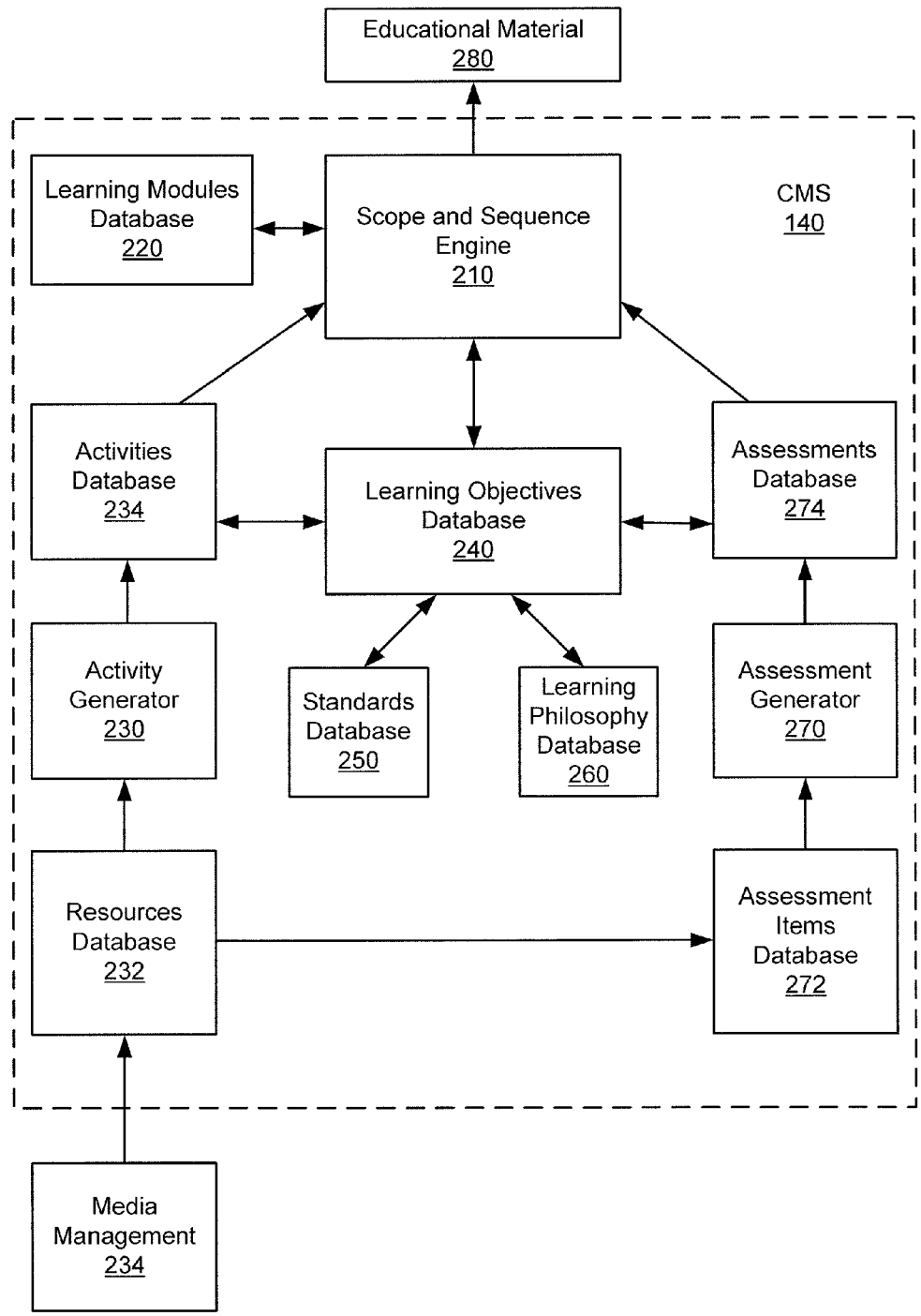
FIG. 2 is a schematic block diagram of a content management system of the educational delivery system of FIG. 1.

FIG. 2 is a schematic block diagram of the content management system (CMS) 140. As described herein, the CMS 140 uses an "objective-centered" approach to producing, developing, managing and/or revising educational material 280. Accordingly, the CMS 140 can produce a wide variety of educational material (e.g., elementary school courses, high school courses, seminars, professional training, etc.) based on a central set of learning objectives. Moreover, the educational material 280 can be produced, developed and/or revised to adhere to any number of different standards, while maintaining a consistent, research-based philosophy of learning. In this manner, the educational material produced by the CMS 140 can present the desired learning outcome in an efficient and/or productive manner.

The CMS 140 includes a learning activity generator 230, an assessment generator 270 and a scope and sequence engine 210. Additionally, the CMS 140 includes and/or has access to a learning objectives database 240, a standards database 250, a learning philosophy database 260, a resources database 232, a learning modules database 220, an activities database 234, an assessments database 274 and an assessment items database 272. The function and characteristics of each of these components is described below. The various databases can be separate databases or portions of one or more shared databases.

Figure 3:
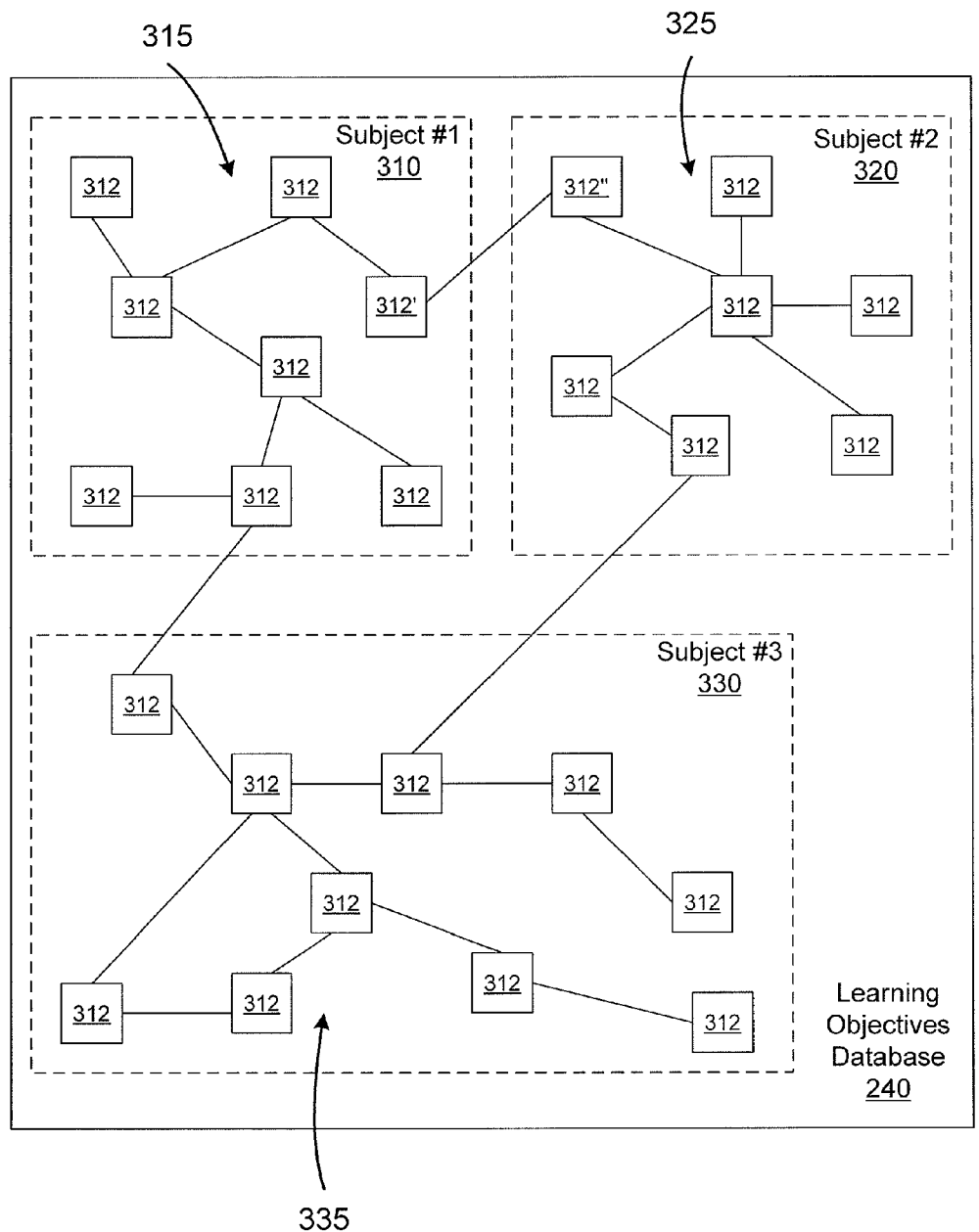
FIG. 3 is a schematic illustration of a learning objectives database of the content management system of FIG. 2.

FIG. 3 is a detailed schematic illustration of a portion of the learning objectives database 240 of the CMS 140. The learning objectives database 240 contains multiple learning objective records 312. Each learning objective record 312 is associated with a measurable learning outcome (e.g., a competency that can be observed and measured). Said another way, each learning objective record 312 is associated with and/or represents a specific measurable skill to be mastered. One example of a measurable learning outcome associated with a learning objective record 312 is "demonstrate an understanding of the associative property of addition." Another example of a measurable learning outcome associated with a learning objective record 312 is "count from one to one hundred out loud."

In some embodiments, a measurable learning outcome can be expressed in a style and/or manner suitable for the intended audience. In some embodiments, for example, a learning objective record 312 can be associated with both a first textual description of the measurable learning outcome for teachers, learning coaches and/or administrators and a second textual description of the measurable learning outcome for students. In such embodiments, the first textual description and the second textual description can be age and/or position appropriate descriptions such that the student, as well as the teacher, learning coach and/or administrator can understand the measurable learning outcome. This allows a measurable learning outcome included with the educational material produced by the CMS 140 (e.g., as a lesson title, learning activity title, etc.) to be displayed to an end-user in a manner appropriate for the end-user. In some embodiments, the measurable learning outcome can be displayed in any appropriate style and/or manner, such as, in multiple different languages, different dialects, a pictorial representation and/or the like.

Each learning objective record 312 includes additional information associated with the measurable learning outcome. In some embodiments, for example, a learning objective record 312 includes information regarding its relation to the source and/or origin of the standard, and/or the research and/or philosophy that underpins the measurable learning outcome. In such embodiments, for example, a learning objective record 312 can be associated with one or more standards and/or learning philosophies from the standards database 250 and/or the learning philosophy database 260, respectively, as described in further detail herein. In some embodiments, each learning objective record 312 can be, for example, linked to a publication that supports the measurable learning outcome, a rational that supports the measurable learning outcome and/or a standard that will be satisfied by the presentation of educational material associated with the standard or mastery of the measurable learning outcome. In some embodiments, a learning objective record 312 includes information regarding the subject with which the measurable learning outcome is associated. In such a manner, the learning objective records 312 can be grouped by subjects, as shown in FIG. 3.

Additionally, in some embodiments, a learning objective record 312 includes information associated with other learning objective records 312 in the learning objectives database 240. In some embodiments, for example, a learning objective record 312 includes one or more prerequisite learning objective records 312. In such embodiments, presentation of educational material associated with a prerequisite learning objective record 312 enables a student to proceed to a learning activity and/or assessment associated with the enabled (or next) learning objective record 312. In some embodiments, multiple prerequisite learning objective records 312 must be fulfilled before a student can proceed to the learning activity and/or assessment associated with the enabled learning objective record 312. In some embodiments, for example, an assessment and/or a learning activity associated with the learning objective record 312 might need to be satisfied before the student is able to take a learning activity and/or an assessment associated with the enabled learning objective record 312. In some embodiments, other learning objective records must also be satisfied before the student can proceed to the more advanced learning activity and/or assessment associated with the enabled learning objective record. Accordingly, in some embodiments, the learning objectives database 240 is sequentially and/or hierarchically arranged and/or organized.

In some embodiments, the organization of the learning objective records 312 can be nonhierarchical. In such embodiments, multiple learning objective records 312 can be related to each other in a nonhierarchical manner. For example, a first concept might not need to be understood before a second concept is taught, but the two concepts might be related to each other. For example, determining an area of a circle might not be a prerequisite to determining the area of a rectangle, and vice versa, but the concepts can be related through a third learning objective record associated with the measurable learning outcome that all enclosed objects have an area.

As shown in FIG. 3, in some embodiments, one or more learning objective records 312 from a first set 315 of learning objective records associated with the first subject 310 (e.g., math) can be associated with one or more learning objective records 312 from a second set 325 of learning objective records associated with a second subject 320 (e.g., music) and/or one or more learning objective records 312 from a third set 335 of learning objective records associated with a third subject 330 (e.g., grammar). For example, FIG. 3 shows a learning objective record 312' associated with the first subject 310 associated with a learning objective record 312" associated with the second subject 320. In this manner, educational material directed towards multiple different subjects can be produced, developed, managed and/or revised in a cooperative manner.

In some embodiments, learning objective records 312 can be linked across various grade levels. For example, a learning objective record 312 associated with mastering fourth grade fractions can be associated with and/or linked to a learning objective record 312 associated with a concept from ninth grade algebra. This arrangement results in a more nebulous (and/or amorphous) arrangement and/or organization of the learning objective records 312 within the learning objectives database 240. This arrangement also facilitates the identification of foundational concepts a student might not understand. For example, if a student is having trouble understanding the concept from ninth grade algebra associated with fourth grade fractions, the student can be tested to see if he understands fourth grade fractions. In this manner, learning gaps can be identified and remedial lessons associated with the learning gaps can be delivered to the student. In other embodiments, if the student's records from fourth grade indicate a weaker understanding of fractions, the ninth grade educational material prepared for the student's ninth grade algebra course can be modified in advance to provide a greater likelihood of success in ninth grade algebra.

The organization and/or arrangement of the learning objective records 312 in the learning objectives database 240 can be sequential, two dimensional, three dimensional, hierarchical and/or the like. For example, as shown in FIG. 3, a grouping of and/or an organization of a learning objective record 312 associated with a first subject 310 (e.g., math) and/or between various subjects 310, 320, 330 can define a web-like structure. Moreover, as described in more detail herein, a set of learning objective records 312 in the learning objectives database 240 can be arranged, linked, and/or associated together to define a learning objective sequence 502 (see e.g., FIG. 5) that forms the basis for producing, revising, and/or updating educational material 280, such as, for example, a course. As described in more detail herein, by associating learning objective records in this manner, the CMS 140 can produce educational material 280 in an adaptive and/or dynamically changing manner.

In some embodiments, a learning objective record 312 in the learning objectives database 240 can include the type of knowledge associated with the measurable learning outcome. In such embodiments, for example, the type of knowledge associated with the measurable learning outcome can be factual, conceptual, procedural and/or metacognitive. This information can be useful, for example, in searching the learning objectives database 240 for learning objective records 312 from which educational material 280 is to be prepared, built, and/or delivered to a student.

In some embodiments, a learning objective record 312 can be associated with a particular learning object and/or a particular teaching strategy known to be effective in helping a student achieve mastery of the measurable learning outcome. For example, a learning objective record 312 within the learning objectives database 240 can be associated with and/or linked to a learning object based on and/or via the type of knowledge associated with the measurable learning outcome. In this manner, the learning object can be included within the educational material 280 produced by the CMS 140, as shown and described below with reference to FIG. 5. In some embodiments, for example, the type of knowledge can be factual (e.g., memorization of math facts) and the learning object can be a learning activity that includes a dice game where the student adds the numbers shown a pair of dice as rolled. In other embodiments, for example, the type of knowledge can be conceptual and the learning object can be a teaching strategy that includes a method of effectively teaching the concept. In still other embodiments, the type of knowledge can be metacognitive and the learning object can be a learning activity that teaches study strategies for remembering complex ideas using mnemonics.

In some embodiments, a learning objective record 312 can include demographic information associated with the measurable learning outcome. In such embodiments, the learning objective record 312 can include information indicating a grade level, an age range, a difficulty level, and/or the like typically associated with the measurable learning outcome. In some embodiments, the learning objective record 312 can include information indicating the importance of the student mastering the measurable learning outcome. For example, some measurable learning outcomes can be designated as "high-priority" and/or necessary.

In some embodiments, a learning objective record 312 can include information descriptive of the measurable learning outcome associated with the learning objective record 312. In such embodiments, for example, the learning objective record 312 can include metadata having a topic associated with the measurable learning outcome, a subject associated with the measurable learning outcome, keywords describing the measurable learning outcome and/or the like. Such metadata can be used to aid a course developer in searching the learning objectives database 240 for learning objective records 312 from which the educational material 280 is to be produced, revised, updated and/or the like. For example, the learning objectives database 240 can be searched to define the measurable learning outcomes to be included within the educational material 280. The learning objective records 312 associated with the measurable learning outcomes to be included within the educational material 280 can be organized, grouped and/or arranged to define a learning objective sequence 502 for the educational material 280 (see e.g., FIG. 5). The relationships between the learning objective records 312 in the learning objectives database 240 can assist in organizing, grouping and/or arranging the learning objective records 312, as described below.

In some embodiments, each learning objective record 312 can be associated with and/or linked to at least one standard record from the standards database 250 and/or at least one learning philosophy record 400 from the learning philosophy database 260. In some embodiments, the association of a learning objective record 312 to a standard record and/or a learning philosophy record can be quantified. For example, in some embodiments, the association of a learning objective record 312 to a standard record can be weighted to indicate whether the standard associated with the standard record is fully met or only partially met by presentation of educational material associated with the learning objective record 312 or mastery of the measurable learning outcome associated with the learning objective record 312. Similarly, in some embodiments, the association of a learning objective record 312 to a learning philosophy record can be weighted to indicate whether a learning concept associated with the learning philosophy record is fully met by the presentation of educational material associated with the learning objective record 312 and/or mastery of the measurable learning outcome associated with the learning objective record 312 or only partially met by the presentation of educational material associated with the learning objective record 312 and/or mastery of the measurable learning outcome associated with the learning objective record 312.

The association between a learning objective record 312 and a standard record and/or a learning philosophy record 400 can be weighted in any suitable manner. For example, each learning objective record 312 can assign an associated standard and/or learning concept a numerical value between 0 and 100 to indicate the percent that the presentation of educational material associated with the learning objective record 312 and/or mastery of the measurable learning outcome associated with the learning objective record satisfies the standard and/or learning concept. In such embodiments, multiple learning objective records 312 associated with the same standard and/or the same learning concept can together result in full compliance with the standard and/or learning concept (see e.g., FIG. 7). For example, presentation of educational material associated with a first learning objective record can indicate 60% compliance of a standard and presentation of educational material associated with a second learning objective record can indicate 40% compliance of the standard. Together, presentation of educational material associated with the first learning objective record and presentation of educational material associated with the second learning objective record indicates full compliance with the standard. In other embodiments, any other method of weighting can be used to quantify the association of standards and/or learning concepts with learning objective records.

This association of the learning objective records 312 with both the standard records and the learning philosophy records allows the educational material 280 produced, developed, managed and/or revised by the CMS 140 to be easily mapped to any number of different standards and/or learning philosophies upon which the educational material 280 is based. For example, as described in more detail herein, this arrangement allows a particular course (e.g., fourth grade math) to be mapped to and/or revised to comply with any number of different state standards of learning. In this manner, the CMS 140 can automatically determine portions of a course that comply with a certain standard and portions that may require updates and/or revisions to comply with the standards. Moreover, as described in more detail herein, the CMS 140 can automatically update the educational material 280 to include learning activities (e.g., learning activities 650, as shown and described with reference to FIG. 6) such that the revised course complies with the standards. Thus, when a course is developed using the CMS 140, the course developer need not manually define portions of the course that satisfy each standard.

In some embodiments, each learning objective record 312 can be associated with and/or linked to course content (e.g., a learning object, an assessment item and/or a teaching strategy item) known to be effective in helping a student achieve mastery of the measurable learning outcome. As described in more detail below, learning objects can include any item configured to be presented to a student as part of the educational material 280 to assist the student in mastering a measurable learning outcome. In some embodiments, a learning object can be any discrete portion of a course that is presented to a student. In such embodiments, for example, learning objects can include learning activities (e.g., an on-line visual activity, an off-line activity with a manipulative, a Flash activity or the like), connecting items, units, learning modules, courses and/or the like. In some embodiments, an assessment item can be any activity that assesses a student's knowledge of a measurable learning outcome and/or a particular concept. In such embodiments, an assessment item can be a multiple-choice question, a true-false question, an essay question, a manipulative, a presentation, a report, a project and/or the like. In some embodiments, a teaching strategy item can be any content associated with the learning philosophy database 260 that is configured to be presented to a teacher 164 and/or a learning coach 162. Teaching strategy items can aid the teacher 164 and/or the learning coach 162 in assisting the student 160 with learning activities and/or assessments.

The linking of each learning objective record to course content (e.g., learning objects, assessment items and/or teaching strategy items) allows the CMS 140 to produce, develop, manage and/or revise the educational material 280 by manipulating the sequence of and/or the content associated with the learning objective records 312 identified as being included within and/or relevant to the educational material 280. Similarly stated, this arrangement allows the CMS 140 to produce, develop, manage and/or revise educational materials using an "objective-centered" approach. Accordingly, the CMS 140 can produce a wide variety of educational materials 280 (e.g., elementary school courses) based on a consistent, research-based philosophy of learning. For example, as described in more detail herein, this arrangement allows a particular course (e.g., fourth grade math) to be produced by arranging a set of learning objective records 312 in a particular sequence (e.g., a learning objective sequence 502). Because the course content is associated with and/or linked to the learning objective records 312, the CMS 140 can sequence, assemble and/or put together the course content in an organized fashion based on the associations between the set of learning objective records 312. In some embodiments, the course content, (including learning objects, assessment items, and/or teaching strategy items), can be assembled automatically based on the associations of the learning objective records 312. Thus, in some embodiments, when a course is developed using the CMS 140, the course developer need not manually arrange and/or organize the course content.

The standards database 250 (shown in FIG. 2) contains multiple standards records. Each standards record is associated with a particular statement of learning as defined by an organization. Such organizations can include, for example, a country, a state, a county, a district, a city, an educational association, and/or an institution. In some embodiments, the statement of learning is associated with mastery of a particular learning objective.

In some embodiments, each standards record can include additional information associated with the statement of learning. For example, in some embodiments, a standards record includes information associated with and/or identifying the organization that provided the standard, the date adopted by the organization, a grade level associated with the standard, a skill level associated with the standard, a subject associated with the standard (e.g., math, reading, science, etc.), a level of proficiency recommended to meet the standard, and/or the like. Accordingly, in such embodiments, each standard record can include information about what should be learned (e.g., the statement of learning) and/or when it should be learned (e.g., grade level, age, etc.).

In some embodiments, each standards record can include information descriptive of the standard associated with the standards record. In such embodiments, for example, the standards record can include metadata having a topic of the standard, a subject of the standard, keywords describing the standard and/or the like. Such metadata can be used to aid a course developer in searching the standards database 250 for standards records. For example, the standards database 250 can be searched to define the standards to be met by the educational material 280 and/or to ensure that learning activities that address the required standards are included within the course.

Moreover, in some embodiments, the standards records can be hierarchically arranged within the standards database 250. In such embodiments, for example, a first standard record can be associated with an overall broad statement of knowledge, whereas additional standard records can be included as sub-standards of the first standard record. Accordingly, the first standard is met once all of its sub-standards are met. In some embodiments, each sub-standard can also have sub-standards. In such a manner, a hierarchy of standards can be defined. In some embodiments, a standards record includes information associated with other standards records in the standards database 250. In such embodiments, for example, a standards record can include one or more prerequisite standards records and/or can itself be a prerequisite standards record for one or more other standards records. The standards records are associated with the learning objectives 312 from the learning objectives database 240, described above. Through the learning objectives 312, the standards records are incorporated into the process of producing, developing and/or revising the educational material 280 using the CMS 140.

In some embodiments, the standards records within the standards database 250 can be associated with one or more standardized tests. In some embodiments, information pertaining to a standardized test is stored within the standards database 250. In other embodiments, the information about a standardized test is stored in a separate database (not shown in FIG. 2) that is linked to and/or accessible to the standards database 250. The information pertaining to the standardized test can include, for example, a test name, test offering information, test criteria, a test provider, a test profile, and/or the like. In such embodiments, the test criteria can include the standards associated with and/or covered by the test, the percentage of the test questions associated with each standard or group of standards, exceptions when a standard is excluded from the test, criteria to pass the test, and/or the like. The test criteria can be used to link the standardized test to the standard records within the standards database 250. The test offering information can include, for example, the organization that offers the test, information on when the test is offered (e.g., the month the test is given), a grade level associated with the test, and/or the like. The test profile can include the types of questions on the test the scoring weights given to the various types of questions, and/or the like.

Figure 4:
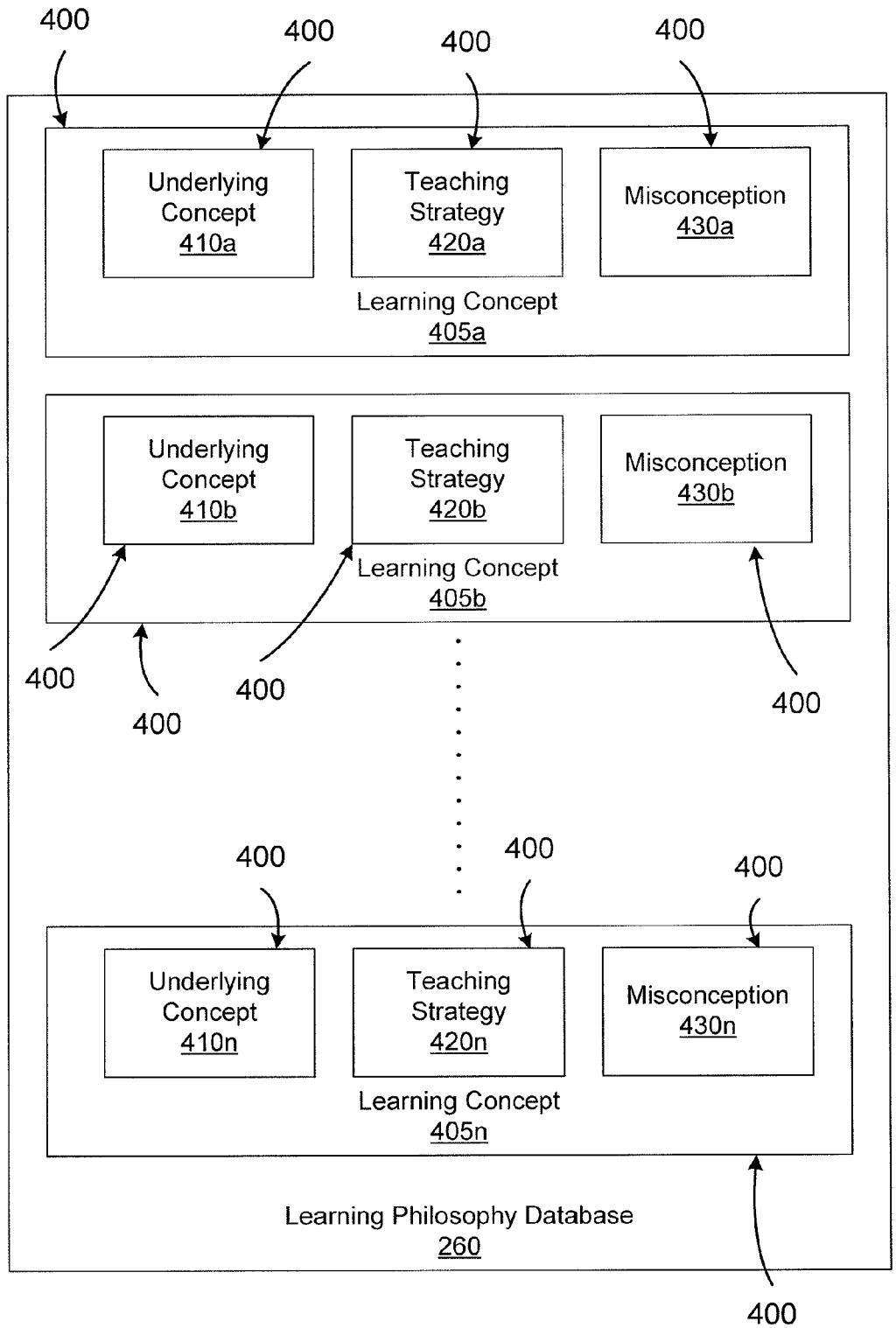
FIG. 4 is a schematic illustration of a learning philosophy database of the content management system of FIG. 2.

As shown in FIG. 4, the learning philosophy database 260 contains multiple learning philosophy records 400. Each learning philosophy record 400 is associated with and/or represents a learning concept, an underlying concept, a teaching strategy and/or a misconception. As such, in some embodiments, learning philosophy records 400 can be learning concept records 405a-405n, underlying concept records 410a-410n, teaching strategy records 420a-420n or misconception records 430a-430n.

Each learning philosophy record 400 can be associated with other learning philosophy records 400. For example, each learning concept record 405a-405n can include and/or be associated with one or more underlying concept records 410a-410n, one or more teaching strategy records 420a-420n, and/or one or more misconception records 430a-430n. In such embodiments, the learning concepts associated with the learning concept records 405a-405n are broad descriptions of major concepts and each underlying concept record 410a-410n, each teaching strategy record 420a-420n, and/or each misconception record 430a-430n is associated with a narrower description of a sub-concept within the learning concept. Thus, in some embodiments, the records 400 within the learning philosophy database 260 are arranged hierarchically. In some embodiments, each learning philosophy record 400 can also be grouped and/or arranged by topic, grade level, and/or the like.

One example of a learning concept associated with a learning concept record 405a-405n is "All numbers obey the laws of arithmetic." Another example of a learning concept associated with an learning concept record 405a-405n is "Numbers and arithmetic operations can describe many events and relationships in our world."

In some embodiments, a learning concept can be expressed in a style and/or manner suitable for the intended audience. In some embodiments, for example, a learning concept 405a-405n can be associated with both a first textual description of the learning concept 405a-405n for teachers, learning coaches and/or administrators and a second textual description of the learning concept 405a-405n for students. In such embodiments, the first textual description and the second textual description can be age and/or position appropriate descriptions such that the student, as well as the teacher, learning coach and/or administrator can understand the learning concept. This allows a learning concept included with the educational material produced by the CMS 140 (e.g., as a lesson title, learning activity title, etc.) to be displayed to an end-user in a manner appropriate for the end-user. In some embodiments, the learning concept can be displayed in any appropriate style and/or manner, such as, in multiple different languages, different dialects, a pictorial representation and/or the like.

An underlying concept record 410a can be associated with and/or represent an underlying concept, such as a statement, a description and/or an idea that describes a concept and/or a principle that can help a student understand the learning concept of the learning concept record 405a with which the underlying concept record 410a is associated. In some embodiments, for example, a student can be exposed to one or more underlying concepts to help the student understand the learning concept associated with the learning concept record 405a. In some embodiments, for example, an underlying concept can be described as a narrow learning concept. One example of an underlying concept associated with an underlying concept record 410a-410n is "An integer is any whole number or its opposite." Another example of an underlying concept associated with an underlying concept record 410a-410n is "Division can be understood as repeated subtraction or as division of a quantity into equal groups."

In some embodiments, an underlying concept record 410a can include and/or be associated with sub-underlying concept records, sub-teaching strategy records and/or sub-misconception records. In such embodiments, the underlying concept record 410a can be described as a learning concept record within a learning concept record 405a. A sub-underlying concept record included within an underlying concept record 410a, for example, can be associated with a statement, a description and/or an idea that describes a sub-concept and/or a sub-principle that can help students understand the underlying concept associated with the underlying concept record 410a.

A misconception record 430a can be associated with and/or represent a misconception, such as, for example, a statement, a description and/or an idea that describes a misunderstanding and/or a partial understanding of the learning concept of the learning concept record 405a with which the misconception record 430a is associated. In some embodiments, for example, misconceptions represent common misunderstandings and/or common problems students have in understanding the learning concept of the learning concept record 405a. Misconceptions can develop as a result of for example, over-generalizing a correct idea to a situation where the idea does not apply, an inference from everyday knowledge, a student's intuitions, and/or incomplete learning. In some embodiments, educational material 280 produced, developed and/or revised using the CMS 140 can be tailored to help a student avoid a misconception based on the misconception records 430a-430n. For example, the educational material 280 can be developed to effectively teach against the misconceptions. In some embodiments, an assessment generated by the CMS 140 can test for misconceptions. In such embodiments, the CMS 140 can deliver material to teach against the misconceptions that a student has and/or is likely to develop based on the test results.

Similar to the underlying concept record 410a described above, in some embodiments, a misconception record 430a can include and/or be associated with sub-underlying concept records, sub-teaching strategy records and/or sub-misconception records. In such embodiments, the misconception record 410a can be described as a learning concept record within a learning concept record 405a. A sub-underlying concept record included within and/or associated with a misconception record 430a, for example, can be a statement, a description and/or an idea that describes a sub-concept and/or a sub-principle that can help students overcome the misconception associated with the misconception record 430a.

A teaching strategy record 420a can be associated with and/or represent a teaching strategy item. A teaching strategy item can be a statement, a description and/or an idea that describes a strategy and/or a method of teaching the learning concept of the learning concept record 405a with which the teaching strategy record 420a is associated. In some embodiments, for example, the teaching strategy item can be a textual statement that describes one or more strategies of teaching the learning concept. In some embodiments, the teaching strategy item can include one or more examples, learning activities, ideas and/or the like associated with the teaching strategy. For example, a teaching strategy item associated with ninth grade algebra can include an example of the FOIL (first, outside, inside, last) method of expanding a binomial. Such an example can assist a teacher 164 and/or a learning coach 162 in teaching binomial expansion to a student 160. As described above, in some embodiments, a teaching strategy record 420a can be associated with an underlying concept record 410a-410n and/or a misconception record 430a-430n. In other embodiments, a teaching strategy record can be associated with a standards record within the standards database, described above.

Accordingly, in this manner, the learning philosophy records 400 within the learning philosophy database 260 (including the learning concept records 405a-405n, the underlying concept records 410a-410n, the teaching strategy records 420a-420n and the misconception records 430a-430n) are arranged in a hierarchical manner. In some embodiments, the learning philosophy records 400 can also be arranged in a sequential manner. In such embodiments, for example, multiple underlying concept records associated with a learning concept record 405a can be arranged sequentially such that the underlying concepts are presented sequentially (e.g., in a predetermined order or in a dynamically determined order) to assist a student in mastering the learning concept of the learning concept record 405a. In some embodiments, the CMS 140 can produce, develop and/or revise the educational material 280 based, at least in part, on the arrangement of the learning concept records 405a-405n.

As described above, learning philosophy records 400 (including the learning concept records 405a-405n, the underlying concept records 410a-410n, the teaching strategy records 420a-420n and the misconception records 430a-430n) can be connected to, linked with, and/or associated with at least one learning objective record 312 from the learning objectives database 240. Thus, the educational material 280 can be produced, developed and/or revised by assembling learning objective records 312, as described below, to automatically include, reflect and/or take into account learning concepts, underlying concepts, teaching strategy items and/or misconceptions. Additionally, a course developer can easily view what learning concepts are taught by a particular course.

In some embodiments, learning philosophy records 400 include additional information useful to a course developer. For example, learning philosophy records 400 can include information regarding the source and/or origin of the research and/or philosophy that underpins the learning concept, the underlying concept, the teaching strategy and/or the misconception. In some embodiments, the learning philosophy records 400 can include the type of knowledge (e.g., factual, conceptual, procedural, metacognitive) and/or demographic information (e.g., grade level, age range) associated with the learning concept, the underlying concept, the teaching strategy and/or the misconception. Such information can be used to ensure that desired learning concepts, underlying concepts, teaching strategy items and/or misconceptions are included in the educational material 280.

In some embodiments, each learning philosophy record 400 can include information descriptive of the learning concept, the underlying concept, the teaching strategy and/or the misconception associated with the learning philosophy record 400. In such embodiments, for example, the learning philosophy records 400 can include metadata having a topic of the learning philosophy record 400, a subject of the learning philosophy record 400, keywords describing the learning philosophy record 400 and/or the like. Such metadata can be used to aid a course developer in searching the learning philosophy database 260 for learning philosophy records 400. For example, the learning philosophy database 260 can be searched to compile the learning philosophy records 400 to be included and/or considered in the process of producing, developing and/or revising the educational material 280 using the CMS 140 and/or to ensure that the educational material 280 addresses the required and/or desired learning philosophies. In some embodiments, searching can be used to organize, group and/or arrange learning philosophy records 400.

In some embodiments, the learning philosophy database 260 can be automatically updated based on educational research received by the CMS 140 from the LMS 120 and/or any other external source, as described in further detail herein. Accordingly, as the existing learning philosophies are validated (e.g., as students complete learning activities and/or assessments associated with the learning philosophy records 400), they can be automatically updated based on feedback from students 160, teachers 164 and/or learning coaches 162.

The resources database 232 includes a set of resource records. Each resource record is associated with a resource that can be used to produce learning objects and/or learning activities. A resource can be, for example, text, an image, an audio file, a video file, a Flash animation, a reference to a text book, a reference to a manipulative, a uniform resource locator (URL), a keyword, a resource activity (e.g., an activity associated with a resource), an assessment requestor and/or any other type of resource that can be included in a learning object. In some embodiments, each resource can be used in multiple learning objects, described in further detail herein. Moreover, as described in more detail herein, the learning objects are used to produce, develop and/or revise the educational material 280.

In some embodiments, an assessment requestor can be a placeholder within an educational material 280 (e.g., a lesson, a learning module, a unit, a course, etc.) for an assessment to be included in the educational material 280. The assessment requestor can include metadata that describes the types, subject and/or skill level of questions to be inserted into the educational material 280 by the scope and sequence engine 210, as further described herein. For example, an assessment requestor linked to a learning objective record 312 associated with the addition of fourth grade fractions can be included in a learning activity directed towards addition of fourth grade fractions. When the scope and sequence engine 210 delivers the learning activity to the student, assessment items from the assessment items database 272 can be inserted by the CMS 140 and/or the LMS 120 in place of the assessment requester. In this manner, the use of an assessment requestor allows the learning activity generator 230 to assemble learning activities containing assessment items. In other embodiments, the learning activity generator 280 can retrieve one or more assessment items directly from the assessment items database 272 when building, producing and/or revising a learning activity. In some embodiments, an assessment requestor can be independent of a learning activity, and can be placed into a learning module by the scope and sequence engine 210 in place of a statically defined assessment, as further described herein.

In some embodiments, each resource record in the resources database 232 can include information descriptive of the resource with which it is associated. For example, each resource record can include information indicating a type of the resource, a title of the resource, a description of the resource, a grade range associated with the resource, keywords associated with the resource, a file-type of the resource, instructions for using the resource and/or the like. In some embodiments, resource records associated with physical resources (e.g., test books, manipulatives, etc.) can include information indicating whether the resource will be sent to the student or whether the student can obtain the resource on their own.

In some embodiments, additional descriptive information can be associated with a resource when the resource is assembled as part of a learning object, as described in further detail herein. For example, a resource that is assembled as part of a learning object (e.g., learning activity, learning module, unit, course, etc.) can include information linking the resource to the learning object, the intended audience of the resource (e.g., student, teacher, learning coach, administrator), whether the resource is optional or required, the number of resources needed, and/or the like. Further, a course developer can update a title of the resource, a description of the resource and/or other information associated with the resource when the resource is assembled as part of a learning object.

In some embodiments, a media management database 234 is associated with the resources database 232. In such embodiments, the media management database 234 can be used to manage the digital rights of the resources contained within the resources database 232. For example, the media management database 234 can be used to track the use of a resource in the educational material 280 delivered to the end-user. Further, the media management database 234 can store a description of the rights held for each resource. This ensures that the rights to a particular resource are known and/or available to a course developer when a learning object is developed from the learning resources. In other embodiments, the media management database is part of the resources database. In yet other embodiments, resources subject to digital rights management are stored in the media management database and resources not subject to digital rights management are stored in the resources database.

The activity generator 230, can be used to build, produce, develop and/or revise learning activities from one or more resources. The learning activities are then used to produce the educational material 280, as described herein. In some embodiments, for example, the activity generator 230 can assemble, arrange and/or organize one or more resources to define a learning activity. In some embodiments, for example, a learning activity can be a compilation of media and/or resources that together teach a student a concept. For example, a learning activity can be an image of a painting displayed on a display screen with an accompanying description of the painting. In other embodiments, a learning activity can be a chemistry experiment to be performed by a student at home.

In some embodiments, for example, a learning activity produced by the activity generator 230 can be associated with a learning objective record 312 from the learning objectives database 240. In such embodiments, the learning activity can be configured to expose a student to a concept associated with a measurable learning outcome associated with the learning objective. In some embodiments, if the learning objective record 312 is associated with a standard record and/or a learning philosophy record 400, the standard and/or the learning philosophy can be addressed upon completion of the learning activity. As described in further detail herein, in some embodiments, an assessment can be administered upon completion of the activity to test whether the student 160 has mastered the measurable learning outcome. In other embodiments, the activity generator can assemble resources and define learning activities in real-time. In such embodiments, for example, when a student requests a learning activity pertaining to a certain measurable learning outcome (e.g., understanding fourth grade fractions), the activity generator can assemble resources associated with the measurable learning outcome and deliver a learning activity to the student.

In some embodiments, the activity generator 230 can produce, develop and/or revise a learning activity based on a measurable learning outcome and/or search criteria associated with the measurable learning outcome input by a course developer. The search criteria associated with the measurable learning outcome can include, for example, key words associated with the measurable learning outcome, a subject associated with the measurable learning outcome, a grade level associated with the measurable learning outcome and/or the like. In such embodiments, the activity generator 230 can search the resources database 232 and identify the resources associated with the provided measurable learning outcome and/or the provided search criteria. The course developer can then use the resources to build a learning activity.

After a learning activity is produced and linked and/or associated with a learning objective record 312 from the learning objectives database 240, the learning activity can be stored in the activities database 234. The scope and sequence engine 210 can query the activities database 234 for previously assembled activities when producing, developing and/or revising a learning module, as described in further detail herein. Accordingly, previously assembled learning activities and/or groupings of learning activities (e.g., lessons, learning modules, units or the like) can be reused multiple times in the production, development and/or revision of the educational material 280. Similarly, in some embodiments, course developers can search the activities database 234 for previously assembled activities when manually building a learning module, a unit and/or a course. The activities database 234 provides for efficient tracking, production, use and/or revision of learning activities. Additionally, the activities database 234 provides for the use of a learning activity across multiple offerings of educational material.

The assessment items database 272 includes multiple assessment item records, each of which is associated with an assessment item. As described herein, assessment items are used to build assessments, which can be included within the educational material 280 produced, developed and/or revised by the CMS 140. As such, an assessment item can be anything configured to test, measure and/or quantify a student's understanding of a measurable learning outcome. In some embodiments, for example, an assessment item can be a single response multiple-choice question, a multiple response multiple-choice question, a fill-in-the-blank question, an essay question, a true-false question, an observation, an association question (e.g., matching), an assessment game, and/or the like. In some embodiments, an assessment item can also be a reference to a physical assessment item, such as, for example, a reference to a manipulative, a reference to a written test in a workbook, reference to an oral and/or written report, reference to an oral presentation, reference to an oral test and/or the like.

Each assessment item record can be linked to and/or associated with a learning objective record 312 from the learning objectives database 240. In this manner, the assessment generator 270 can produce assessments (e.g., tests) to measure the student's understanding of the measurable learning outcomes associated with the learning objective records 312.

The assessment generator 270, can be used to build, produce, develop and/or revise assessments using one or more assessment items. In some embodiments, for example, the assessment generator 270 can assemble one or more assessment items to produce an assessment. In some embodiments, for example, an assessment can be a compilation of assessment items that collectively measure a student's understanding of one or more measurable learning outcomes.

In some embodiments, for example, an assessment can be associated with one or more learning objective records 312 from the learning objectives database 240. In such embodiments, the assessment can be configured to measure a student's understanding of the measurable learning outcome associated with the learning objective records 312. Such an assessment can be described as a "summative assessment" because it is used to measure and/or quantify the student's knowledge. In some embodiments, the learning objective record 312 can be associated with a standard record and/or a learning philosophy record 400. In such embodiments, the assessment can also quantify the student's understanding of the standard and/or the learning philosophy.

In some embodiments, an assessment can be included within the educational material 280 to teach, form knowledge and/or allow the student to practice their knowledge of a measurable learning outcome associated with a learning objective record 312. Such an assessment can be described as a "formative assessment" and can be delivered to a student after a learning activity, a lesson, a learning module, a unit and/or a course. In some embodiments, a formative assessment can also be delivered to a student during or as a part of a learning activity. As described above, in such embodiments an assessment requestor can be assembled as a part of a learning activity as a placeholder for a formative assessment. The scope and sequence engine 210, described in further detail herein, can add assessment items and/or assessments into the learning activity in which the assessment requestor resource is placed.

In some embodiments, the assessment generator 270 can build, produce, revise and/or define assessments in real-time. In such embodiments, for example, when an assessment pertaining to a certain measurable learning outcome is requested (e.g., understanding fourth grade fractions), the assessment generator 270 can retrieve assessment items associated with the measurable learning outcome and deliver an assessment to the student in real-time. In some embodiments, the assessment generator 210 can dynamically produce an assessment from the assessment items such that each student taking a particular course can have an assessment with different assessment items associated with the same learning objective record 312, as described in further detail herein.

In some embodiments, the assessment generator 210 can dynamically produce an assessment in response to a student's response to and/or score on a previous assessment item. For example, if a student responds correctly to an assessment item then the next assessment item supplied to the student can be more advanced. If a student responds incorrectly to an assessment item, the next assessment item supplied to the student can be easier in an attempt to quantify the student's understanding. In other embodiments, the scope and sequence engine 210 can dynamically adapt an assessment based on a student profile or the like. In this manner, the assessment generator 270 and/or CMS 140 can produce an assessment tailored to an individual student, as discussed in more detail below. In other embodiments, any other component of the system can dynamically adapt the assessment based on the student profile or other information. For example, the assessment itself can be configured to adapt based on the student profile or the other information.

In some embodiments, an assessment can be produced by the assessment generator 270 based on a measurable learning outcome and/or search criteria associated with the measurable learning outcome input by a course developer. The search criteria associated with the measurable learning outcome can include, for example, key words associated with the measurable learning outcome, a subject associated with the measurable learning outcome, a grade level associated with the measurable learning outcome and/or the like. In such embodiments, the assessment generator 270 can search the assessment items database 272 and identify the assessment item records associated with the provided measurable learning outcome. The course developer can then use the assessment items identified to build an assessment.

After an assessment is produced and linked and/or associated with a learning objective record 312 from the learning objectives database 240, the assessment can be stored in the assessments database 274. The scope and sequence engine 210 can query the assessments database 274 for previously assembled assessments when producing a learning module, as described in further detail herein. Accordingly, previously assembled assessments can be reused multiple times in the production, development and/or revision of educational material 280. Similarly, in some embodiments, course developers can search the assessments database 234 for previously assembled assessments when manually building a learning module, a unit and/or a course. The assessments database 234 provides for efficient tracking, production, use and/or revision of assessments. Additionally, the assessments database 274 provides for the use of an assessment across multiple offerings of educational material.

While shown as being part of the CMS 140, in other embodiments, the assessment generator 270 can be part of the LMS 120 and/or any other portion of the system 110. In such embodiments, for example, the CMS 140 can store the assessment items in an assessment items database and the assessment generator located in the LMS 120 can query the assessment items database, assemble assessments, and deliver the assessments to the student.

The scope and sequence engine 210 organizes learning activities, assessments and/or teaching strategy items into learning modules, lessons, units and/or courses. The CMS 140 produces, develops and/or revises the educational material 280 to include the learning modules, assessments, units and/or courses. In some embodiments, a learning module can be a collection of one or more learning activities and/or assessments associated with similar, linked and/or a common learning objective records 240. For example, a learning module can include two activities associated with fourth grade fractions followed by an assessment to measure the student's understanding of fourth grade fractions after having completed the two activities. In such an example, the first activity might be associated with a first learning objective record 312, which is associated with a state standard from the standards database 250 and the second activity might be associated with a second learning objective record 312, which is associated with a misconception record 430a-430n from the learning philosophy database 260. In such an example, the assessment might measure the student's understanding of the measurable learning outcomes associated with both the first learning objective record and the second learning objective record. In some embodiments, the assessment within the learning module can be a dynamically created assessment rather than a predefined (or "static") assessment. In this manner, the CMS 140 can dynamically deliver assessment items to an end-user as part of the learning module, as discussed in further detail herein.

Figure 6:
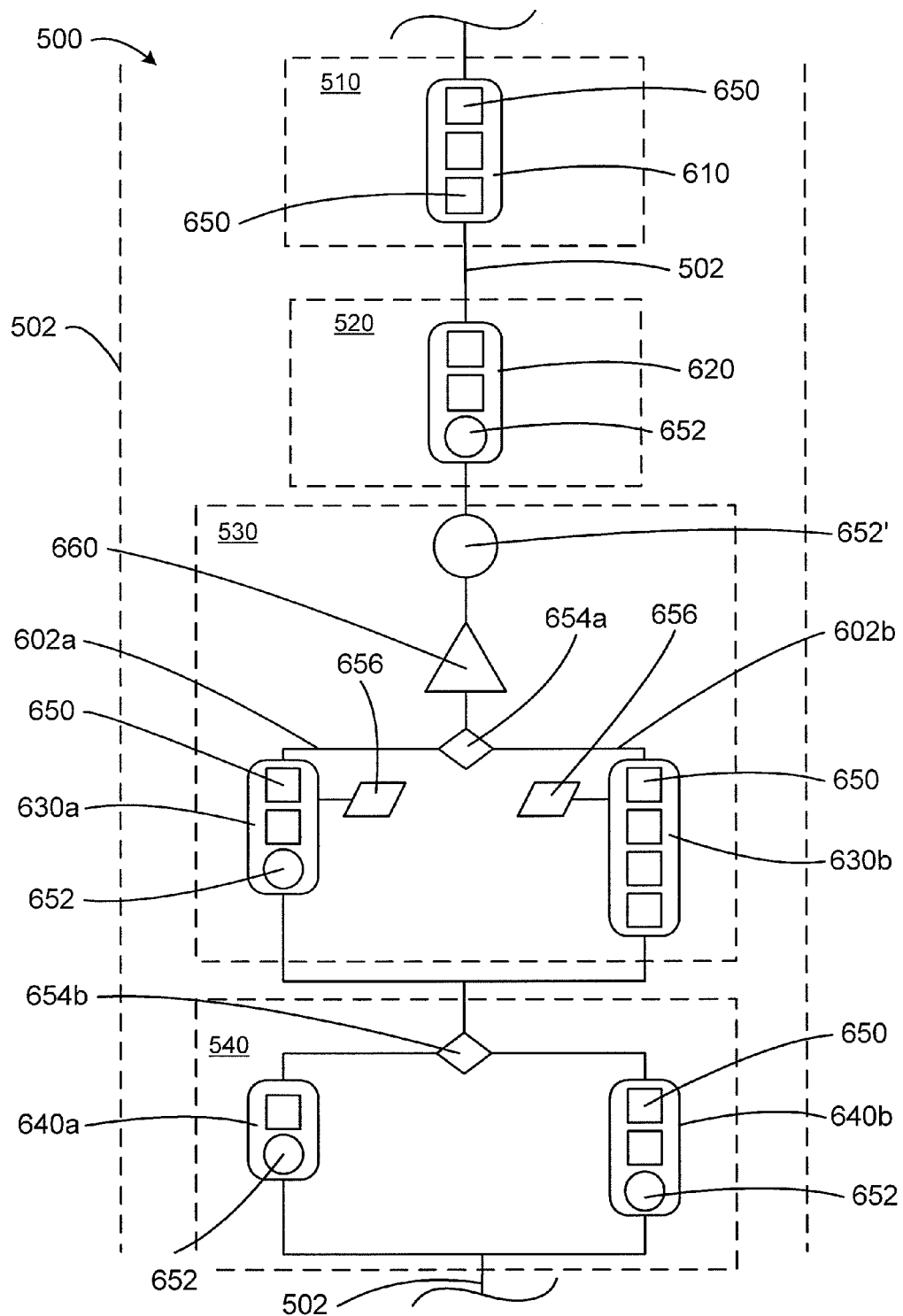
FIG. 6 is a detailed schematic illustration of the portion of the course of FIG. 5.

In some embodiments, the activities and/or assessments can be linearly arranged within a learning module (see e.g., the activities 650 and the assessments 652 within module 610, shown in FIG. 6). In such embodiments, for example, after a student completes the first activity and/or assessment, the educational delivery system 110 delivers the second activity and/or assessment. In such a manner, each student can proceed through a learning module in the same step-by-step manner as other students. Such linearly arranged activities and/or assessments define one or more learning paths (see e.g., learning paths 602a and 602b, shown in FIG. 6), as described in further detail herein.

As described in further detail herein, in some embodiments, a learning path can include multiple decision points and branches (see e.g., learning paths 602a and 602b, shown in FIG. 6). This allows students to take different learning paths through the same learning module. Such learning paths are referred to as adaptive learning paths. In some embodiments, a learning module can include adaptive learning paths to tailor the educational material 280 to a student's style of learning, a student's learning capabilities, the student's prior level of understanding and/or the like. In other embodiments, the learning path can be dynamically defined, tailored and/or assembled as a student proceeds through a sequence of measurable learning outcomes, as further described herein.

After a learning module is assembled, the learning module can be stored in the learning modules database 220. The scope and sequence engine 210 can query the learning modules database 220 for previously assembled learning modules when producing the educational material 280 (e.g., a unit and/or a course), as described in further detail herein. Accordingly, previously assembled learning modules and/or groupings of previously assembled learning modules, can be reused in multiple educational materials. Similarly, in some embodiments, course developers can search the learning modules database 220 for previously assembled learning modules when building and/or revising a unit and/or a course. The learning modules database 220 provides for efficient tracking, production, use and/or revision of learning modules. Additionally, the learning modules database 220 provides for the use of a learning module across multiple offerings of educational material.

The scope and sequence engine 210 can assemble and/or organize one or more learning modules into a unit. In some embodiments, a unit can be a collection of one or more learning modules having activities, assessments and/or teaching strategy items associated with similar, linked and/or a common learning objective. For example, a unit associated with fractions can include a learning module associated with adding fractions and a learning module associated with subtracting fractions. In some embodiments, a unit can also include a summative assessment to be delivered to a student upon completion of the learning modules within the unit.

Similar to the arrangement of learning activities and/or assessments within a learning module, in some embodiments, the learning modules can be arranged within a unit to define one or more learning paths within the educational material 280 produced by the CMS 140. Additionally, in some embodiments, the learning modules can be arranged to define one or more adaptive learning paths.

Similarly, the scope and sequence engine 210 can assemble and/or organize one or more units into the finished educational material 280, such as, for example, a course. In some embodiments, a course can be a collection of one or more associated units. The units can be associated with each other via the learning objective records 312 associated with the activities and/or assessments within the learning modules of the units. In some embodiments, for example, the course can include a collection of the units associated with eighth grade science. In some embodiments, a course can also include a summative assessment to be delivered to a student upon completion of the units within the course. Similar to learning activities and/or assessments within a learning module, in some embodiments, the units can be arranged within a course to define a learning path. Additionally, in some embodiments, the units can be arranged to define adaptive learning paths.

In some embodiments, the scope and sequence engine 210 can define lessons. A lesson can be a group of activities and/or assessments that is to be presented to a student within a predetermined block of time. In some embodiments, for example, a lesson can include a grouping of activities and/or assessments to be presented to a student in a 50 minute block of time. In some embodiments, a lesson can include multiple learning modules, a portion of a single learning module, multiple units, a portion of a single unit, multiple courses, and/or a portion of a single course. In other embodiments, a lesson can include a portion of a single learning activity and/or assessment. In some embodiments, the defining of learning modules, units, courses and/or lessons can be done in real-time, as further described herein. For example, a learning module, unit, course and/or a lesson can be tailored to a particular student based on the student's past performance, learning style and/or the like.

While shown as being part of the CMS 140, in other embodiments, the scope and sequence engine can be part of the LMS and/or any other portion of the educational delivery system. In such embodiments, for example, the CMS can store the assessments and the learning activities and the scope and sequence engine resident in the LMS can define learning modules, units, courses, and/or lessons, and deliver them to the student. Additionally, in such embodiments, the scope and sequence engine of the LMS can define learning paths between the learning modules, units, and/or courses.

As described above, the CMS 140 facilitates the production, development, management and/or revision of educational material using an "objective-centered" approach. Although the educational material 280 produced by the CMS 140 is described herein as being primarily a course (e.g., fourth grade math) or a portion of a course, in other embodiments, the CMS 140 can produce a seminar, a textbook, an educational game, a remedial program, a training regimen or the like. The educational material 280 produced by the CMS 140 can be, for example, included within a curriculum offered by a school or other learning service provider. Thus, in some embodiments, the CMS 140 can produce, develop, create, manage, store, and/or deliver a curriculum offered by an educational service provider. As one example, a course developed by the CMS 140 can be a fourth grade math course that is developed such that the student can master a set of a measurable learning outcomes associated with math for fourth graders and/or meet a set of standards associated with math for fourth graders.

Figure 5:
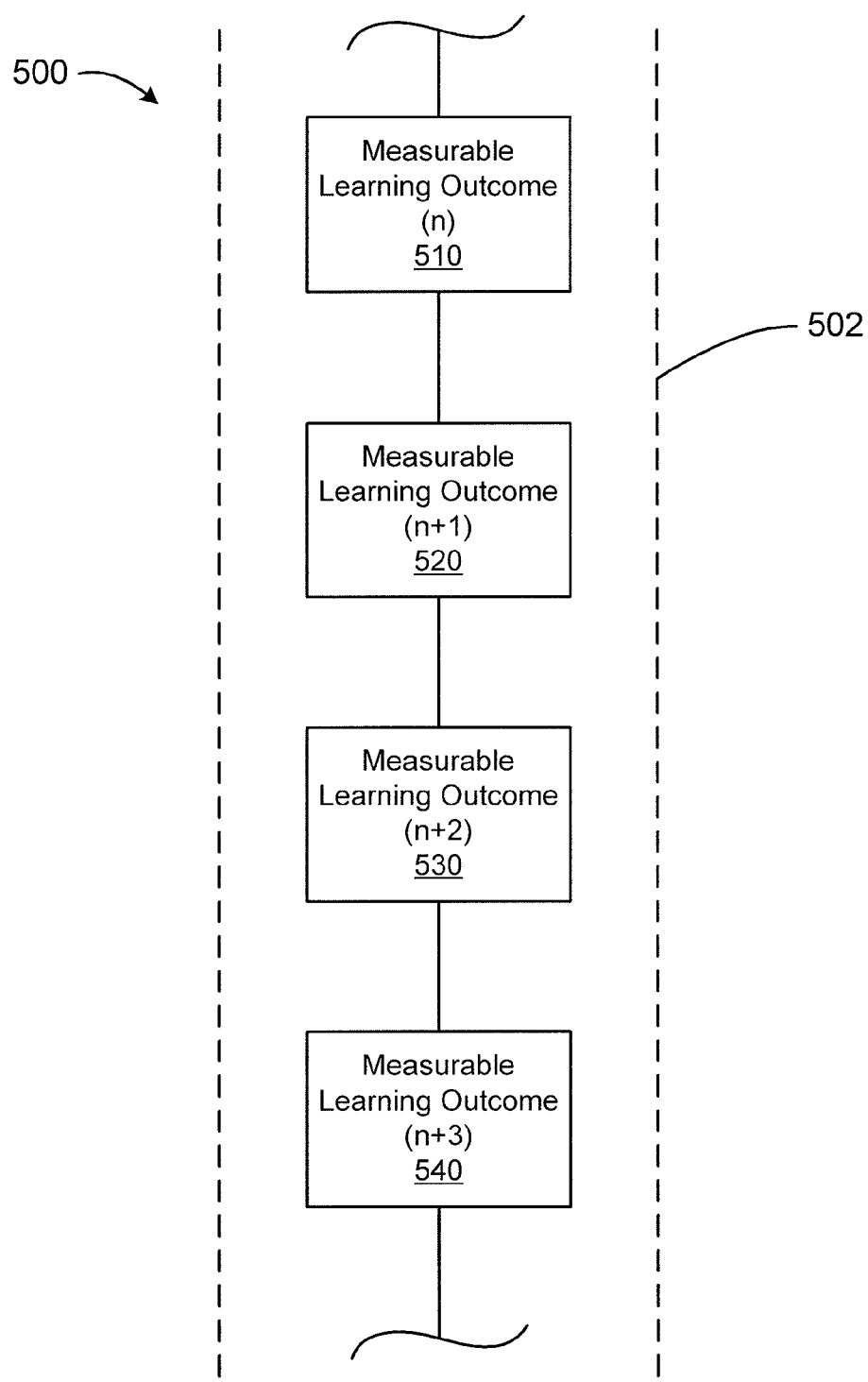
FIG. 5 is a schematic illustration of a portion of a course having multiple measurable learning outcomes, according to an embodiment.

FIGS. 5 and 6 show graphical representations of a portion of a course 500 produced by the CMS 140, according to an embodiment. The portion of the course 500 includes and/or is based on a set of measurable learning outcomes 510, 520, 530, 540, each of which is associated with a learning objective record 312 from the learning objectives database 240, as described above. The measurable learning outcomes 510, 520, 530, 540 are arranged, linked and/or associated together to define a learning objective sequence 502. The learning objective sequence 502 forms the basis for producing, revising, and updating the portion of the course 500. Additionally, the learning objective sequence 502 defines an order in which the course content (e.g., learning objects, assessment items, teaching strategy items, etc.) associated with the measurable learning outcomes 510, 520, 530, 540 will be delivered to the end-user. Said another way, the learning objective sequence 502 defines the overall flow of the course 500. For example, as shown in FIG. 5, the course content associated with the measurable learning outcome 510 will be delivered to the end-user prior to the course content associated with the measurable learning outcome 520.

Although the portion of the course 500 is shown in FIG. 5 as including a single learning objective sequence 502, in other embodiments, the portion of the course can include multiple learning objective sequences. For example, one or more optional measurable learning outcomes can be included in a first learning objective sequence, while excluded from a second learning objective sequence. In such embodiments, a student can complete the portion of the course via the first learning objective sequence (with the optional measurable learning outcomes) or the second learning objective sequence (without the optional measurable learning outcomes). In some embodiments, the optional measurable learning outcomes can be remedial measurable learning outcomes. Said another way, the optional measurable learning outcomes can define a learning objective sequence associated with remedial instruction. In other embodiments, the optional measurable learning outcomes can be advanced measurable learning outcomes. Said another way, the optional measurable learning outcomes can define a learning objective sequence associated with enrichment and/or advanced instruction.

As described above, the learning objectives records 312 associated with the measurable learning outcomes 510, 520, 530, 540 are associated with and/or linked to course content (e.g., learning objects, assessment items and/or teaching strategy items). Accordingly, the course 500 can be developed by first selecting the set of learning objective records 312 from the learning objectives database 240 and then arranging, linking, and/or mapping the set of learning objective records 312 to define the learning objective sequence 502, as shown graphically in FIG. 5. The set of learning objective records 312 to be included within the educational material 280 (e.g., a course) can be selected by the CMS 140 in any suitable manner. In some embodiments, for example, the scope and sequence engine 210 can automatically select the set of learning objective records 312 to be included within the educational material 280. For example, the scope and sequence engine 210 can include and/or can have access to a set of rules that define which learning objective records 312 should be included in the set of learning objective records 312. In such embodiments, general criteria (e.g., grade level of the course, subject of the course, time to complete the course, etc.) and/or student specific criteria (e.g., skill level, age, previous test scores, etc.) can be used in conjunction with the rules to automatically select the learning objective records 312 to be included in the educational material 280.

In some embodiments, the learning objective records 312 to be included within the educational material 280 can be manually selected. In such embodiments, for example, the scope and sequence engine 210 is configured to receive (e.g., from a course developer) an indication of the learning objective records 312 to be included within the educational material 280. Such an indication, can be, for example, criteria corresponding to the type of educational material to be produced (e.g., a seminar, a course, a unit, a lesson, a learning module, a learning activity, an assessment, etc.), the time to complete the educational material, a delivery method of the educational material (e.g., book, online course, hybrid course, in-person training, etc.), a location where the educational material will be delivered (e.g., state, country, etc.), an organization with which the educational material is associated, one or more measurable learning outcomes to be mastered by the end-user of the educational material, requirements to pass a course, and/or the like. The scope and sequence engine 210 can then select the learning objective records 312 to be included within the educational material 280 based on the received criteria.

In some embodiments, the learning objective records 312 to be included within the educational material 280 can be based on one or more standards. In such embodiments, for example, the scope and sequence engine 210 is configured to receive (e.g., from a course developer) the location where the educational material will be delivered to ensure that the learning objective records 312 associated with the standards applicable to the location are incorporated into the process of producing, developing and/or revising the educational material 280. Similarly, in some embodiments, the organization with which the educational material 280 is associated can be used to ensure that the learning objective records associated with the standards applicable to the organization are incorporated into the process of producing, developing and/or revising the educational material 280. In such embodiments, the scope and sequence engine 210 can ensure that the educational material 280 pertaining to the applicable standards can be presented to the end-user.

The set of learning objective records 312 can be arranged, linked and/or mapped in any suitable manner to define the learning objective sequence 502. In some embodiments, for example, the CMS 140 can automatically arrange, link and/or map the set of learning objective records 312 based on the associations between the learning objective records 312 in the learning objectives database 240 (see e.g., FIG. 3). For example, if a learning objective record 312 in the learning objectives database 240 is associated with a prerequisite learning objective record 312, the prerequisite learning objective record 312 can be automatically placed in the learning objective sequence 502 such that the course content associated with the prerequisite learning objective record 312 is delivered to a student prior to delivering the course content associated with the learning objective record 312.

In some embodiments, the CMS 140 can first automatically arrange, link and/or map the set of learning objective records 312, and can then be used by a course developer to adjust and/or rearrange the learning objective sequence 502 manually. In such embodiments, the general structure of the course can be produced by the CMS 140 while the details of the course can be refined by the course developer. This procedure can reduce the time it takes a course developer to develop the course. Additionally, as described in more detail below, because the learning objective records 312 are associated with standards from the standards database 250 and/or learning concepts from the learning philosophy database 260, the CMS 140 can be used to produce a report to ensure the portion of the course 500 complies with the applicable standards and/or is based on the applicable learning philosophies. In other embodiments, the course developer can arrange the measurable learning outcomes manually to define the learning objective sequence.

FIG. 6 is a detailed block diagram of the portion of the course 500 including course content (e.g., learning objects, assessments 652, teaching strategy items 656). The course content is arranged to collectively define one or more learning paths 602a, 602b within the overall learning objective sequence 502. Said another way, the one or more learning paths 602a, 602b define the order in which the CMS 140 presents the course content within each measurable learning objective 510, 520, 530, 540, to the student.

As discussed above, in some embodiments, learning objects can include learning activities 650, learning modules 610, units, and/or lessons. Similarly, as discussed above, in some embodiments, an assessment 652 can be a compilation of assessment items that collectively measure a student's understanding of a concept. An assessment item can be anything configured to test and/or quantify a student's understanding of a measurable learning outcome. In some embodiments, an assessment item can be a physical item and/or a visual description of a physical item. For example, the assessment item can be a manipulative that tests a student's knowledge of a measurable learning outcome. Such an item can be a chemistry experiment, an art project (e.g., a painting, a drawing, etc.), playing a musical instrument, playing a sport, and/or the like. In other embodiments, the assessment item include an observable behavior and a rubric to interpret and/or score the observable behavior.

As discussed above, a teaching strategy item 656 can be a statement, a description and/or an idea that describes a strategy and/or a method of teaching a learning concept. The teaching strategy item 656 and/or the learning concept with which the teaching strategy is associated (e.g., learning concept 405a in FIG. 4) can be associated with a measurable learning outcome. In such a manner, the teaching strategy item 656 can assist a teacher and/or a learning coach in presenting, clarifying and/or reinforcing a measurable learning outcome.

The portion of the course 500 also includes one or more coupling objects 660 to produce a transition between course content within the portion of the course 500. In some embodiments, for example, a coupling object 660 can be a learning activity having content that reviews a previously presented learning outcome, that relates a previously presented measurable learning outcome to the next measurable learning outcome in the learning objective sequence, that provides a preview of the upcoming measurable learning outcome, and/or the like. In other embodiments, the coupling object 660 can be an assessment that can assess whether a student has a requisite understanding of prerequisite measurable learning outcomes, an assessment that reviews prerequisite measurable learning outcomes in an introductory fashion, and/or the like.

After the learning objective sequence 502 has been established, the CMS 140 can be used to produce the portion of the course 500 by arranging the course content (e.g., learning activities, assessments, learning modules, units, teaching strategy items) associated with each measurable learning objective 510, 520, 530, 540, as shown, for example, in FIG. 6. For example, to complete the portion of the course associated with the measurable learning outcome 510, a learning module 610 having three learning activities 650 is presented to the student. Similarly, to complete the portion of the course associated with the measurable learning outcome 520, a learning module 620 having two learning activities 650 and an assessment 652 is presented to the student. The assessment 652 can be used to assess whether the student's knowledge of the measurable learning outcome 520.

In some embodiments, information about a measurable learning outcome can be presented as alternate learning objects and/or assessments 652. For example, to complete the portion of the course associated with the measurable learning outcome 530, either the learning module 630a or the learning module 630b can be presented to the student. As described in further detail herein, the portion of the course associated with the measurable learning outcome 530 includes an adaptive decision point 654a to determine whether the student will have a greater likelihood of mastering the measurable learning outcome 530 by completing the learning module 630a or the learning module 630b. Similarly, to complete the portion of the course associated with the measurable learning outcome 540, either the learning module 640a or the learning module 640b can be presented to the student. Adaptive decision point 654b can be used to determine whether the student will have a greater likelihood of mastering the measurable learning outcome 540 by completing the learning module 640a or the learning module 640b. The adaptive decision point 654b can be similar to the adaptive decision point 654a, and is therefore not described in detail herein.

In other embodiments, any number of alternate learning objects and/or assessments can be presented to a student to assist a student in mastering a measurable learning outcome. For example, an adaptive decision point can decide between presenting the course content associated with three or more alternate learning paths to a student. Further, each learning path can include any number of similar and/or different learning objects and/or assessments.

The adaptive decision point 654a can be used to determine which learning path from multiple learning paths 602a, 602b should be presented to a particular student. In this manner, the portion of the course 500 includes different methods (e.g., formats, styles, etc.) of presenting the content associated with a measurable learning outcome 510, 520, 530, 540. For example, in some embodiments, an adaptive decision point 654a contains references and/or logic that determines which learning path should be presented to the student. In some embodiments, for example, the adaptive decision point 654a can use one or more criteria in conjunction with the logic to determine which learning path 602a, 602b should be presented to the student. In such embodiments, for example, a first learning path can be a remedial learning path and a second path can be an advanced learning path. If a student performs above a first threshold on an assessment (e.g., assessment 652') the adaptive decision point 654a can determine that the course content associated with the advanced learning path (e.g., learning path 602a) can be presented to the student. If the student performs below a second threshold on the assessment, the adaptive decision point 654a can determine that the course content associated with the remedial learning path (e.g., learning path 602b) can be presented to the student. If the student performs between the first threshold and the second threshold, the course content associated with a standard learning path (not shown in FIG. 6) can be presented to the student.

In addition to using results from an assessment, the adaptive decision point 654a can rely on any other suitable data or input to determine which learning path 602a, 602b will be presented to the student. For example, such input can include whether the student completed a learning object (e.g., learning activity 650), the time needed to complete a learning object and/or an assessment (e.g., assessment 652'), the percentage of correct answers provided on an assessment, an answer to a single question on an assessment and/or in a learning activity, a comparison on how the student performed in a previous assessment and/or learning activity (e.g., time to complete, percentage of correct answers, etc.), a comparison of the student's results with other students' results and/or the like. In such embodiments, for example, the criteria can be similar to the criteria shown and described in U.S. patent application Ser. No. 11/896,484 entitled "Multimedia System and Method for Teaching Basal Math and Science," filed Aug. 31, 2007, which is incorporated herein by reference in its entirety.

Additionally, in some embodiments, the input can include a demographic and/or student classification (e.g., whether the student is gifted, a special education student, an English as a second language student, etc.), the progress of the student (e.g., is the student ahead of schedule, behind schedule), the comparison of the age of the student to the grade level of the material (e.g., a third grade student reading at a first grade level might want to move quickly to catch up) and/or the like. In some embodiments, the input can also include the number of times a student has attempted an assessment and/or an assessment item, the number of times a student has attempted a learning activity, an average score of the assessments taken by the student associated with a given learning objective record, the number of activities associated with a given learning objective record the student has completed and/or the like.

In other embodiments, the adaptive decision point 654a can rely on data specific to the particular student to determine which learning path 602a, 602b to present to the student. For example, such input and/or data can include an interest of a student, a learning style of a student, the student's schedule, the student's personal goals, the student's current mastery levels, the content that the student has previously completed, a status of the student's family, a status of the student's health and/or the like. For example, in some embodiments the educational delivery system 110 can present content associated with the measurable learning outcome 530 from the first path 602a to a student who excels and/or has interest in music, but can present the content associated with the measurable learning outcome 530 from the second path 602b to another student who excels and/or has interest in sports. As another example, the course content from the first path 602a can be presented to a student with dyslexia while the course content from the second path 602b can be presented to a student with a history of eye problems.

In some embodiments, the learning path presented to a student can be defined by the learning environment of the student. For example, if a student is receiving the portion of the course 500 in a virtual school, the educational delivery system 110 can present a different learning path than a student who is receiving the portion of the course 500 at a tutoring center. Additionally, a different learning path can be presented to a student with access to certain materials and/or capabilities (e.g., a projector, a DVD player, a high-speed internet connection, etc.) than presented to a student without access to such materials and/or capabilities. In other embodiments, a student's learning path is dynamically tailored and assembled as a student proceeds through a sequence of measurable learning outcomes, as further described herein.

In still other embodiments, the adaptive decision point can allow a student, a teacher and/or a learning coach to determine and/or choose the learning path that will be presented. Said another way, when a student reaches an adaptive decision point (e.g., adaptive decision point 654a or 654b) in a course, the student can manually select the learning path to receive.

In some embodiments, learning objects, assessments 652, and teaching strategy items 656 can be associated with multiple measurable learning outcomes. For example, the assessment 652' can be associated with both the measurable learning outcome 510 and the measurable learning outcome 520. The assessment 652' can assess a student's collective knowledge of both the measurable learning outcome 510 and the measurable learning outcome 520. Further, in some embodiments, the assessment 652' can assess the student's ability to integrate the measurable learning outcome 510 with the measurable learning outcome 520.

While the portion of the course 500 is shown as having four measurable learning outcomes 510, 520, 530, 540, a full course can have any number of measurable learning outcomes linked together by one or more learning paths. For example, in some embodiments, a course can include and/or be based on 100 or more measurable learning outcomes for a semester-long course. In other embodiments, a course can include and/or be based on fewer than four measurable learning outcomes.

Figure 7:
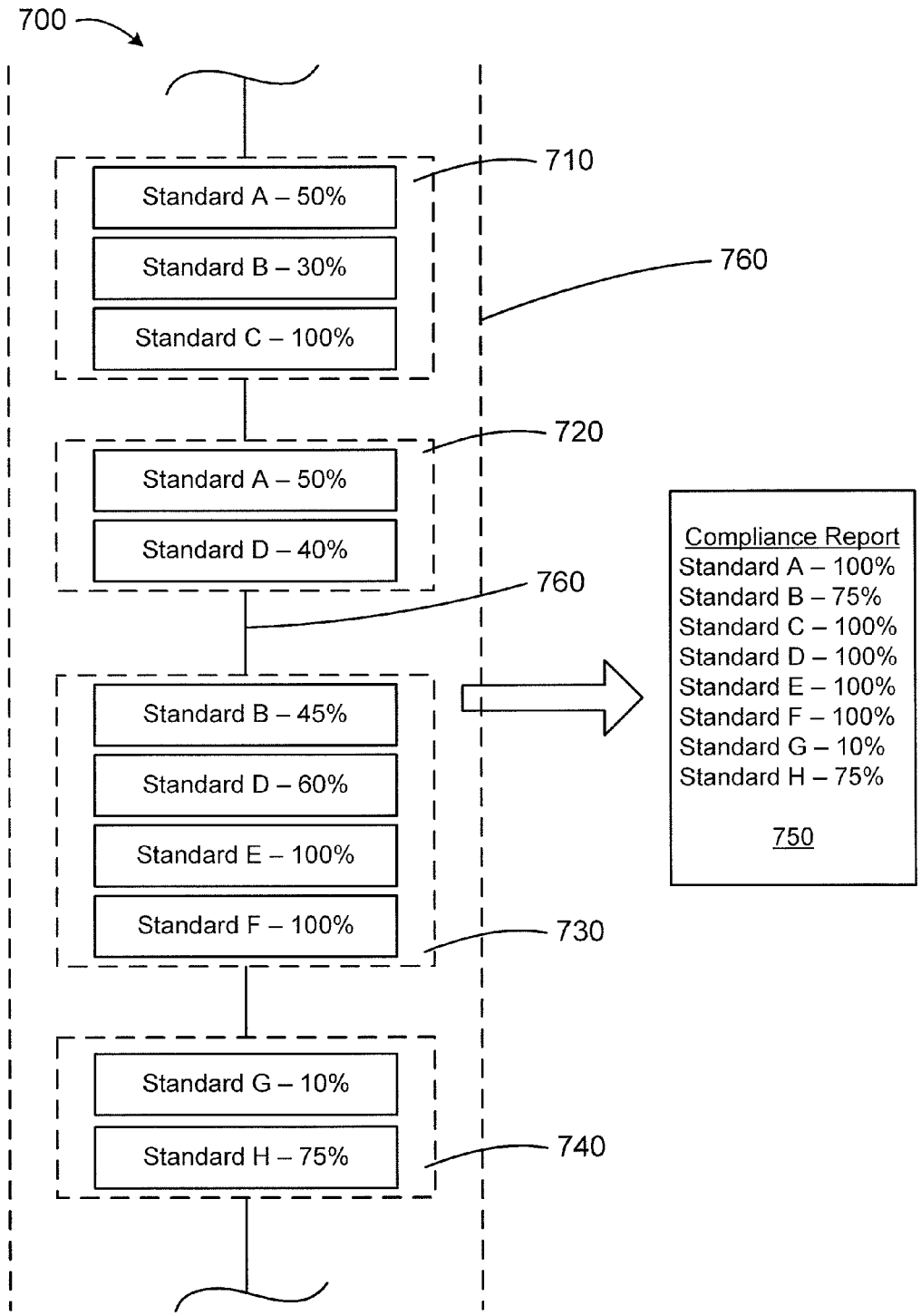
FIG. 7 is a schematic illustration of a portion of a course related to multiple learning standards, according to an embodiment.

FIG. 7 is a schematic illustration of a portion of a course 700 produced by the CMS 140 related to and/or configured to comply with multiple learning standards, according to an embodiment. The standards, which are identified as Standards A-H, can be, for example, a set of state learning standards for the portion of the course 700. The portion of the course 700 includes multiple measurable learning outcomes 710, 720, 730, 740 and can be similar to the portion of the course 500, shown and described above. The measurable learning outcomes 710, 720, 730, 740 collectively define a learning objective sequence 760. Each measurable learning outcome 710, 720, 730, 740 is associated with one or more standards from the standards database 250 via the learning objective records 312. For example, the measurable learning outcome 710 is associated with Standard A, Standard B and Standard C.

In some embodiments, presentation of educational material associated with a measurable learning outcome can correspond to compliance and/or partial compliance with one or more of the Standards A-H. As described above, for example, each learning objective record with which the measurable learning outcomes 710, 720, 730, 740 are associated, can assign an associated standard a numerical value between 0 and 100 to indicate the percent that presentation of the educational material of the measurable learning outcome 710, 720, 730, 740 associated with the learning objective record satisfies the standard. For example, presentation of course content associated with the measurable learning outcome 710 can result in a 50% compliance of Standard A, a 30% compliance of Standard B and a 100% compliance of Standard C. Accordingly, presentation of course content associated with the measurable learning outcome 710 fully satisfies Standard C while another measurable learning outcome must be presented to completely satisfy Standard A and Standard B. For example, Standard A is satisfied with the presentation of the measurable learning outcome 710 and the presentation of the measurable learning outcome 720. As such, one or more measurable learning outcomes can be presented to comply with one or more standards.

As shown in FIG. 7, a compliance report 750 can be generated for a portion of a course 700 to determine which standards are satisfied by the presentation of the portion of the course 700. For example, the compliance report 750 shows the standards that are satisfied by the presentation of the course content (e.g., learning activities, assessments, learning modules, units, teaching strategy items) associated with the measurable learning outcomes 710, 720, 730, 740. The compliance report 750 also shows the standards that are only partially satisfied by the presentation of the course content associated with the measurable learning outcomes 710, 720, 730, 740. In such a manner, a course developer and/or CMS 140 can ensure that the portion of the course 700 complies with the applicable standards. Additionally, in some embodiments, one or more compliance reports can be produced to detail the standards that the portion of the course 700 satisfies. For example, a report can be produced for each organization having standards that the presentation of the portion of the course 700 satisfies. In such embodiments, for example, a first report can be generated to show the standards of a first state (e.g., Virginia) satisfied by the presentation of the portion of the course 700 and a second report can be generated to show the standards of a second state (e.g., California) satisfied by the presentation of the portion of the course 700. In other embodiments, a single report can be generated that shows all of the standards satisfied by the presentation of the portion of the course 700.

In some embodiments, if a deficiency is found in the compliance report 750, a course can be automatically updated to remedy the deficiency. For example, if Standard B is only 75% satisfied by the presentation of the portion of the course 700, the portion of the course 700 can be automatically updated such that presentation of the portion of the course 700 completely satisfies Standard B. This can be accomplished by including course content associated with one or more learning objective records that satisfy the remaining 25% of Standard B into the portion of the course 700. Said another way, if the portion of the course 700 includes educational material associated with a first set of measurable learning outcomes and a compliance report 750 determines that presentation of the portion of the course 700 fails to completely satisfy a standard (e.g., Standard B), the CMS 140 can update the portion of the course 700 to include a second set of learning objectives configured to remedy the deficiency. Accordingly, if a standard is modified and/or updated, a compliance report 750 can determine deficiencies in one or more courses and in response, the CMS 140 can update the courses to comply with the standard.

Figure 8:
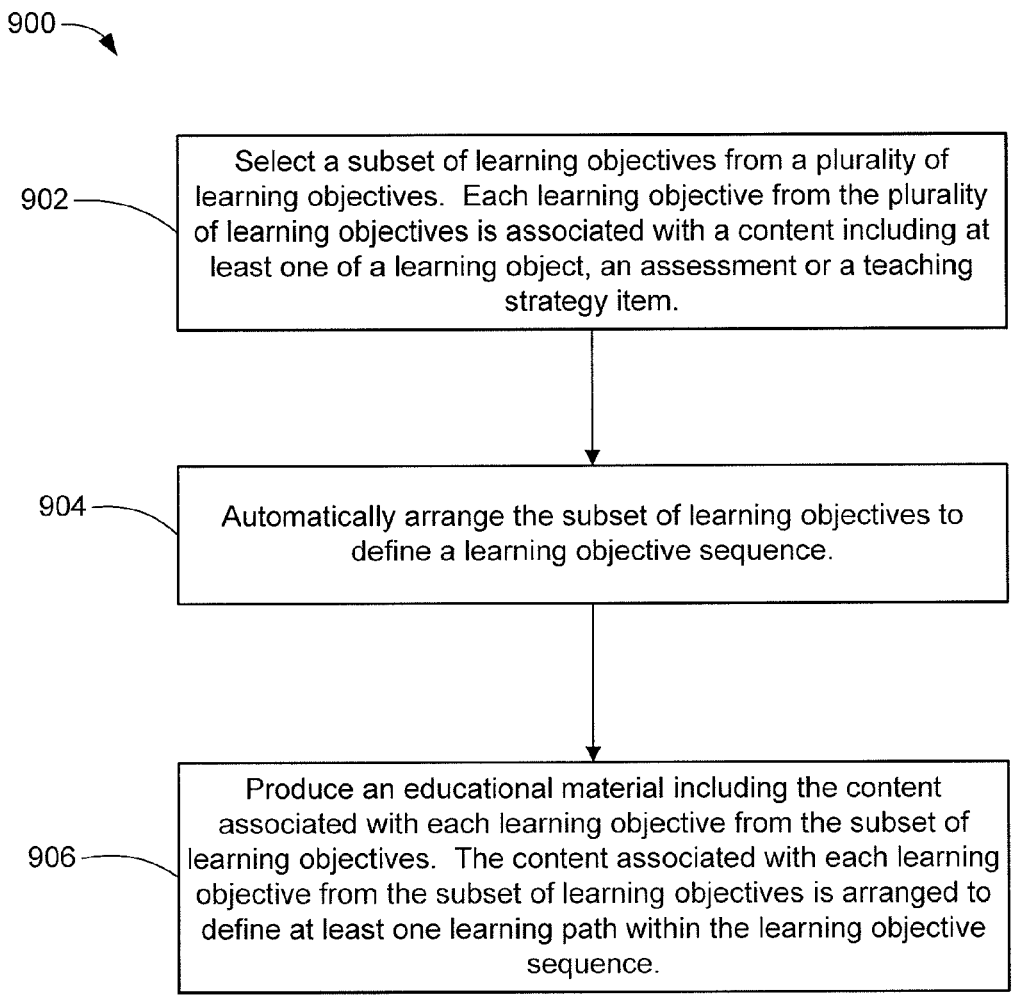
FIG. 8 is a flow chart illustrating a method of producing an educational material, according to an embodiment.

FIG. 8 is a flow chart illustrating a method 900 of producing, developing and/or revising an educational material, according to an embodiment. The method 900 includes selecting a subset of learning objectives from a plurality of learning objectives, at 902. Each learning objective from the plurality of learning objectives is associated with a content including at least one of a learning object, an assessment or a teaching strategy item. In some embodiments, each learning objective from the plurality of learning objectives can be a measurable learning outcome (e.g., measurable learning outcomes 510, 520, 530, 540 shown and described with reference to FIG. 5). In some embodiments, for example, the learning objectives can be stored in a learning objectives database and/or associated with a learning objective record similar to the learning objectives database 240 and/or the learning objective records 312, shown and described above.

In some embodiments, the learning object can include learning activities (e.g., an on-line visual activity, an off-line activity with a manipulative, a Flash activity or the like), connecting items, units, learning modules, courses and/or the like. In some embodiments, the assessment can be any activity and/or collection of activities that assesses a student's knowledge of a particular concept. In such embodiments, an assessment can include multiple-choice questions, true-false questions, essay questions, manipulatives, presentations, reports, projects and/or the like. In some embodiments, the learning object or assessment can be a physical item and/or a visual description of a physical item. For example, the learning object or assessment can be, for example, a chemistry experiment, an art project (e.g., a painting, a drawing, etc.), playing a musical instrument, playing a sport, and/or the like.

In some embodiments, the teaching strategy item can be any content associated with a learning philosophy database (e.g., learning philosophy database 260) that is configured to be presented to a teacher and/or a learning coach. Teaching strategies can aid the teacher 164 and/or the learning coach 162 in assisting the student 160 with learning activities and/or assessments.

The subset of learning objectives is automatically arranged to define a suggested learning objective sequence, at 904. The learning objective sequence can be similar to the learning objective sequence 502 shown and described above (see e.g., FIG. 5). In some embodiments, a course developer can manually edit the suggested learning objective sequence. An educational material including the content associated with each learning objective from the subset of learning objectives is produced, at 906. The content associated with each learning objective from the subset of learning objectives is arranged to define at least one learning path within the learning objective sequence. The at least one learning path can be similar to the learning paths 602a, 602b in FIG. 6. In some embodiments, the learning path can be an adaptive learning path dynamically defined as the student progresses through a course, as further described herein.

Figure 9:
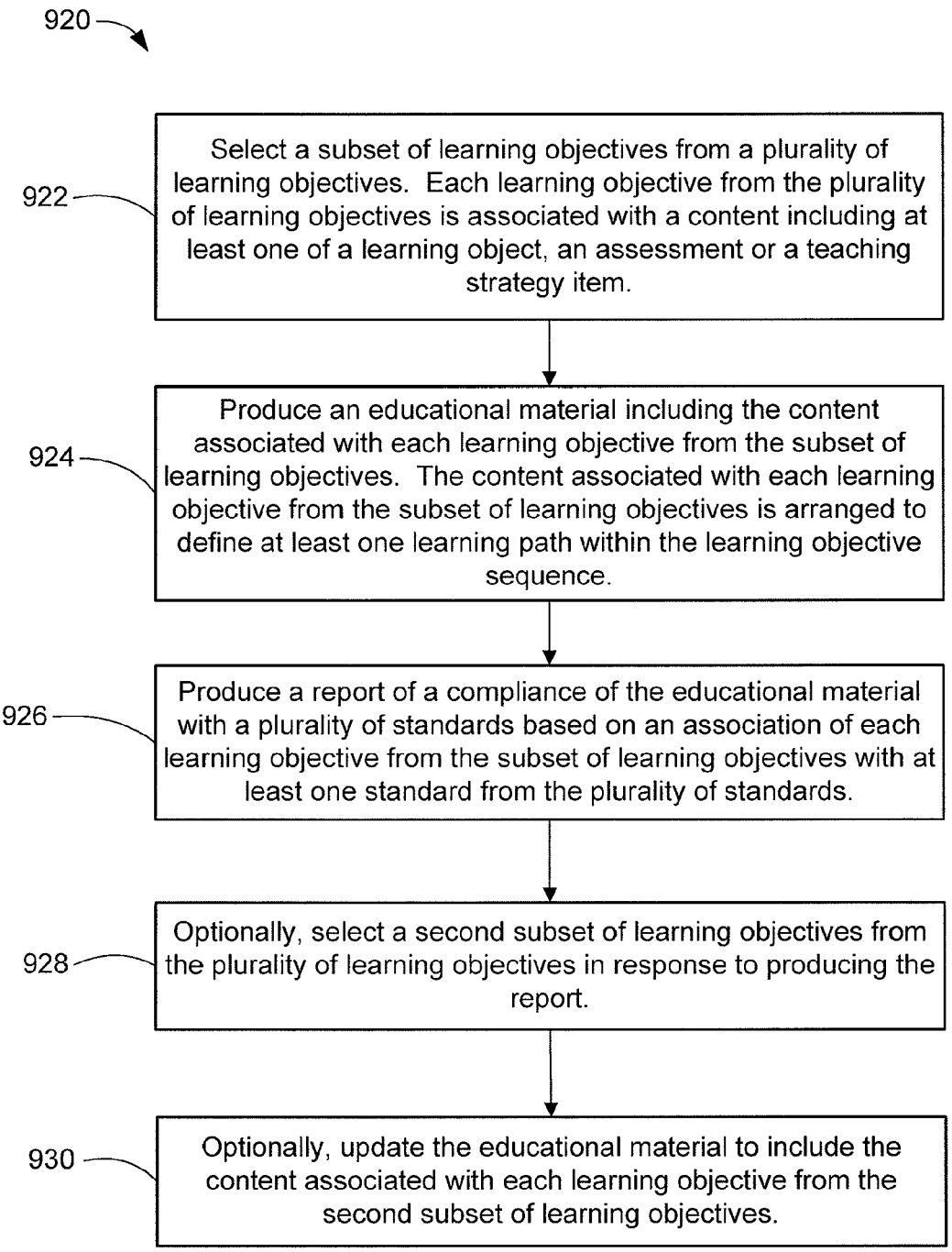
FIG. 9 is a flow chart illustrating a method of producing an educational material, according to an embodiment.

FIG. 9 is a flow chart illustrating a method 920 of producing, developing and/or revising an educational material, according to an embodiment. The method 900 includes selecting a subset of learning objectives from a plurality of learning objectives, at 922. Each learning objective from the plurality of learning objectives is associated with a content including at least one of a learning object, an assessment or a teaching strategy item. In some embodiments, each learning objective from the plurality of learning objectives can be a measurable learning outcome (e.g., measurable learning outcomes 510, 520, 530, 540 shown and described with reference to FIG. 5). In some embodiments, for example, the learning objectives can be stored in a learning objectives database and/or associated with a learning objective record similar to the learning objectives database 240 and/or the learning objective records 312, shown and described above.

In some embodiments, the selecting the subset of learning objectives can be done in any suitable manner. As described above in relation to the learning objectives database 240, the subset of learning objectives can be selected automatically by the CMS, manually by a course developer or a combination of automatic and manual selection. In some embodiments, for example, the learning objectives database can be queried based on metadata associated with the learning objective records to return learning objective records that match criteria associated with the query.

An educational material including the content associated with each learning objective from the subset of learning objectives is produced, at 924. The content associated with each learning objective from the subset of learning objectives is arranged to define at least one learning path within the learning objective sequence. The at least one learning path can be similar to the learning paths 602a, 602b in FIG. 6. In some embodiments, the learning path can be an adaptive learning path dynamically defined as the student progresses through a course, as further described herein.

A report of a compliance of the educational material with a plurality of standards based on an association of each learning objective from the subset of learning objectives with at least one standard from the plurality of standards is produced, at 926. In some embodiments, for example, the presentation of course content associated with each learning objective is associated with at least a partial compliance of at least one standard from the plurality of standards produced. In some embodiments, the report of compliance can be similar to the compliance report 750 shown and described in relation to FIG. 7.

Optionally, a second subset of learning objectives is selected from the plurality of learning objectives in response to producing the report, at 928. Optionally, the educational material is updated to include the content associated with each learning objective from the second subset of learning objectives, at 930. In this manner, the educational material can be revised and/or updated to comply with a set of standards. In some embodiments, the second subset of learning objectives can be used to obtain full compliance of the at least one standard from the plurality of standards. Said another way, presentation of the course content associated with both the first subset of learning objectives and the second subset of learning objectives can result in full compliance with the at least one standard. In some embodiments, the educational material is automatically updated with the content associated with each learning objective from the second subset of learning objectives to remedy deficiencies in the educational material, as described above. In other embodiments, the content associated with each learning objective from the second subset of learning objectives is presented to a course developer who can determine whether to include and where to include the content within the course. Accordingly, educational material can be easily developed, updated and/or revised to comply with new standards, changing standards and/or the like.

While shown and described above with respect to FIG. 6 as defining static learning paths (e.g., 602a, 602b) within the learning objective sequence 502, in other embodiments, the scope and sequence engine 210 can dynamically define and/or individually tailor any number of learning paths within the learning objective sequence 502. In such embodiments, each student can receive educational content on a learning path individually tailored for the student. Moreover, the learning path can be defined, updated and/or revised as the student progresses through the course and/or receives course content.

In some embodiments, for example, educational material presented to a student can be dynamically defined as the student progresses through the sequence of measurable learning outcomes (e.g., learning objective sequence 502). For example, after a learning activity, an assessment, a learning module, a lesson, or a unit is presented to a student, the scope and sequence engine 210 can execute logic and/or a rule set to determine the next course content to be delivered to the student. The logic can be based on any of the criteria discussed above in relation to the adaptive decision points 654a, 654b, shown and described with reference to FIG. 6. After the scope and sequence engine 210 executes the logic, it can query the learning modules database 220, the activities database 234 and/or the assessments database 274 for a suitable learning module, learning activity and/or assessment to include with the educational material 280. In some embodiments, for example, the scope and sequence engine 210 can retrieve a learning activity, an assessment, a learning module, a lesson and/or a unit from a subset of learning activities, assessments, learning modules, lessons and/or units associated with the student's data. For example, a student who is identified as a visual learner, has been sick for the past week, received a 85% on a fourth grade math assessment that he took 90 minutes to complete can receive a different learning module along a different learning path than a student who learns best by reading, has not been sick, received a 90% on the fourth grade math assessment that she took 60 minutes to complete. In such a manner, the scope and sequence engine 210 can dynamically produce and/or deliver course content specifically tailored to a student's needs. Additionally, in such a manner, the educational delivery system 110 can dynamically define and reassess the learning path for a particular student after each learning module, learning activity, assessment, lesson or unit presented to the student. Accordingly, any number of learning paths can be dynamically defined as the students proceed along the learning objective sequence (e.g., learning objective sequence 502) defined by the arrangement of the measurable learning outcomes.

Figure 10:
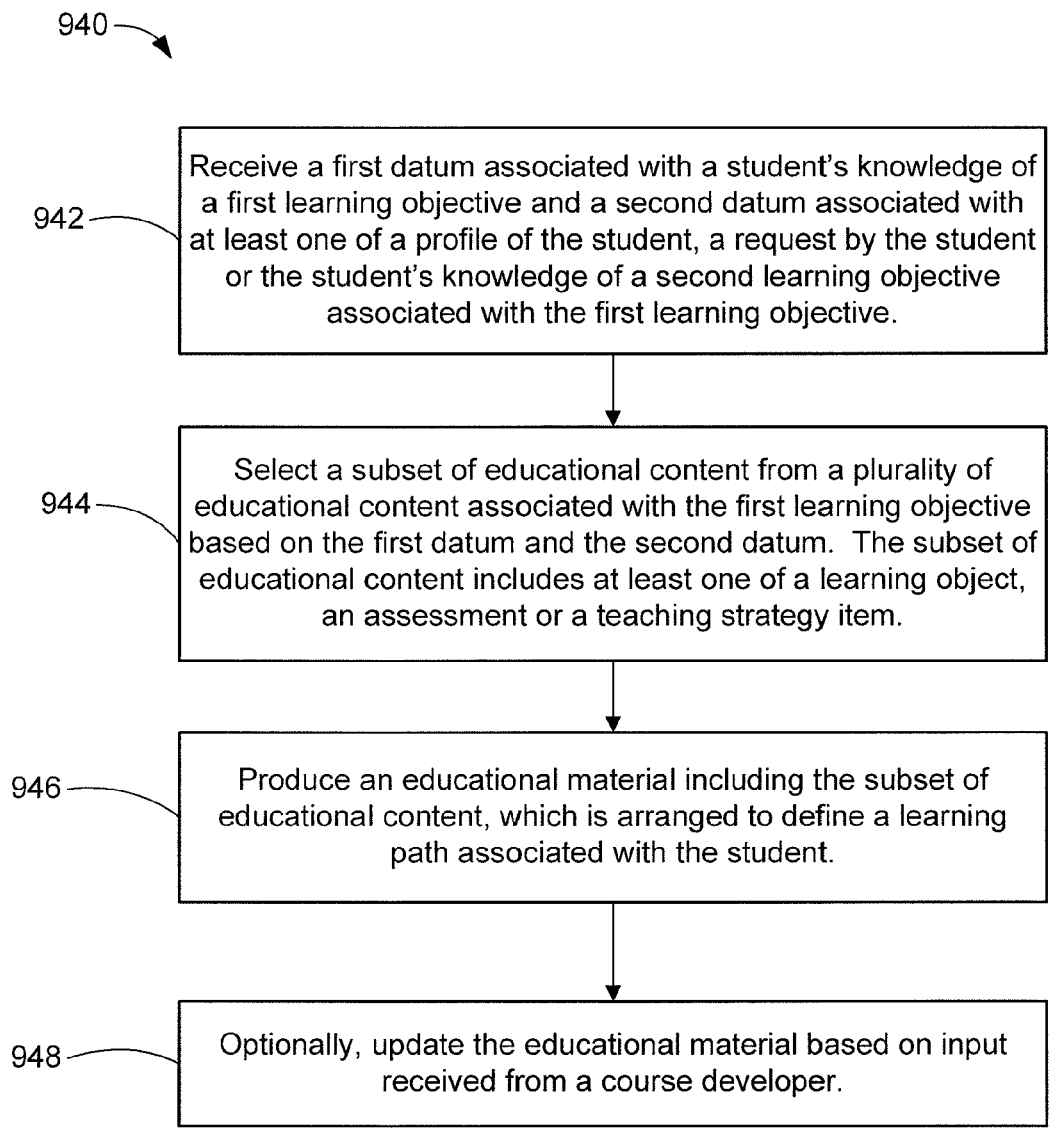
FIG. 10 is a flow chart illustrating a method of dynamically producing educational material for a student, according to an embodiment.

FIG. 10 is a flow chart illustrating a method 940 of dynamically producing, developing and/or revising educational material, according to an embodiment. The method includes receiving a first datum associated with a student's knowledge of a first learning objective and a second datum associated with at least one of a profile of the student, a request by the student or the student's knowledge of a second learning objective associated with the first learning objective, at 942. In some embodiments, the first datum can include the results of an assessment. In some embodiments, the second datum can be similar to the criteria described above in relation to the adaptive decision points 654a, 654b, shown and described with reference to FIG. 6. In such embodiments, the second datum can be a student specific criteria, such as, for example, an interest of a student, a learning style of a student, the student's schedule, the student's personal goals, the student's current mastery levels, the content that the student has previously completed, a status of the student's family, a status of the student's health and/or the like. In some embodiments, the second datum can be associated with a measurable learning outcome previously presented to the student. For example, if the first datum is a score on a ninth grade algebra test, the second datum can be associated with a measurable learning outcome associated with fourth grade fractions with which the student previously struggled. In other embodiments, the second datum can be any measurable learning outcome associated with and/or linked to a measurable learning outcome associated with the first datum (e.g., through the learning objectives database 240). Said another way, the measurable learning outcome of the first learning objective can be linked to the measurable learning outcome of the second learning objective. In such a manner, the first datum and the second datum can be used to dynamically define an individualized learning path for the student.

A subset of educational content is selected from a plurality of educational content associated with the first learning objective based on the first datum and the second datum, at 944. The subset of educational content includes at least one of a learning object, an assessment or a teaching strategy item. In some embodiments, for example, the subset of educational content is associated with records from the learning modules database (e.g., 220), the activities database (e.g., 234), the learning philosophy database (e.g., 260) and/or the assessments database (e.g., 274).

An educational material including the subset of educational content is produced, at 946. The educational content is arranged to define a learning path associated with the student. Said another way, the educational material is selected specifically for the individual student. Accordingly, any number of learning paths can be defined based on the various situations, skill levels, interests and/or needs of the student. Optionally, the educational material is updated based on input received from a course developer, at 948. This allows a course developer to manually add, remove and/or revise the educational material. Accordingly, the course developer can further tailor the educational material to the individual student's needs.

In some embodiments, dynamically defined learning paths can be used in conjunction with a statically defined learning path to remove content from a course that the student has already received or mastered and/or remove non-critical content from a course to allow a student to catch up. Similarly, in some embodiments, dynamically defined learning paths can be used to add content to a course to help a student who has been identified via the first datum and/or the second datum as struggling with a particular concept. In some embodiments, dynamically defined learning paths can be used to add additional content based on the end-user's interest in a particular subject and/or concept (in response to the first datum and/or the second datum). In other embodiments, dynamically defined learning paths can be used to manage the delivery of course content to a student. In such embodiments, for example, a student who is ahead of schedule can be given additional material to ensure that they finish the course around the same time as other students or in accordance with a predefined schedule. In still other embodiments, dynamically defined learning paths can be used to provide additional assessments to monitor a particular student's progress. In such embodiments, for example, a student that has been struggling might need closer monitoring than a student has not previously struggled. Such monitoring can be used, for example, to ensure that a student has retained mastery of a learning objective previously mastered.

In some embodiments, educational content (e.g., a learning object, an assessment, a module, a teaching strategy or the like) associated with a temporal event can be positioned within and/or added to a learning objective sequence and/or a learning path of an educational material (e.g., a course) prior to delivery of the educational material to a student. Similarly stated, the educational material can be dynamically updated to include content related to a temporal event, configured to be presented at a certain time and/or including time-sensitive material. Such temporal events can include general temporal events, such as, for example, a season, a specific date (e.g., a holiday, a date of a historical event and/or the like), a current event or the like. Such temporal events can also include temporal events specific to a student, such as, for example, the student's birthday, the amount time since the student last reviewed a particular concept, the number of times the student has logged in to the system and/or the like. In this manner, the educational material can be tailored to include content related to a temporal event, some of which can be unique to a particular student.

Figure 11:
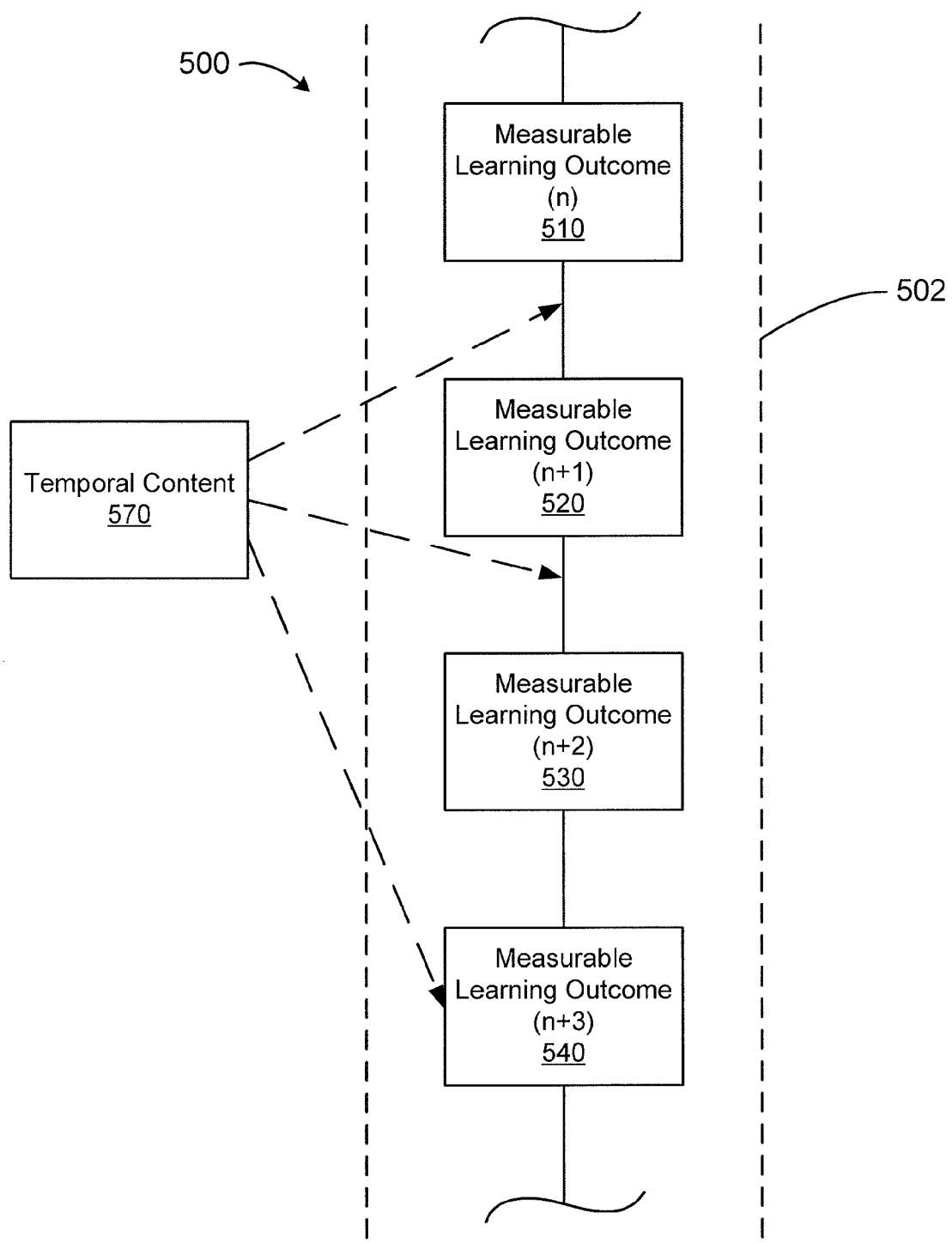
FIG. 11 is a schematic illustration of the portion of the course shown in FIG. 5 amended to include a temporal content, according to an embodiment.

FIG. 11 shows the learning objective sequence 502 of the course 500 described above in relation to FIG. 5 modified to include a temporal content 570 associated with a temporal event. The temporal content 570 can be, for example, a learning object that presents a multi-media explanation of the history of the signing of the Declaration of Independence. In this example, temporal event to which the temporal content 570 is associated can be the Fourth of July. Another example of a temporal content 570 is a formative assessment that presents questions to the student regarding the hurdles that Jackie Robinson overcame in breaking the color barrier in professional baseball. In this example, the temporal event to which temporal content 570 is associated can be the dates of the World Series. In yet another example, the temporal content 570 can be specific to the student and can include an assessment covering the last five lessons received. In this example, the temporal event to which the temporal content 570 is associate can be the dates of the last five times the student logged in to the system.

As shown in FIG. 11, the temporal content 570 can be placed at any suitable position within the learning objective sequence 502. For example, the temporal content 570 can be positioned between two measurable learning outcomes (e.g., between measurable learning outcome 510 and measurable learning outcome 520) or within a measurable learning outcome (e.g., measurable learning outcome 540). More particularly, the position of the temporal content 570 is based on a time and/or date associated with the presentation of the temporal content 570 to the student. In some embodiments, this arrangement can result in the temporal content 570 being positioned within the learning objective sequence at a position associated with the date of temporal event, as described above. In this manner, the temporal content 570 can be presented to an end-user at the desired time, regardless of the position of the other educational content associated with the measurable learning outcomes 510, 520, 530, 540 within the learning objective sequence 502. Moreover, this arrangement allows the course 500 to be tailored to include temporally-related and/or temporally sensitive content at the desired point in time for each student.

Figure 12:
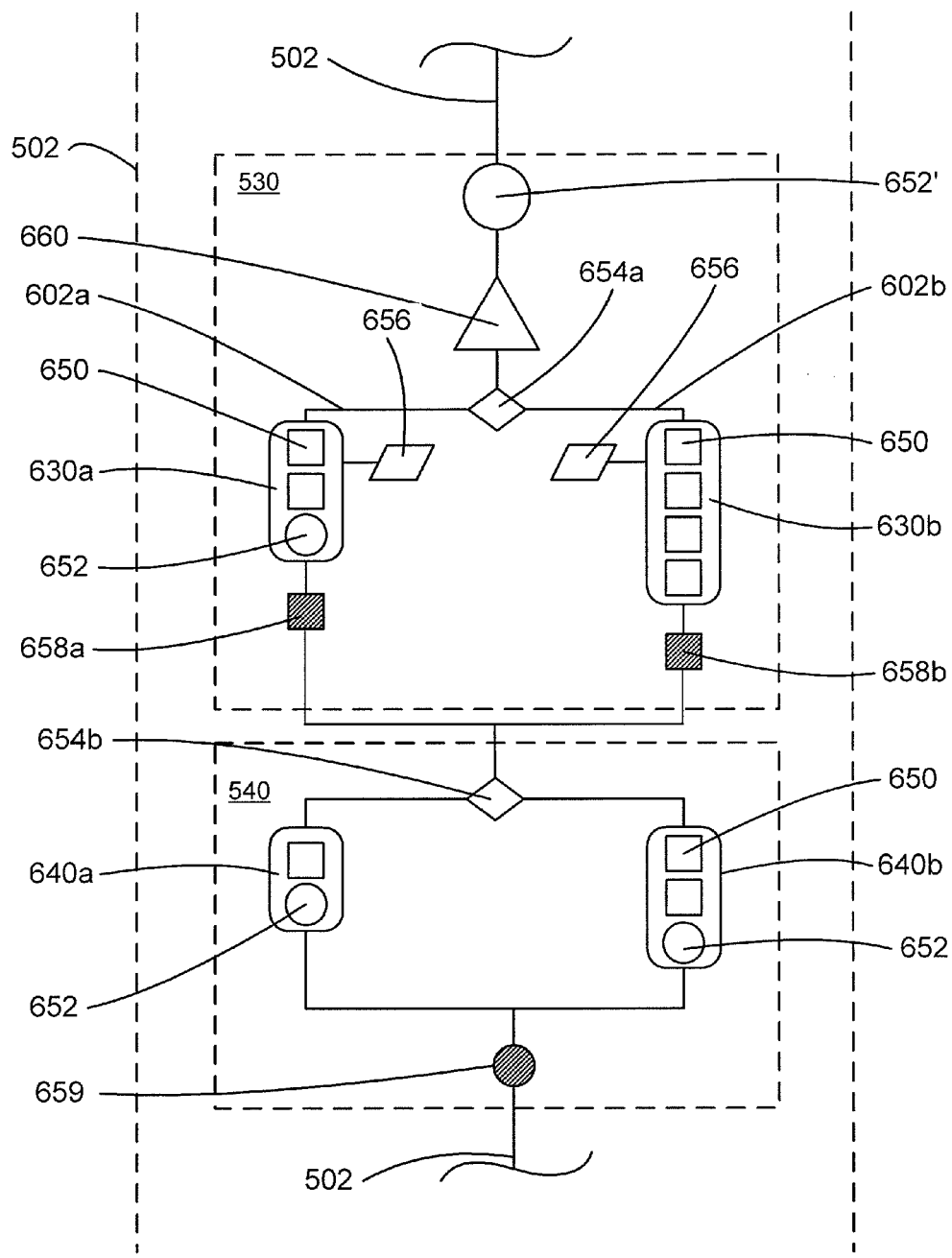
FIG. 12 is a detailed schematic illustration of the portion of the course of FIG. 11.

FIG. 12 is a detailed view of a portion of the modified learning objective sequence 502 shown in FIG. 11. The temporal content, which was shown generally as temporal content 570 in FIG. 11, is shown more specifically as the shaded boxes in FIG. 12. In particular, the temporal content can include temporal learning activities 658a, 658b and temporal assessments 659. As shown in FIG. 12, a temporal learning activity 658a is positioned within the learning path 602a. Similarly, a temporal learning activity 658b is placed and/or infused within the learning path 602b. Thus, course 500 includes the content associated with the measurable learning outcome 530 and the temporal content 658a, 658b arranged to define one or more learning paths (e.g., learning path 602a and learning path 602b). As shown in FIG. 12, the temporal content 658a, 658b can be included within each learning path, thus ensuring that all students will receive the temporally-related content regardless of the learning path traversed by the student. Moreover, although the temporal learning activity 658a and the temporal learning activity 658b are positioned as the last item of content presented within the measurable learning outcome 530, in other embodiments, the position of the temporal content can be specific to the student, and is thus not positioned at a predetermined location with the learning objective sequence and/or the learning paths.

In some embodiments, the temporal learning activity 658a and the temporal learning activity 658b can be the same learning activity. In other embodiments, the temporal learning activity 658a and the temporal learning activity 658b can be different activities associated with the same temporal event. As such, the temporal learning activity 658b can be an alternate form of the temporal learning activity 658a. For example, the temporal learning activity 658a can be specifically tailored to students completing the measurable learning outcome 530 via the learning path 602a and the temporal learning activity 658b can be specifically tailored to students completing the measurable learning outcome 530 via the learning path 602b.

As described above, the temporal learning activities 658a, 658b can be associated with a season, a specific date (e.g., a holiday, a date of a historical event, etc.), a current event or the like. For example, the learning activities 658a, 658b can pertain to the history of the United States and can be positioned within and/or added to the portion of the course 500, learning objective sequence 502 and/or learning paths for delivery to the students on the Fourth of July (or the days surrounding the Fourth of July). The temporal learning activities 658a, 658b can also be associated with an event that is specific to the student, such as, for example, the student's birthday. In other embodiments, the temporal learning activities 658a, 658b can be associated with a relative temporal event. Said another way, the temporal learning activities 658a, 658b can be associated with a time-sensitive event that is not a fixed date. For example in some embodiments, the temporal learning activities 658a, 658b can be associated with number of times that the student has logged in to the system, the amount of time since a student last reviewed a particular concept and/or the like.

In some embodiments, the learning activities 658a, 658b can include information not yet known at the start of the course 500, but that will become known prior to the temporal event that will occur during the course 500. For example, in some embodiments, the learning activities 658a, 658b can include information about the winner of an election (e.g., the presidential election), which may not be known at the beginning of the course 500. The learning activities 658a, 658b can be positioned within and/or added to the portion of the course 500, learning objective sequence 502 and/or learning paths for delivery to the students at a time period after the date of the election. In this manner, the course 500 can be dynamically updated to include such temporally-sensitive material and/or recently developed content.

Additionally, in some embodiments, a portion of the educational content associated with one or more of the measurable learning outcomes for the course 500 may not be known at the beginning of the course 500. For example, at the time when the educational content associated with the first measurable learning outcome is delivered to the student, the educational content associated with a second measurable learning outcome to be delivered at a later time (e.g., measurable learning outcome 530, as shown in FIG. 12) may not be known and/or completed. At the time of delivery of the second measurable learning outcome, however, the educational content can be completed, updated and/or known. In this manner, the educational delivery system can produce the educational material (e.g., the course 500) in a "just-in-time" fashion.

In some embodiments, the position and/or the subject matter of the learning activities 658a, 658b can be tailored to a specific geographic location. For example, each country has holidays specific to the country. Further, each U.S. state has holidays specific to that state. For example, in Utah, July 24th is celebrated as Pioneer Day. Thus, for educational material to be delivered to students in Utah, a learning activity associated with Pioneer Day can be added to, infused in and/or placed within the educational material on July 24$^{th}$ using a temporal learning objective, as described above. In this manner, the educational material can be tailored for a specific group of students.

In some embodiments, the position and/or the subject matter of the temporal learning activities 658a, 658b can be specifically tailored to a student. For example, the temporal learning activities 658a, 658b can be further tailored based on a grade level of the student, an interest of the student, a preferred learning style of the student and/or any other criteria described herein. For example, if a student is interested in baseball, educational material about the history of baseball (e.g., a learning activity about Jackie Robinson) can be delivered to the student during the World Series.

Although the temporal content is described above as being temporal learning activities 658a, 658b, the temporal content can also include temporal assessments. For example, as shown in FIG. 12, a temporal assessment 659 is placed, added and/or infused within the module 540 according to the methods described herein. In some embodiments, the temporal assessment 659 can be, for example, a review assessment used to test a student's knowledge of content associated with a measurable learning outcome previously presented to the student. In such embodiments, for example, the temporal assessment 659 can be presented to the student a predetermined amount of time after the student finishes the content associated with the measurable learning outcome. Said another way, the temporal event that "triggers" the presentation of the temporal content (i.e., the temporal assessment) is the time and/or date on which the content was previously presented. For example, a temporal assessment 659 reviewing the addition of fractions can be presented to a student two weeks after the student finishes the content associated with adding fractions. Accordingly, regardless of the progress of the student within the learning objective sequence 502, the assessment 659 can be configured to include the appropriate content and be presented at the desired point in time.

While shown and described as being a learning activity and/or an assessment, any temporal content can be positioned within, added to, placed in and/or infused in the educational material based on temporal characteristics. For example, a summative assessment can be temporally placed within the educational material based on a student's past performance. In such an example, a student who narrowly passed an assessment can receive a more extensive review at a different point in time than that received by a student who received a high score on the assessment. In this manner, dynamically defined review material can be infused into the learning path of a student. Said another way, the educational material can be updated to include temporally-related material based on input from the educational delivery system.

Additionally, in some embodiments, the temporal content can include substantially aesthetic content related to the temporal content 570. For example, in some embodiments, the aesthetic content associated with the temporal content 570 can be a skin (e.g., a graphical theme) associated with the period of time related to the temporal content. For example, in some embodiments, the course 500 can be dynamically updated to include a skin to be presented during the week leading up to a holiday (e.g., a pumpkin theme leading up to Halloween or the like).

Figure 13:
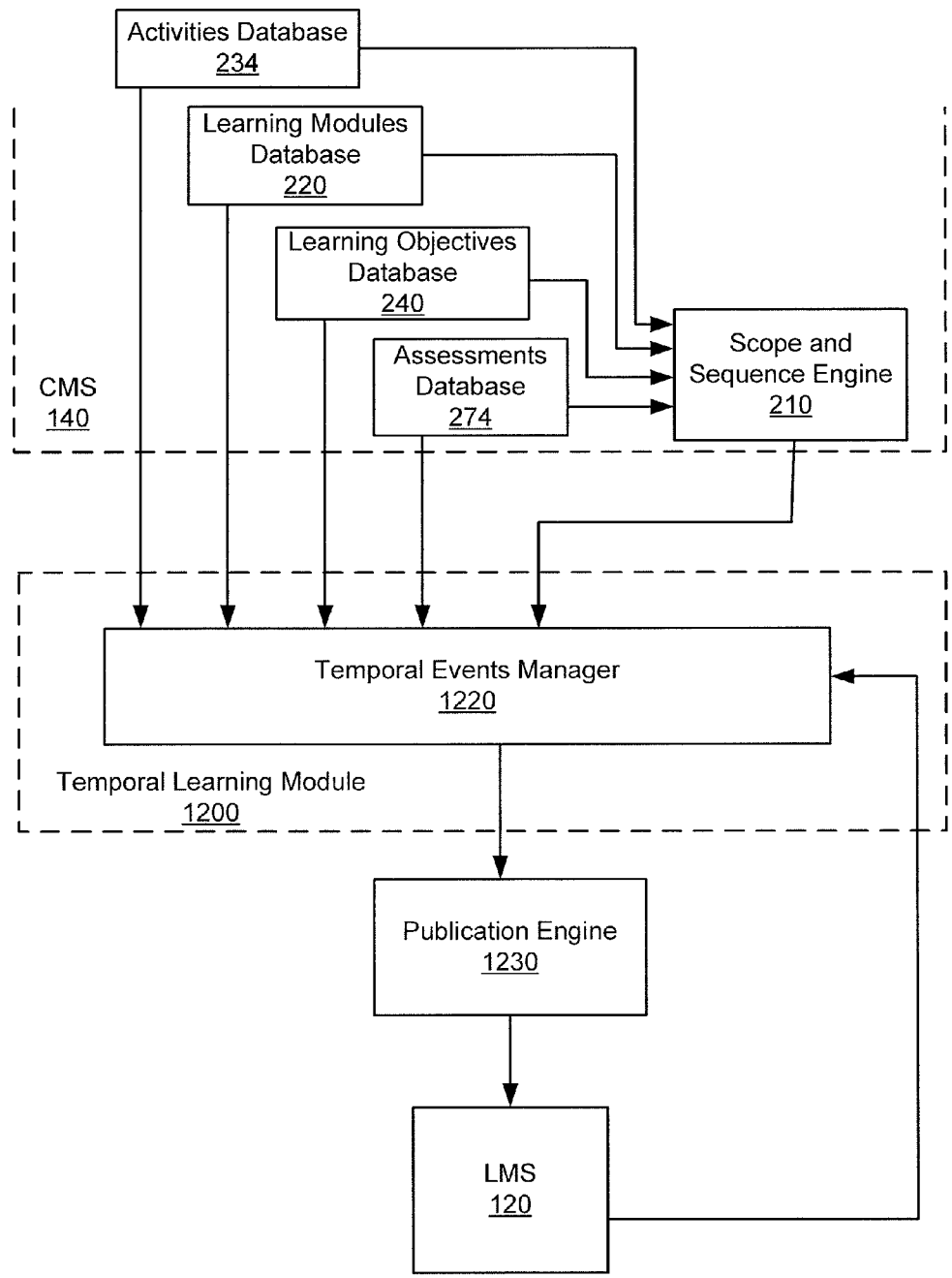
FIG. 13 is a schematic block diagram of a temporal learning module according to an embodiment.

FIG. 13 is a block diagram of a temporal learning module 1200, which includes a temporal events manager 1220. The temporal events manager 1220 is operatively coupled to the CMS 140 and to the publication engine 1230. More particularly, the temporal events manager 1220 can receive information, records and/or content from the activities database 234, the learning modules database 220, the learning objectives database 240 and the assessments database 274. The temporal events manager 1220 is also configured to receive a learning objective sequence 502 from the scope and sequence engine 210. The temporal learning engine 1210 is configured to modify the educational material (e.g., the course 500 shown in FIGS. 11 and 12) produced by the scope and sequence engine 210 (as described above) to include the temporal content (from the CMS databases) at the desired position within the learning objective sequence 502, as described above. While shown in FIG. 13 as being a separate module or "engine," in some embodiments, the temporal events manager 1220 can be a part of the scope and sequence engine 210 and/or any other portion of the CMS 140.

As described above, the temporal content can include educational content, such as learning activities, assessments, teaching strategy items and/or the like. The temporal content can include, for example, a learning object, an assessment and/or a teaching strategy item that is associated with a physical learning activity, such as, for example, instructions for using a manipulative device. As described above, the temporal content is linked to and/or associated with a temporal event, a time period, a sequence of events, or the like. The temporal association can be, for example, included within the database record for the educational content. Thus, certain content resident within the CMS databases can be used in some situations as standard (i.e., "non-temporal") content and in other situations as temporal content.

After the temporal content are positioned, added and/or placed within the learning objective sequence 502, the temporal events manager 1220 sends the modified learning objective sequence 502 to the publication engine 1230. The publication engine 1230 can then publish the educational material to the LMS 120 and/or any other delivery system and/or delivery platform, as described in further detail herein.

As shown in FIG. 13, the temporal events manager 1220 can receive input from the LMS 120 (or any other suitable educational delivery system). In this manner, the temporal events manager 1220 can receive data and/or information related to relative time periods for use in adding, positioning and/or placing the temporal content into the educational material. Such relative time periods can include, for example, the number of days since a student last received an assessment, the number of time a student has logged in since the student has received an assessment, a score received by a student on an assessment, or the like.

Figure 14:
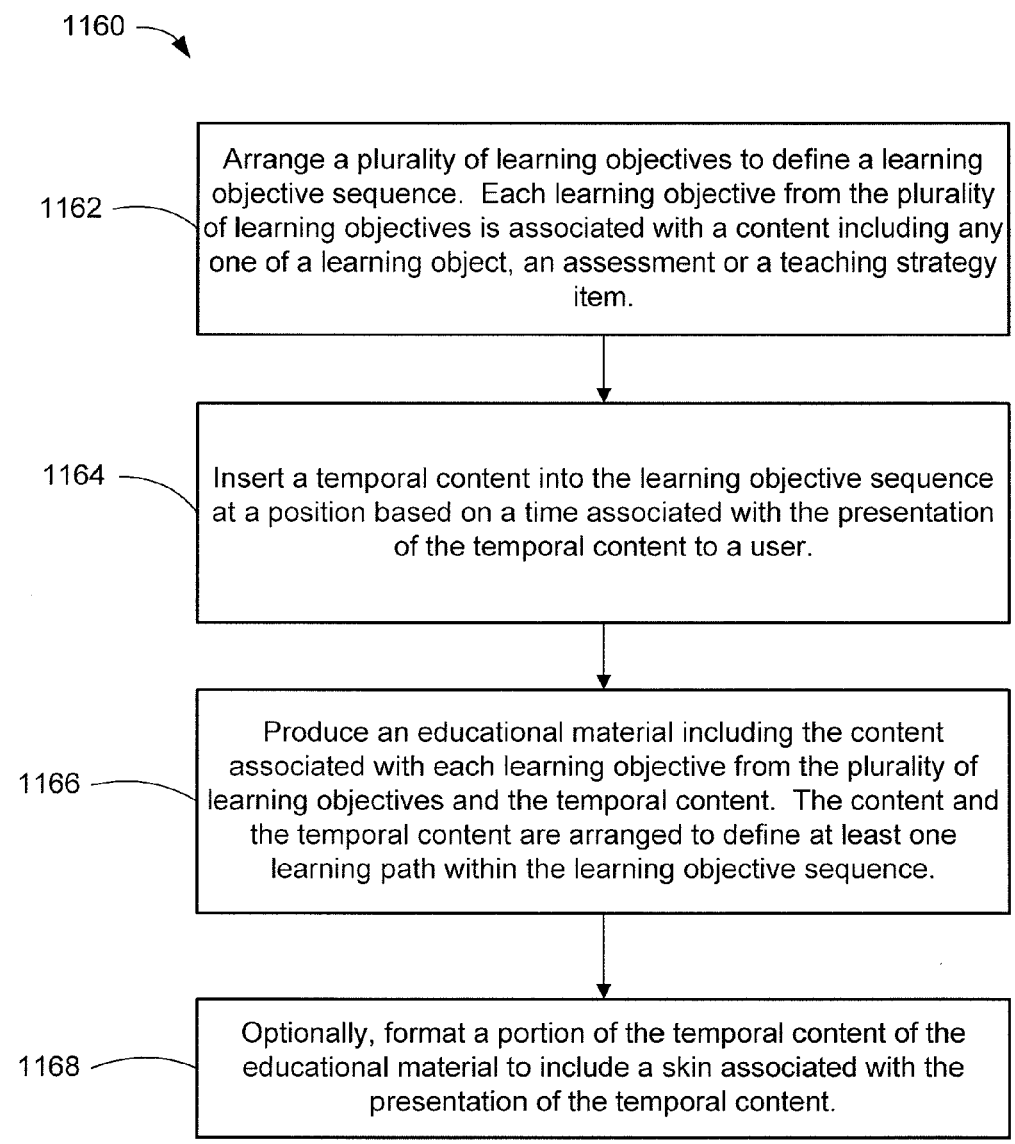
FIG. 14 is a flow chart illustrating a method of adding temporal content to an educational material, according to an embodiment.

FIG. 14 is a flow chart illustrating a method 1160 of adding temporal content to an educational material (e.g., within a learning objective sequence and/or a learning path). The method 1160 includes arranging a plurality of learning objectives to define a learning objective sequence, at 1162. Each learning objective from the plurality of learning objectives is associated with a content including any one of a learning object, an assessment or a teaching strategy item. The learning objective sequence can be similar to the learning objective sequence 502, shown and described above. Similarly, the learning objectives can be similar to the measurable learning outcomes 510, 520, 530, 540, shown and described above.

A temporal content is inserted into the learning objective sequence at a position within the learning objective sequence based on a time associated with the presentation of the temporal content to a user, at 1164. As such, the position of the temporal objective within the learning objective sequence can be based on, for example, a season, a specific date (e.g., a holiday, a student's birthday, a date of a historical event, etc.), a current event, a time period since a student last reviewed a particular concept and/or the like.

An educational material including the content associated with each learning objective from the plurality of learning objectives and the temporal content is produced, at 1166. The content and the temporal content are arranged to define at least one learning path within the learning objective sequence.

In some embodiments, a portion of the temporal content of the educational material is optionally formatted to include a skin associated the presentation of the temporal content, at 1168. The skin can be anything specific to the presentation of the educational material. The skin can be similar to the skins, shown and described in further detail herein.

In some embodiments, the content of educational material delivered to the student can be tailored to a student based on a season, a specific date, current events and/or the like. For example, if a student is interested in baseball, math story problems associated with fourth grade fractions delivered to the student during the World Series can include story problems related to baseball. For another example, if a student is interested in music and will be attending a concert, a science experiment related to music (e.g., how does a guitar make different sounds) can be provided to the student prior to their attending the concert. In such a manner, dynamically tailored educational material can be infused into the learning path of a student based on a season, a specific date, a current event and/or the like.

In some embodiments, the scope and sequence engine 210 can add dynamic assessment requestors to learning modules, units and/or courses. A dynamic assessment requestor can be similar to the assessment requestors described above in relation to the resources database 232. A dynamic assessment requestor, however, retrieves questions from a pool of questions (e.g., the assessment items database 272) in real-time as an assessment is delivered to a student according to predetermined criteria. As such, a dynamic assessment requestor can be a placeholder for a dynamically defined assessment. Said another way, an assessment can be dynamically defined and presented to a student when they reach the assessment requestor in the learning module, unit and/or course. In such embodiments, the assessment requestor can be used as an indicator to the scope and sequence engine 210 to query the assessment items database 272 for assessment items that conform to one or more criteria. For example, the assessment requestor can request multiple-choice questions dealing with ninth grade algebra.

The criteria used to define the assessment items used by the dynamic assessment requestor can be anything used to identify the desired assessment items. In some embodiments, for example, the criteria can be based on associated learning objectives, associated learning concepts, associated standards, the environment in which the assessment will be given (e.g., online, offline, in-class, at home, etc.), the grade range of the assessment items, assessment item difficulty, the type or form of the assessment item (e.g., short-answer, multiple-choice, essay, use of a physical manipulative, etc.), the number of assessment items on the assessment, the type of grading (e.g., human, computer, whether points are subtracted for wrong answers, etc.), the presentation format (online, offline, text message quiz, online game, offline presentation, etc.), the duration of the assessment (e.g., 15 minutes worth of assessment items, etc.), the type and quantity of hints to display, the type and quantity of feedback to display, and/or the like. Additionally, in some embodiments, the criteria can be specific to a particular student. For example, the criteria can be whether a student has previously received the assessment item in another assessment and/or learning activity, whether the student previously answered the assessment item incorrectly, the student's preferences, the student's skill level, whether the assessment item is associated with one or more learning objectives that the student has struggled with, the student's knowledge of another learning objective, a student's past attendance, an expectancy for the student to finish a course by a given date, a number of days remaining in a course, a comparison of a profile of the student with past student's having similar profiles and/or the like. Further, in some embodiments, the assessment items can be defined based on the student, teacher and/or the learning coach requesting the assessment. Using such criteria, the educational delivery system can dynamically define an assessment for a student.

In some embodiments, each student taking the assessment can have different assessment items and/or the assessment items in a different order. Thus, the assessment can include any number of combinations of the assessment items used to define the assessment. Further, in some embodiments, the assessment items and/or the order of the assessment items are selected and/or arranged based on criteria specific to a particular student similar to the criteria described in relation to the adaptive decision point 654*a*, 654*b* in relation to FIG. 6. In such embodiments, for example, a student who takes quizzes better online than offline can receive an online quiz while a student who takes quizzes better offline than online can receive an offline quiz. Similarly, for example, a student who is identified as a visual learner can receive different assessment items than a student who learns best by reading. In other embodiments, the assessment items are drawn from the assessment items database and/or another assessment items pool at random.

Additionally, in some embodiments, a course developer can define an assessment item pool from which a dynamic assessment requestor can pull assessment items from. Said another way, the course developer can search the assessment items database and manually choose the assessment items that a dynamic assessment requestor can use in the dynamically defined assessment. In such embodiments, the course developer creates a subset of assessment items from the assessment items in the assessment items database 272 and the scope and sequence engine 210 can use the assessment items within the subset to define the assessment. In some embodiments, the criteria described above can be used to define the subset of assessment items and/or query the subset of assessment items for assessment items to be included on the assessment.

Figure 15:
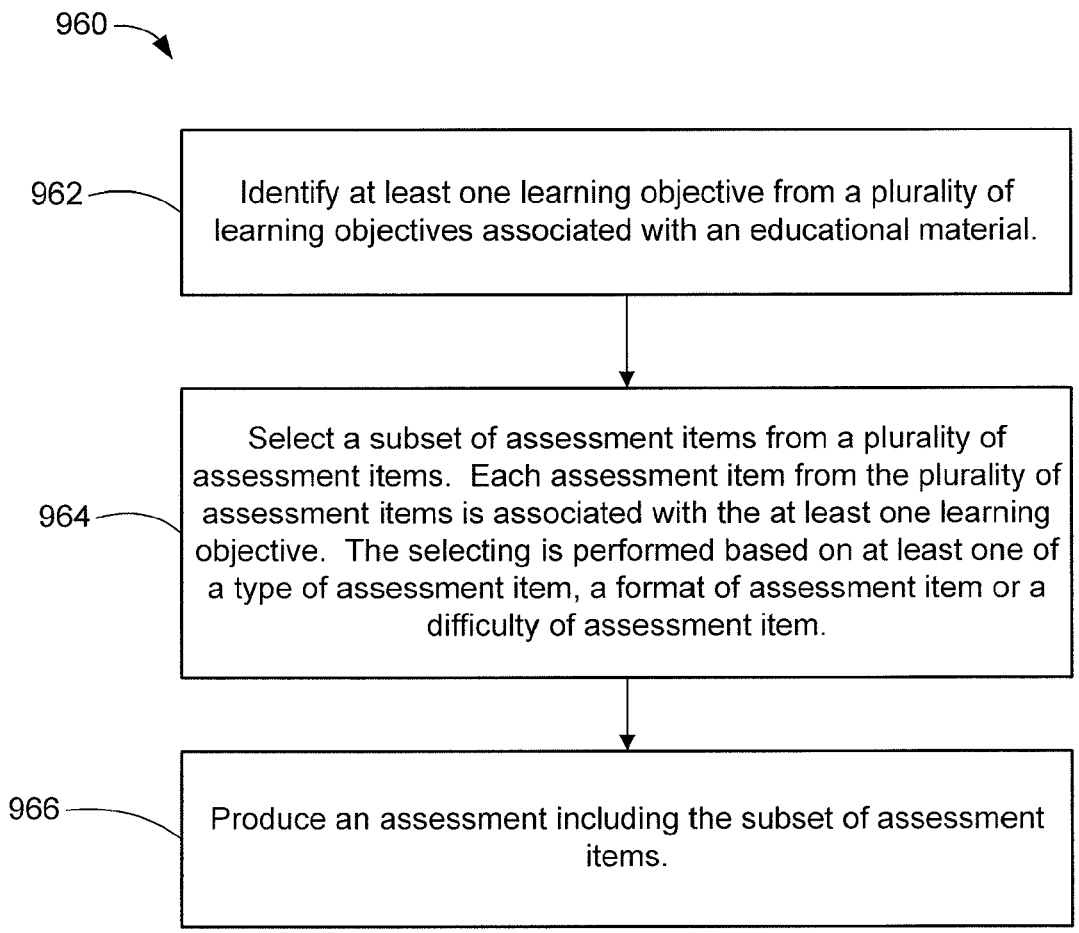
FIG. 15 is a flow chart illustrating a method of dynamically producing an assessment, according to an embodiment.

FIG. 15 is a flow chart illustrating a method 960 of dynamically delivering, producing, developing and/or revising an assessment, according to an embodiment. The method 960 includes identifying at least one learning objective from a plurality of learning objectives associated with an educational material, at 962. In some embodiments, each learning objective from the plurality of learning objectives can be a measurable learning outcome (e.g., measurable learning outcomes 510, 520, 530, 540 shown and described with reference to FIG. 5). In some embodiments, for example, the learning objectives can be stored in a learning objectives database and/or associated with a learning objective record similar to the learning objectives database 240 and/or the learning objective records 312, shown and described above.

A subset of assessment items from a plurality of assessment items is selected, at 964. Each assessment item from the plurality of assessment items is associated with the at least one learning objective. The selecting is performed based on at least one of a type of assessment item, a format of assessment item or a difficulty of assessment item. Each assessment item from the plurality of assessment items can be similar to the assessment items stored in the assessment items database 272, described above. In some embodiments, the selecting can also be performed based on whether a certain assessment item is configured to test a student's mastery of a measurable learning outcome associated with a specific standard and/or learning concept. In some embodiments, the plurality of assessment items can be the assessment items stored within an assessment items database (e.g., assessment items database 272). In other embodiments, the plurality of assessment items can be the assessment items within an assessment items pool defined by a course developer.

An assessment is produced including the subset of assessment items, at 966. The assessment can be produced dynamically such that each time an assessment associated with the at least one learning objective is requested (e.g., if the student takes an assessment multiple times, two different students take the assessment, etc.), the assessment contains different assessment items and/or assessment items in a different order. In this manner, the assessment can be automatically customized for each student and/or each time a student takes an assessment. In some embodiments, the subset of assessment items can be randomly selected from the plurality of assessment items. In such embodiments, each assessment item from the plurality of assessment items can be designed to measure mastery of substantially the same measurable learning objective.

In some embodiments, each subsequent question is produced in response to the student's answer on a previous question. For example, if a student answers a question correctly, an assessment item from the plurality assessment items can be provided to the student that is more difficult than the question the student answered correctly. Similarly, if the student answers a question incorrectly, an assessment item from the plurality of assessment items can be provided to the student that is less difficult than the question the student answered incorrectly. In this manner, a student's skill level and/or level of understanding can be accurately determined.

In some embodiments, an assessment can be generated dynamically when the CMS 140 and/or the LMS 120 receives data indicating that the student needs assistance in mastering a particular measurable learning outcome and/or has not demonstrated a mastery of a particular measurable learning outcome. For example, the scope and sequence engine 210 can query the assessment items database 272 for assessment items associated with the measurable learning outcome and assemble and deliver an assessment to the student. In other embodiments, a student can have a periodic assessment (e.g., an assessment every Friday) that is assembled with questions designed to help a student master measurable learning outcomes with which the student has previously struggled.

In some embodiments, the educational delivery system 110 can be configured to provide a notification to the student 160, the teacher 164 and/or the learning coach 162 based on a detected event and/or received data. Such detected events can be any event detected by any portion of the educational delivery system 110, including the CMS 140, the LMS 120 and/or the SIS 130. Such events and notifications can be similar to the events and notifications described in U.S. patent application Ser. No. 11/896,484 entitled "Multimedia System and Method for Teaching Basal Math and Science," filed Aug. 31, 2007, which is incorporated herein by reference in its entirety.

In some embodiments, for example, the event and/or the data can be associated with a score received on an assessment, an amount of time taken to complete an assessment, a learning activity and/or within a learning path, an overall amount of time taken on educational material associated with a specific measurable learning outcome, and/or the like. For example, if a student takes more than a predetermined amount of time on an assessment, a notification can be provided to alert the teacher and/or learning coach that the student might be struggling with one or more measurable learning outcomes associated with the assessment. Further, if the student takes less than a predetermined amount of time on an assessment, a notification can be provided to alert the teacher and/or the learning coach that the student might be cheating on the assessment.

Additionally, the event and/or the data can be associated with a number of learning paths, learning activities, and/or assessments presented by the educational delivery system 110 to a student. For example, an event can be defined as the point at which a student receives educational material from more than a threshold number of learning paths associated with one or more learning objectives. For example, after the educational delivery system 110 has presented educational content that is included within three learning paths associated with a measurable learning outcome a notification can be produced to alert a learning coach that the student may not fully understand the measurable learning outcome and/or may be falling behind schedule due to the additional learning paths presented. Such notifications based on data other than the score of an assessment can provide additional insight into the level of understanding achieved by the student. For example, in certain instances a student may achieve a score indicating a mastery of a learning objective, but still may have certain gaps in their knowledge of the learning objective and/or may be falling behind schedule. By producing a notification based on the number of learning paths, the amount of time spent reviewing a learning object or the like, the learning coach can be alerted about such potential gaps and potential schedule delays.

In some embodiments, the event and/or data can be associated with a profile of the student. The student profile can include information about an interest of the student, a learning style of a student, the student's schedule, the student's personal goals, the student's current mastery levels, the content that the student has previously completed, a status of the student's family, a status of the student's health and/or the like. In this manner, the notification can be tailored to the individual student rather than simply to a set of criteria. For example, if a student begins requiring more learning paths to master a learning objective after a change in familial status (e.g., a new sibling, a divorce of the students parents or the like), a notification can be sent to alert a guidance counselor to the possibility that the student may need counseling.

In some embodiments, the notification can be produced based on more than one event and/or datum. In this manner, notifications can be produced based on complex rule sets, which can be tailored to meet the individual student's needs. For example, in some embodiments, a notification can be produced using an algorithm that accounts for the score of an assessment, the time taken to complete the assessment and/or any other combination of events and/or data. In this manner, a "cheating" notification can be produced, for example, when a student achieves a very high score on an assessment that is taken in a very short time period. Although the notifications are described above as alerting a teacher, counselor and/or learning coach about a potential problem, the notifications can also inform the teacher, counselor and/or learning coach about a positive achievement. Such positive achievements can include, for example, a progression in reading level, a trend of improving test scores or the like.

The notifications can be produced by any portion of the educational delivery system 110, and can include any suitable information. For example, in some embodiments, the notification can include details regarding the event and/or data that triggered the notification. In some embodiments, the notification can include a level of concern associated with the event and/or data (e.g., a "mild" concern, an "extreme" concern, or the like).

Moreover, the notification can be produced in any suitable format. Notifications can include, for example, e-mail notifications, text message notifications, phone notifications or the like. The format of the notifications can also be a function of the geographical location of the student, teacher and/or learning coach. For example, a parent of a student taking a course in Africa may receive notifications in a different format from those received by a parent of a student taking the same course in the United States.

In some embodiments, the educational delivery system 110 can produce a raw (or unformatted) notification, which is later modified to conform to the preferences of the intended recipient of the notification. In such embodiments, any suitable portion of the educational delivery system 110 (e.g., the CMS 140, the LMS 120 and/or the SIS 130) can produce and/or store the raw notification. The raw notification can be, for example, any file capable of representing the data associated with the notification. In some embodiments, for example, the raw data file can be an XML file and/or the like.

The educational delivery system 110 (e.g., a notification engine resident within the educational delivery system 110) can then modify the raw notification file to apply the format and/or characteristics stored within a user profile. In this manner, the presentation, format, delivery location and/or the like of the notification can be managed by the system users. This arrangement also allows the contents of the notification to be delivered to both the student and the learning coach and/or teacher in a format that us suitable for the recipient. After the raw notification file is transformed, the notification is sent, delivered and/or posted for receipt by the intended recipient.

Figure 16:
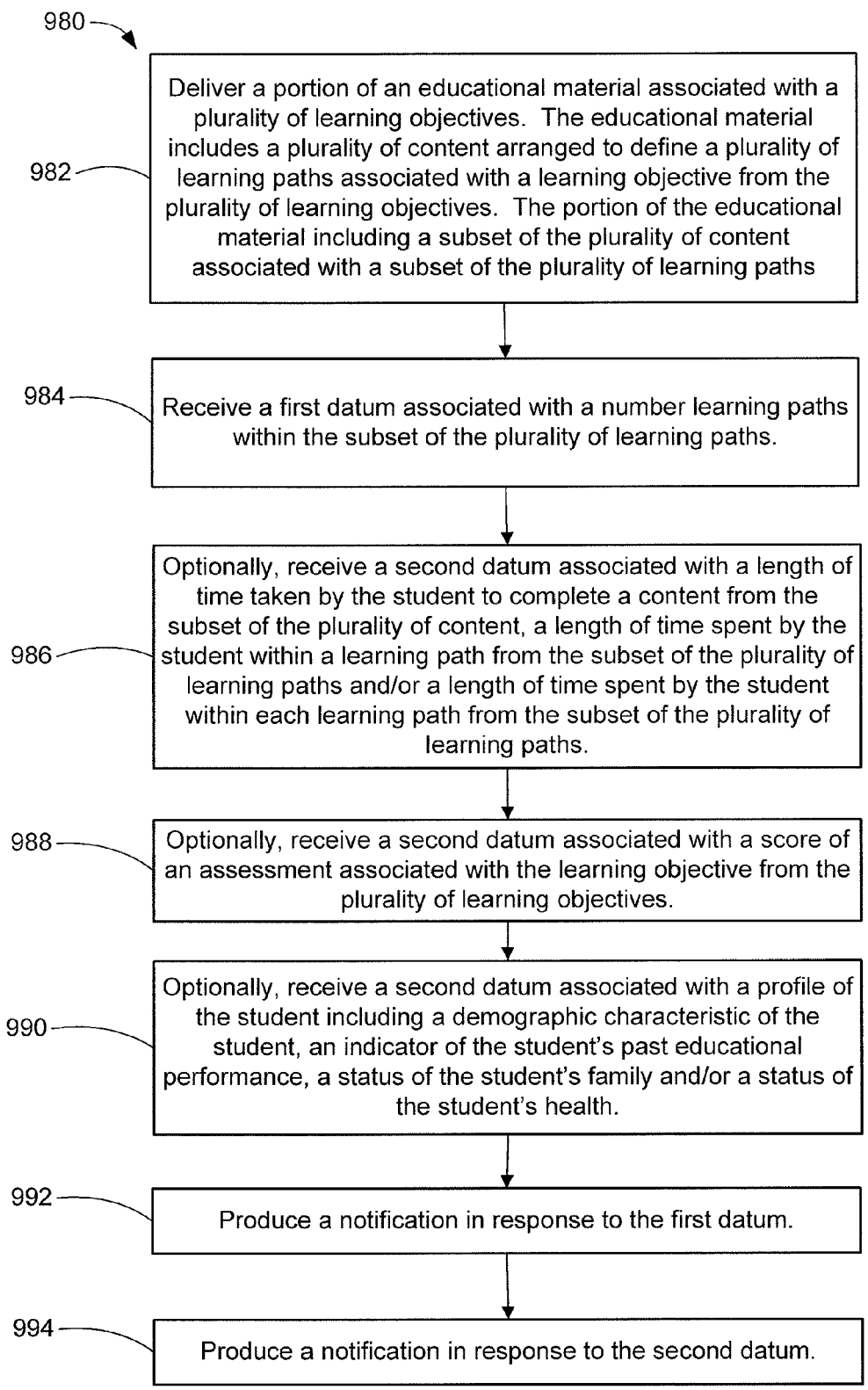
FIG. 16 is a flow chart illustrating a method of producing a notification, according to an embodiment.

FIG. 16 is a flow chart of a method 980 of producing notifications based on events and/or data according to an embodiment. The method 980 includes delivering a portion of an educational material associated with a plurality of learning objectives, at 982. The educational material includes a plurality of content arranged to define a plurality of learning paths associated with a learning objective from the plurality of learning objectives, as described above. The portion of the educational material includes a subset of the plurality of content associated with a subset of the plurality of learning paths.

A first datum associated with a number learning paths within the subset of the plurality of learning paths is received, at 984. Thus, the first datum represents the number of learning paths received by the student when the portion of the educational material is delivered to the student. In some embodiments, the method optionally includes receiving a second datum associated with a length of time taken by the student to complete a content from the subset of the plurality of content, a length of time spent by the student within a learning path from the subset of the plurality of learning paths and/or a length of time spent by the student within each learning path from the subset of the plurality of learning paths, at 986. In other embodiments, the method optionally includes receiving a second datum associated with a score of an assessment associated with the learning objective from the plurality of learning objectives, at 988. In yet other embodiments, the method optionally includes receiving a second datum associated with a profile of the student including a demographic characteristic of the student, an indicator of the student's past educational performance, a status of the student's family and/or a status of the student's health, at 990.

A notification is produced in response to the first datum, at 992. The notification can be any notification of the types described above. In some embodiments, the method optionally includes producing a notification in response to the second datum, at 994.

As discussed above, the educational material delivered to the end-user (e.g., student, teacher, learning coach) can be produced, developed, revised and/or updated based on educational research provided to the CMS 140 from the LMS 120 and/or another source. In some embodiments, for example, the CMS 140 can deliver new, revised, and/or updated educational material to end-users to gauge the effectiveness of the new, revised, and/or updated educational material and/or the learning philosophy research upon which the educational material is based. Based on the results, additional educational material can be added to the educational material to be provided to end-users, less effective educational material can be updated and/or the additional education material can be discarded as being less effective than the current educational material.

In some embodiments, for example, an experimental pilot can be performed using the educational delivery system 110 to determine the effectiveness of particular course content. As described below, the educational delivery system 110 can perform any of the functions necessary to produce, administer and/or implement a pilot test of educational material. Such functions can include, for example, selecting the students for participation in the experimental pilot based on certain characteristics, developing the experimental content to be delivered as a part of the experimental pilot program, monitoring student progress throughout the experimental pilot and/or implementing the experimental educational material in the standard curriculum. Each of these functions is described in more detail below.

The experimental pilot can include both a control group of students designated to receive the standard educational material and an experimental group of students designated to receive the experimental educational material. In such embodiments, the CMS 140 and/or the LMS 120 can determine which subset and/or group of students will participate in the experimental pilot as part of the control group and/or the experimental group. In some embodiments, the CMS 140 and/or the LMS 120 can identify a subset of students for participation in the experimental pilot based on one or more factors and/or characteristics associated with the students. In some embodiments, the CMS 140 and/or the LMS 120 can select the groups of students based on the factors and/or characteristics to ensure that the control group is substantially identical to the experimental group. Moreover, the CMS 140 and/or the LMS 120 can select the groups of students based on the factors and/or characteristics to ensure that the groups are appropriate targets for the experimental educational material. For example, the CMS 140 and/or the LMS 120 can ensure that experimental educational material directed towards teaching fractions to students with visual learning disabilities (e.g., dyslexia) is tested on a group of students exhibiting visual learning disabilities.

The factors and/or characteristics upon which the student selections are based can include general characteristics of the students such as for example, age, courses taken, school, prior educational experience, skill level, prior measurable learning outcomes mastered, pre-test or placement results, demographic characteristics, received permission (for participating in the pilot), and/or the like. In other embodiments, the factors and/or characteristics upon which the student selections are based can include, specific characteristics of the student related to one or more learning objectives that are associated with the experimental educational material. Such specific characteristics can include, for example, a score of an assessment associated with a learning objective, a time to complete an assessment associated with a learning objective, a number of attempts to complete the assessment and/or an indicator of knowledge of the learning objective based on prior educational experience. In yet other embodiments, the students are manually picked for participation in an experimental pilot by a teacher, a school administrator, and/or the like.

In some embodiments, the factors and/or characteristics exhibited by the students for the control group are substantially similar to the factors and/or characteristics exhibited by the students for the experimental group. Similarly stated, the control group can be substantially identical to the experimental group. In some embodiments, the CMS 140 and/or the LMS 120 can produce an "identity parameter" to quantify the level of identity between the control group and the experimental group. In some embodiments, for example, each factor and/or characteristic exhibited by a student can be assigned a weighting factor that quantifies the extent to which the student exhibits the factor and/or characteristic. The weighting factor can be, for example, a percentage indicating the degree to which the student exhibits the factor and/or characteristic. In such embodiments, the identity parameter can be an aggregate of weighting factors for all of the factors and/or characteristics. A student can be included within either the control or the experimental group, for example, if their identity parameter exceeds a certain threshold, such as, for example, ninety percent.

In other embodiments, the control group and the experimental group are not substantially identical. Similarly stated, in other embodiments, at least one factor is different between the control group and the experimental group. In such embodiments, for example, the control group includes students who have already mastered fourth grade fractions while the experimental group includes students who previously struggled with fourth grade fractions. As another example, in some embodiments, the CMS 140 and/or the LMS 120 can select students for the control group and/or the experimental group using a random selection algorithm.

In some embodiments, the CMS 140 and/or the LMS 120 can produce an estimate of the number of students that qualify for the experimental pilot. The estimate can be produced based on the criteria described above, and can be used to determine whether a statistically valid sample is available for the experimental pilot.

In some embodiments, prior to receiving the educational material included within the experimental pilot, a pilot pretest can be administered to students in the pilot test program. The pilot pretest can be used to assess the student's knowledge of the measurable learning outcomes covered in the educational material to be tested by the experimental pilot prior to receiving the educational material of the experimental pilot. Such a pretest can be used to establish a baseline of knowledge for both the control group and the experimental group.

In some embodiments, the CMS 140 and/or the LMS 120 can produce the experimental educational material to be delivered as a part of the experimental pilot. The educational material to be presented to the control group can be substantially similar to the experimental educational material to be presented to the experimental group except for an independent variable. Such an independent variable can be, for example, the order in which the course content is delivered to the students, a difference in a particular learning activity and/or assessment, a different way of teaching a measurable learning outcome, a different way of assessing mastery of a measurable learning outcome, adding a prerequisite prior to a specific measurable learning outcome, and/or any other difference in the course content. Similarly stated, in some embodiments, the experimental educational material and the control educational material can be associated with the same learning objectives and have the same content therein. In such embodiments, however, the experimental educational material can have one or more different learning paths (e.g., order of presentation of the content) than the control educational material. In other embodiments, the experimental educational material and the control educational material can be associated with the same learning objectives and have different content therein. In yet other embodiments, the experimental educational material and the control educational material can be associated with the different learning objectives and have different content therein.

In other embodiments, the educational material to be presented to the control group can be the same as the educational material to be presented to the experimental group and the independent variable can be a difference in the students included in the control group and the students included in the experimental group, as described above. In other embodiments, a control group is not used and the results of the experimental group are compared against data provided by an organization on, for example, a standardized test.

The educational material included within the experimental pilot can include a learning object, an assessment and/or a teaching strategy item that is associated with a physical learning activity, such as, for example, instructions for using a manipulative device. The temporal content can also include a visual depiction of a physical item. Moreover, the educational material included within the experimental pilot can include differences in the substantially aesthetic content related to various portions of the educational material. For example, in some embodiments, the content associated with the experimental educational material can include a skin (e.g., a graphical theme) associated with the substantive content, the student, the group of students or the like, that is not present in the control educational material.

The educational material to be presented to the control group is delivered to the students in the control group. As the students in the control group proceed through the delivered educational material, the LMS 120 monitors the progress of the students. Such monitoring can include monitoring the amount of time a student takes on a particular learning activity and/or assessment, monitoring the number of questions answered correctly in a learning activity and/or assessment, monitoring how many times a student changes his answer to a particular question in a learning activity and/or assessment, and/or the like. Similarly, the educational material that is part of the experimental group is delivered to the students in the experimental group and the LMS 120 monitors the progress of the students in the experimental group.

In some embodiments, after the students within the experimental pilot (e.g., the students in both the control group and the experimental group) have completed the educational material, a pilot post-test can be administered to both the students in the control group and the students in the experimental group. Based on the results of the pilot post-test, the monitoring that occurred throughout the pilot and/or the baseline established by the pretest, the LMS 120 and/or the CMS 140 can determine whether the educational material delivered to the experimental group was more effective than the educational material delivered to the control group. In other embodiments, however, the CMS 140 and/or the LMS 120 can include a utility to export the data from the experimental pilot for use by another system and/or analysis tool.

If the educational material delivered to the experimental group is deemed to be more effective than and/or preferred by the students over the educational material delivered to the control group, the associated educational material within the CMS 140 can be updated accordingly. In some embodiments, the effectiveness of the experimental educational material can be based solely on the student's knowledge of the learning objectives associated with the experimental educational material (e.g., the scores from the pilot post-test, etc.). In other embodiments, the effectiveness of the experimental educational material can be based on other predetermined criteria, such as, student preference, student profile, and/or the like. In such a manner, the educational material stored in the CMS 140 can be automatically updated based on real-time research.

In some embodiments, additional learning paths can be defined by the experimental pilot. For example, if the results of the experimental pilot determined that students who are visual learners performed better with the educational material delivered to the control group but those who learn best by reading performed better with the educational material delivered to the experimental group, the scope and sequence engine 210 can split the course into two learning paths based on the results. Accordingly, alternate learning paths can be automatically defined based on data received from the LMS 120.

The experimental and/or control educational material can be delivered as a part of delivering a course to the experimental group and/or the control group. In this manner, the pilot program allows automatic, real-time, continuous improvement to the educational material stored within the CMS 140. Additionally, small iterative improvements to the educational material can be made. In some embodiments, multiple cycles of improvement to course content can be performed in a single academic year. Additionally, because the experimental pilot is part of the normal flow of course content to an end-user, students, teachers and/or learning coaches are more prone to participate in the educational pilots.

While described above in relation to students, in other embodiments, an experimental pilot can be used to produce, develop, update and/or revise teaching strategy items delivered to teachers and/or learning coaches. In such a manner, the CMS 140 can produce, develop, update and/or revise teaching strategy items to assist teachers and/or learning coaches in teaching and/or assisting a student in learning the educational material.

Figure 17:
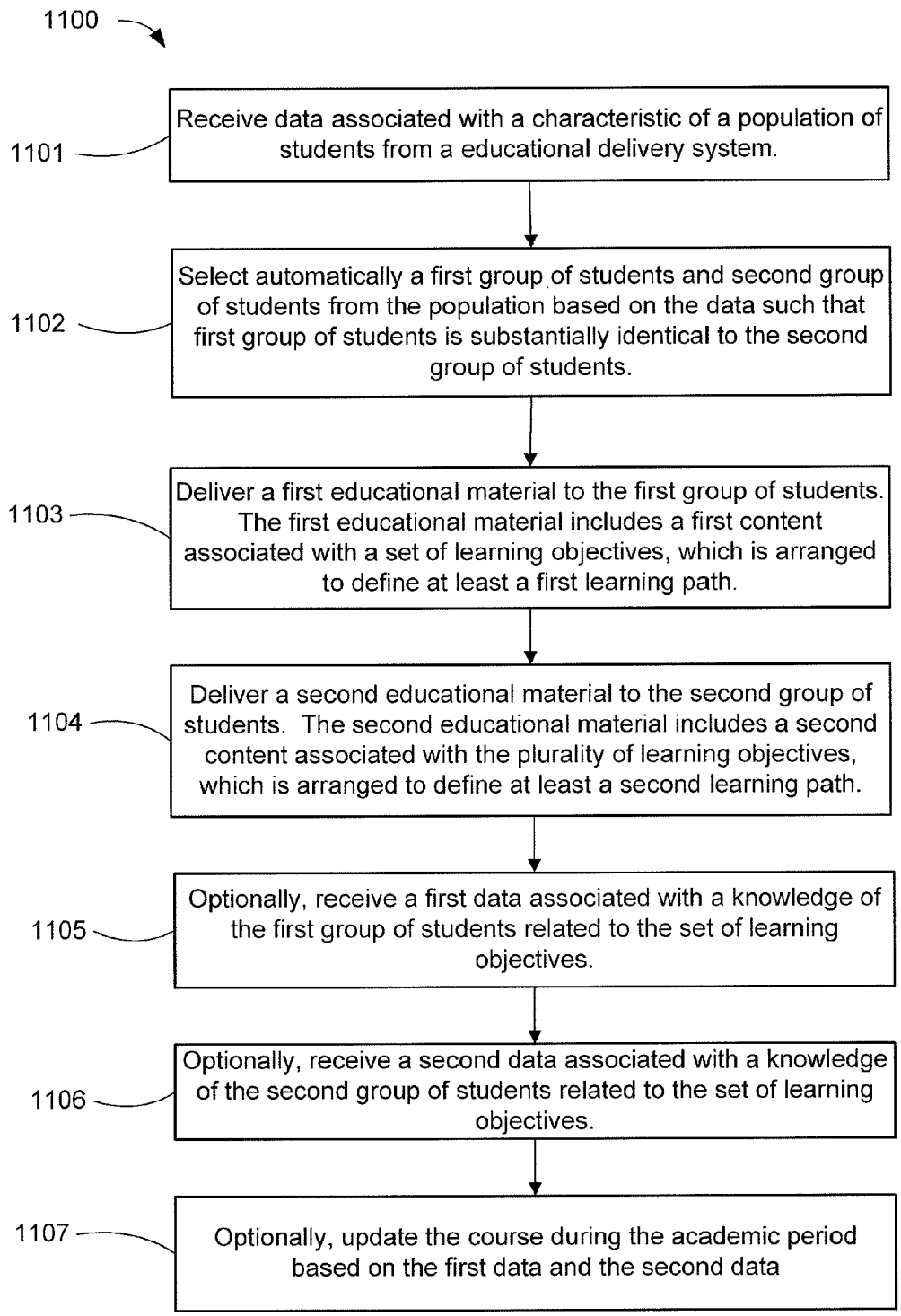
FIG. 17 is a flow chart of a method of administering a pilot test program, according to an embodiment.

FIG. 17 is a flow chart flow chart illustrating a method 1100 of administering a pilot test program according to an embodiment. The method 1100 includes receiving data associated with a characteristic of a population of students from a educational delivery system, at 1101. The characteristic can be any of the characteristics and/or factors as described above. A first group of students and second group of students are selected automatically from the population based on the data such that first group of students is substantially identical to the second group of students, at 1102. In some embodiments, the method can include producing an identity parameter, as described above.

A first educational material is delivered to the first group of students, at 1103. The first educational material includes a first content associated with a set of learning objectives, which is arranged to define at least a first learning path. A second educational material is delivered to the second group of students, at 1104. The second educational material includes a second content associated with the set of learning objectives, which is arranged to define at least a second learning path. In some embodiments, the second content can be different from the first content.

In some embodiments, the method includes delivering the first educational material as a part of delivering a course to the population of students during an academic period, as described above. In this manner, experimental pilot can be substantially transparent to the participants. In such embodiments, the method can optionally include receiving a first data associated with a knowledge of the first group of students related to the set of learning objectives, at 1105, and receiving a second data associated with a knowledge of the second group of students related to the set of learning objectives, at 1106. The knowledge of the first group of students and the second group of students can be based on, for example, pilot post-tests, external assessments or the like. In such embodiments, the course can be updated during the academic period based on the first data and the second data, at 1107.

While shown and described as being delivered to an end-user via the LMS 120, in other embodiments, the educational material 280 produced by the CMS 140 can be delivered to an end-user using any suitable method and/or delivery system. In some embodiments, for example, the educational material 280 can be delivered to an end-user on a variety of different computer-based platforms. In such embodiments, the educational material 280 can be delivered by a third party learning management system that has access to the CMS 140, by a standalone system without internet connectivity, via a compact disk (CD), a digital video disk (DVD), a Blu-ray disk and/or the like. In some embodiments, the educational material 280 is delivered in a standardized format and is platform independent. In such embodiments, the educational material 280 can be delivered to any learning management system able to access the content in the CMS 140.

The CMS 140 can publish the educational material 280 assembled by the scope and sequence engine 210 to the various media and/or platforms using any suitable method. In some embodiments, for example, the scope and sequence engine 210 can indicate whether educational material 280 is ready to be published. In other embodiments, the course developer can select from educational material to be published. In still other embodiments, any assembled educational material can be published. In some embodiments, the educational material 280 is published automatically. For example, publication can occur periodically (e.g., weekly, monthly, etc.). In other embodiments, a course developer manually starts the publication process by selecting a publication option on a user interface and/or the like. In some embodiments, all of the educational material assembled by the scope and sequence engine 210 can be published during publication. In other embodiments, only the differences between the current version and the previous version are published during publication.

Figure 18:
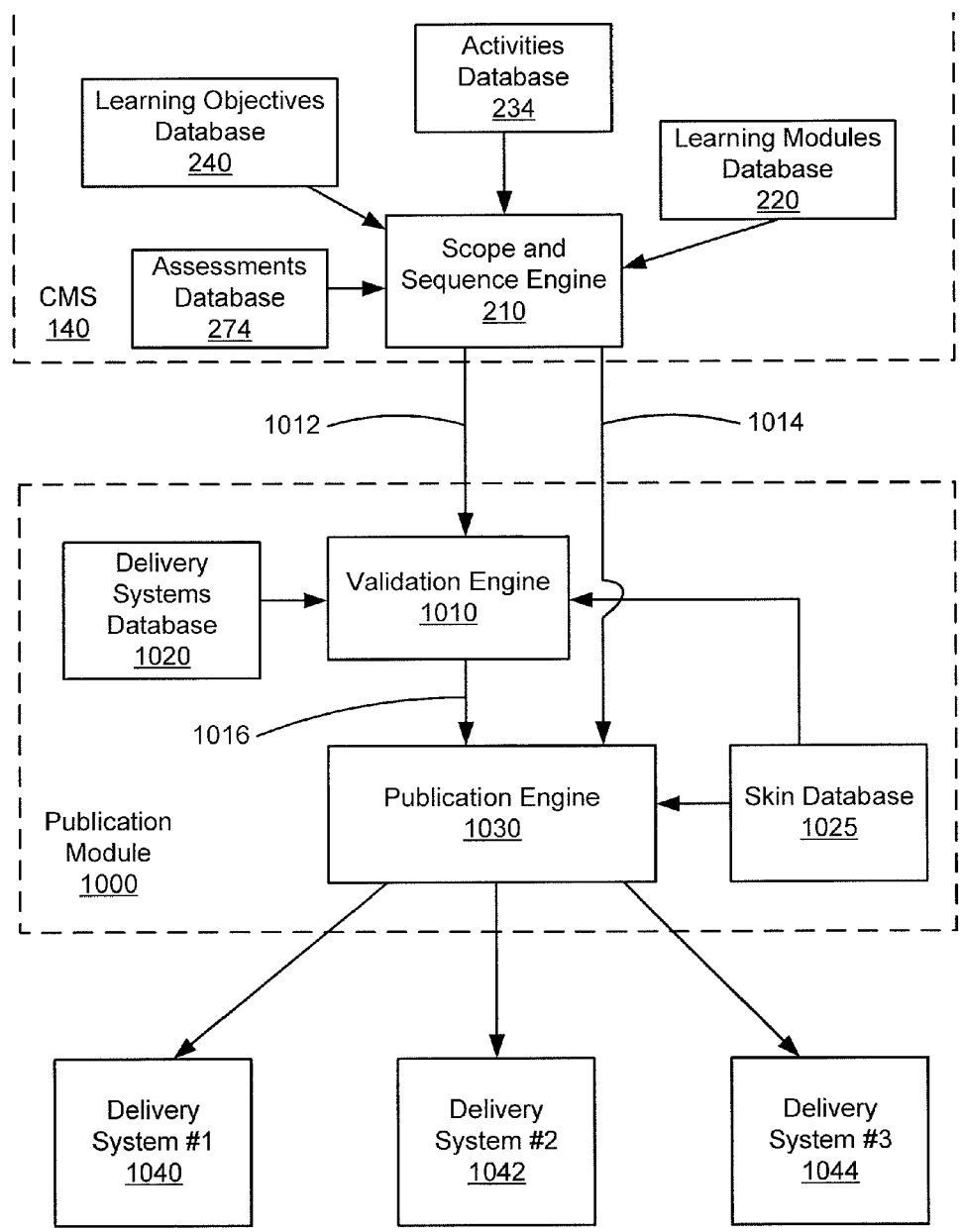
FIG. 18 is a schematic block diagram of a publication module according to an embodiment.

FIG. 18 shows a publication module 1000 used to publish the educational material stored in the CMS 140 to any one of multiple delivery systems 1040, 1042, 1044. As such, the publication module 1000 is configured to receive content associated with the educational material from the scope and sequence engine 210 arranged to define one or more learning paths and/or learning objective sequences as defined herein. The publication module 1000 is further configured to modify the content such that it is compatible with a delivery system 1040, 1042, 1044 through which the educational material will be published. The publication module 1000 includes a validation engine 1010, a delivery systems database 1020, a skin database 1025 and a publication engine 1030.

The delivery systems 1040, 1042, 1044 can be any platform configured to deliver and/or present the educational material to a student. For example, the delivery system 1040 can be a program on a client computer, a program stored on a server configured to deliver educational material via a network, a program configured to present educational material to a student using a web browser, a program configured to present educational material via a specific client, and/or the like. In some embodiments, for example, any of the delivery systems 1040, 1042, 1044 can be similar to the LMS 120 shown and described above in relation to FIG. 1. Additionally, in some embodiments, any of the delivery systems 1040, 1042, 1044 can be associated with a particular organization, school and/or company.

The delivery systems database 1020 includes information about the various delivery systems 1040, 1042, 1044 to which the publication module 1000 delivers the educational material in a format to be published. For example, the delivery systems database 1020 can include information about the functionality and/or capabilities of the various delivery systems 1040, 1042, 1044. As such, the delivery systems database 1020 can include information about the types of media and/or data supported by the delivery system, whether the delivery system supports adaptive learning paths, whether the delivery system supports dynamic assessments, and/or the like. The delivery systems database 1020 can also include information about a school, organization and/or company associated with each of the delivery systems 1040, 1042, 1044.

The skin database 1025 includes multiple skins that can be applied to the content of the educational material received from the scope and sequence engine 210 prior to delivery of the educational material to the delivery system 1040, 1042, 1044. A skin can be any item related to the aesthetic appearance of the educational material. As such, the skin controls the visual and/or audio presentation of the educational material. Similarly stated, the skin can provide a thematic look and feel of the presentation of the educational material. For example, the skin can control the color of a background and/or a border, the graphics presented to the end-user, the style and the size of the font used in presenting the educational material, identifying logos (e.g., for an organization, school and/or company associated with the platform), a splash-screen and/or introductory screen associated with the platform, a theme of the platform (e.g., button styles, etc.), any audio that plays (e.g., a welcome sound, background music, etc.), the location of certain features displayed on a graphical user interface (GUI), different design features of a GUI, a graphical theme and/or the like.

In some embodiments, a skin can be specific to a delivery system 1040, 1042, 1044. In such embodiments, for example, the skin can be associated with the product, organization, school and/or company associated with the delivery system 1040, 1042, 1044. This allows an organization, school and/or company to customize the appearance of the educational material being presented via their delivery system 1040, 1042, 1044. A skin associated with a delivery system 1040, 1042, 1044 used by a specific school can include, for example, an introductory splash-screen displaying the logo of the school and playing the school's song, a background and/or border with the school's colors and mascot, and a font and/or color scheme specific to the school. In other embodiments, the skin can be associated with, for example, a grade level of a student, the role of the end-user (e.g., student, teacher, learning coach, school administrator), the season of the year, a specific date (e.g., a holiday), an end-user's preferences, a demographic characteristic of the end-user, a geographic location of the end-user, a time period during which the educational material is to be delivered to the end-user and/or the like. For example, a kindergarten student can have a different skin than a high-school senior.

In some embodiments, a skin can include multiple files, each containing information related to certain aspects of the presentation of the educational material. For example, a first file associated with a skin can be related to a background, a second file associated with the skin can be related to an audio file and a third file associated with the skin can be related to a font size and style.

The validation engine 1010 is configured to perform a validation of a content of an educational material with respect to a delivery system 1040, 1042, 1044 through which the educational material will be published. Said another way, the validation engine 1010 is configured to perform a comparison of the content to be included in the educational material and the delivery system 1040, 1042, 1044 to which the content will be published. In this manner, the validation engine 1010 ensures that the content is compatible with the delivery system 1040. Said another way, the validation engine 1010 compares the capabilities of the delivery system 1040 with the functional characteristics of the content to ensure that the content of the educational material can be properly presented by the delivery system 1040, 1042, 1044. In some embodiments, the functional characteristics of the content can be, for example, an animation of a portion of the content, an interactivity of the portion of the content, a synchronization of an audible output associated with the portion of the content and a video output associated with the portion of the content, a superposition of a first portion of the content and a second portion of the content, a haptic output associated with a portion of the content, and/or the like. For example, if the educational material includes adaptive learning paths (e.g., adaptive learning paths 602a, 602b as shown in FIG. 6), the validation engine 1010 can determine whether the delivery system 1040 supports adaptive learning paths. For another example, if the educational material includes Flash animation, the validation engine 1010 can determine whether the delivery system 1040 supports Flash animation. For yet another example, if the educational material includes dynamic assessment requestors, the validation engine 1010 can determine whether the delivery system 1040 supports dynamic assessments.

In some embodiments, the functional characteristics of the content can further include an accessibility of a second portion of the content as an alternate to a first portion of the content. Such alternative content can be provided, for example, to ensure that the educational material is compliant with Section 508 of the Rehabilitation Act of 1973, as amended. For example, an alternative content can include a graphical presentation having closed captioned text as an alternative to a synchronized audio file. Accordingly, in some embodiments, the validation engine 1010 can determine whether the delivery system 1040, 1042, 1044 through which the educational material will be published supports presenting alternate forms of content, for example, to end-users with disabilities. Similarly stated, in such embodiments, the validation engine 1010 can be used to monitor and/or report the compliance of the delivery systems 1040, 1042, 1044 with Section 508 of the Rehabilitation Act of 1973, as amended.

In some embodiments, the validation engine 1010 can receive an indication from the scope and sequence engine 210 via the path 1012 that specifies the functionality required to properly present the content of the educational material to be published. Similarly, the validation engine 1010 can receive an indication from the delivery systems database 1020 that indicates what functionality is supported by the delivery system 1040. The validation engine 1010 can compare the indication received from the scope and sequence engine 210 and/or the indication received from the skin database 1025 to the indication received from the delivery systems database 1020 to determine the content that should be modified before being published to the delivery system 1040, as described in further detail below.

The publication engine 1030 is configured to receive the results of the validation performed by the validation engine 1010 (e.g., via path 1016), the educational material from the scope and sequence engine 210 (e.g., via path 1014) and the applicable skin from the skin database 1025 and publish the customized educational material to the delivery system 1040. Similarly stated, the publication engine 1030 is configured to receive data associated with a difference between the functional characteristics of the content and the capability of the delivery system 1040, and produce an educational material that is compatible with the delivery system 1040. Accordingly, based on the results of the validation engine 1010, the publication engine 1030 can replace, remove, suppress and/or modify portions of the content prior to publishing the educational material. In some embodiments, for example, if the delivery system 1040 does not support all of the functionality of the content, the publication engine 1030 can modify the content such that the delivery system 1040 supports the modified content. For example, if the delivery system 1040 does not support adaptive learning paths, the publication engine 1030 can remove any adaptive learning paths from the content. For another example, if the delivery system 1040 does not support Flash animation, the publication engine 1030 can replace any Flash animation with a static image associated with the subject of the Flash animation. As yet another example, if the delivery system 1040 does not support dynamic assessments, the publication engine 1030 can replace any dynamic assessment requestors in the content with statically defined assessments.

In some embodiments, the course developer provides input to the publication engine 1030 to modify the content not supported by the delivery system 1040. For example, after the validation engine 1010 compares the functionality of the delivery system 1040 with the content, the validation engine 1010 can produce a report listing all content that is unsupported and/or functionally incompatible with the delivery system. The course developer can then determine whether to replace, remove, suppress and/or modify the content not supported by the delivery system 1040. In such a manner, the course developer can manually modify the content to be compatible with the delivery system 1040.

In other embodiments, the publication engine 1030 automatically replaces, removes, suppresses and/or modifies the content not supported by the delivery system 1040. In such embodiments, the automatic replacing, removing and/or modification can be determined based on a set of rules. For example, if a Flash animation is not supported by the delivery system, the publication engine 1030 can automatically replace Flash animations within the content with appropriate images. For another example, if dynamic assessments are not supported by the delivery system, the publication engine 1030 can replace dynamic assessment requestors within the content with static assessments having assessment items from a pool of questions associated with the dynamic assessment requestor.

In still other embodiments, the publication engine 1030 automatically generates validation reports and/or presents suggestions to the course developer regarding how to bring the content into compliance with the functionality of the delivery system 1040. In such embodiments, the course developer can determine whether to accept the suggestions and/or modify the content in another manner.

In some embodiments, the publication engine 1030 also translates any rules, logic, warnings, errors and/or the like into a syntax used by the delivery system 1040. For example, if the delivery system 1040 supports adaptive learning paths but uses a different syntax for the rules used to determine which learning path a user should take, the publication engine 1030 can translate the rules produced by the CMS 140 into the syntax used by the delivery system 1040.

In some embodiments, the publication engine 1030 can also adapt the visual and/or audio presentation of content to the particular delivery system 1040 and/or a particular end-user of the delivery system. In some embodiments, for example, the publication engine 1030 can associate a specific skin from the skin database 1025 with the content. As discussed above, a skin can be anything specific to the presentation of the educational material. After the publication engine 1030 has modified the content based on the results from the validation engine 1010 and formatted the content based on the skin from the skin database 1025, the educational material can be published to the delivery system 1040, 1042, 1044.

In use, as described above the scope and sequence engine 210 can automatically select the content to be published. The scope and sequence engine 210 can select multiple courses, an entire course, a portion of course, a unit, a portion of a unit, a module, a portion of a module, a learning activity, a portion of a learning activity, an assessment and/or a portion of an assessment to be published. In some embodiments, for example, an entire course can be published at a particular point in time. In other embodiments, only the portions of the course recently updated can be published. In some embodiments, a course and/or a portion of the course can be periodically published (e.g., once a week, once a year, etc.). Similarly, the scope and sequence engine can automatically select the delivery system to which the educational material will be published and/or the skin with which the educational material will be published. In other embodiments, the content to be published can be manually selected by the course developer. In such embodiments, the course developer can choose the content, the delivery system and the skin.

After the content, the delivery system 1040 and the skin have been selected, the scope and sequence engine 210 can send functional characteristics information to the validation engine 1010 via the path 1012. As stated above, the validation engine 1010 also receives information about the delivery system 1040 from the delivery systems database 1020 and compares this information to the functional characteristics information received from the scope and sequence engine 210. After the validation engine has determined the differences in the functionality of the content and the selected delivery system, a signal associated with the differences is sent to the publication engine 1030.

The publication engine 1030 receives the content from the scope and sequence engine 210, the results of the validation engine 1010 and information pertaining to a selected skin from the skin database 1025. The publication engine 1030 generates a raw data file containing the raw data associated with the content received from the scope and sequence engine 210. The raw data file can be, for example, any file capable of representing the data associated with the content. In some embodiments, for example, the raw data file can be an XML file and/or the like. In such embodiments, the XML file can include tags delineating the various types of resources used within the content. For example, an image tag can include a link associated with the image. Similarly any media (e.g., images, videos, audio, Flash animation, etc.) within the content can be delineated with an XML tag and include within the tag a link and/or a reference associated with the media. In some embodiments, the file can be stored within a non-volatile memory for later use. In other embodiments, the file can be stored in a volatile memory (e.g., random access memory (RAM)) and discarded after use by the publication engine 1030.

The publication engine 1030 can modify the raw data file to ensure compatibility with the delivery system 1040. For example, if the delivery system 1040 does not support Flash animation, any references and/or links to a Flash animation within the raw data file can be removed, suppressed and/or replaced with links to image files. After the raw data file has been modified, the publication engine 1030 can construct the educational material using the raw data file, the media referenced in the raw data file and the skin. The educational material is then published to a delivery system 1040, 1042, 1044.

In other embodiments, the raw data file containing the data associated with the content and the tags delineating the functional characteristics of the content can be saved to a central location (e.g., a central server). The publication engine 1030 can also generate one or more reference file that identifies the location of the raw data file. In some embodiments, for example, the reference file can include a rule set associated with a difference between the plurality of functional characteristics associated with the content and the capability of a delivery system 1040, 1042, 1044. In this manner, when educational material is to be published to and/or produced for a particular delivery system 1040, 1042, 1044, the publication engine can produce and/or convey the reference file to the delivery system, rather than the files associated with the entire educational material. The delivery system can then access the raw data file via the reference file, and can modify the raw data file to ensure compatibility with the delivery system 1040, 1042, 1044.

Although the validation engine 1010 is described above as comparing the capabilities of the delivery system 1040 with the functional characteristics of the content, the validation engine 1010 can also compare the capabilities of the delivery system 1040 with the aesthetic characteristics of the skin. Accordingly, in some embodiments, the validation engine can also receive an indication from the skin database 1025 that indicates the functionality required to properly present one or more skins within the skin database 1025, as shown in FIG. 18. In such embodiments, the validation engine 1010 can determine whether any portion of the selected skin should be modified before being published to the delivery system 1040, as described above. The publication engine 1030 is configured to receive the results of the "skin" validation performed by the validation engine 1010 and publish the customized educational material to the delivery system 1040, as described above.

Figure 19:
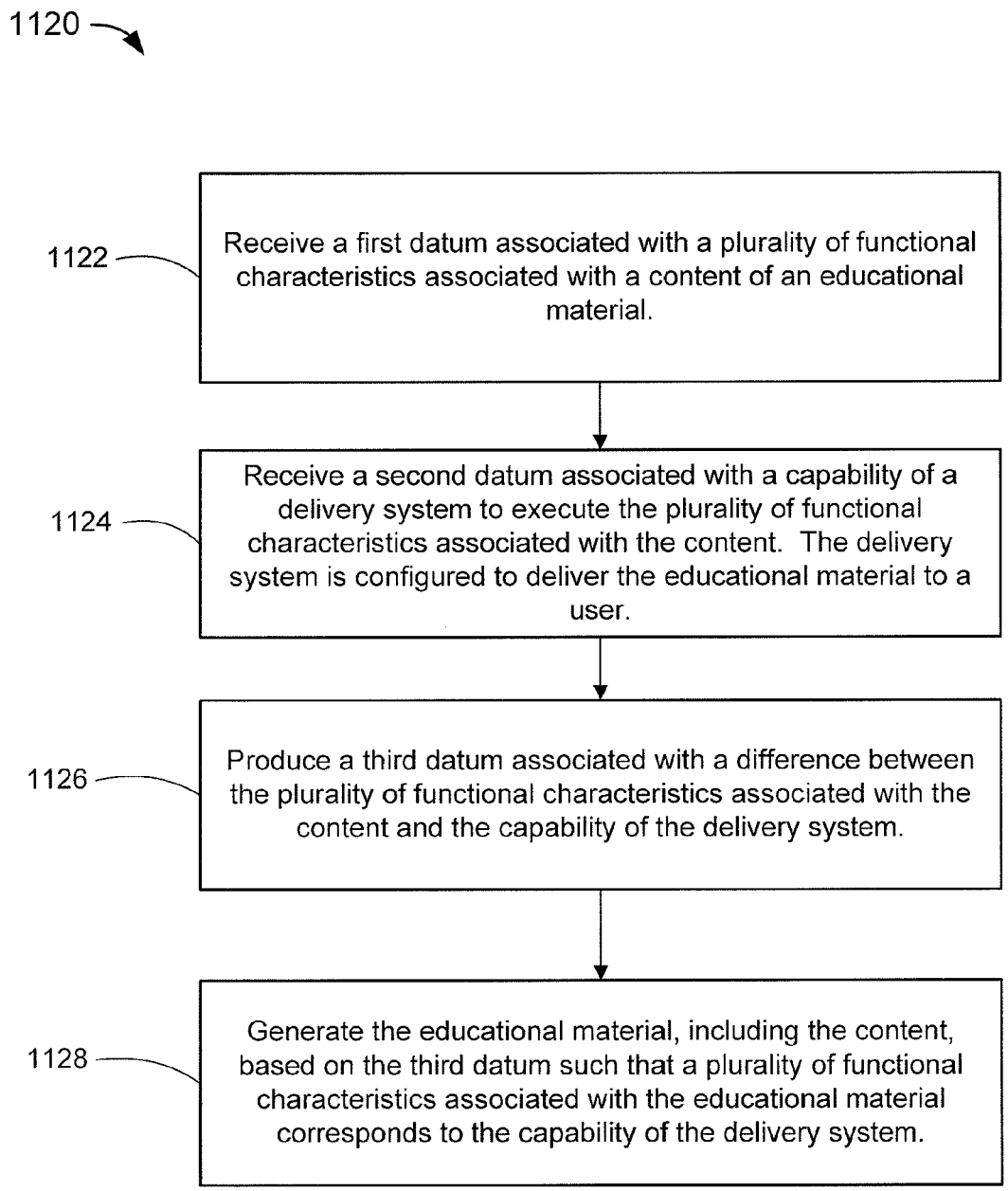
FIG. 19 is a flow chart illustrating a method of publishing educational material, according to an embodiment.

FIG. 19 is a flow chart illustrating a method 1120 of publishing educational material, according to an embodiment. The method 1120 includes receiving a first datum associated with a plurality of functional characteristics associated with a content of an educational material, at 1122. The content can include at least one of a learning object, an assessment or a teaching strategy item. The functional characteristics can be, for example, whether the content includes adaptive learning paths (e.g., adaptive learning paths 602a, 602b shown in FIG. 6), whether the content includes dynamic assessment requestors, the format and/or type of learning activities and/or assessments in the content (e.g., image format (JPEG, GIF, etc.), video format (MPEG, etc.), audio format (MP3, WAV, etc.), Flash animation), and/or the like.

A second datum associated with a capability of a delivery system to execute the plurality of functional characteristics associated with the content is received, at 1124. As described above, the delivery system is configured to deliver the educational material to a user. The capability of the delivery system can be, for example, associated with the functionality of the delivery systems, the types of media and/or data supported by the delivery system, whether the delivery system supports adaptive learning paths, whether the delivery system supports dynamic assessments, and/or the like.

A third datum and/or a rule set associated with a difference between the plurality of functional characteristics associated with the content and the capability of the delivery system is produced, at 1126. The third datum can be, for example, the differences between the first datum and the second datum. Similarly stated, the third datum can be the differences between the functionality included within the content of the educational material and the functional characteristics supported by the delivery system. The educational material, including the content, is generated based on the third datum such that a plurality of functional characteristics associated with the educational material corresponds to the capability of the delivery system, at 1128.

Figure 20:
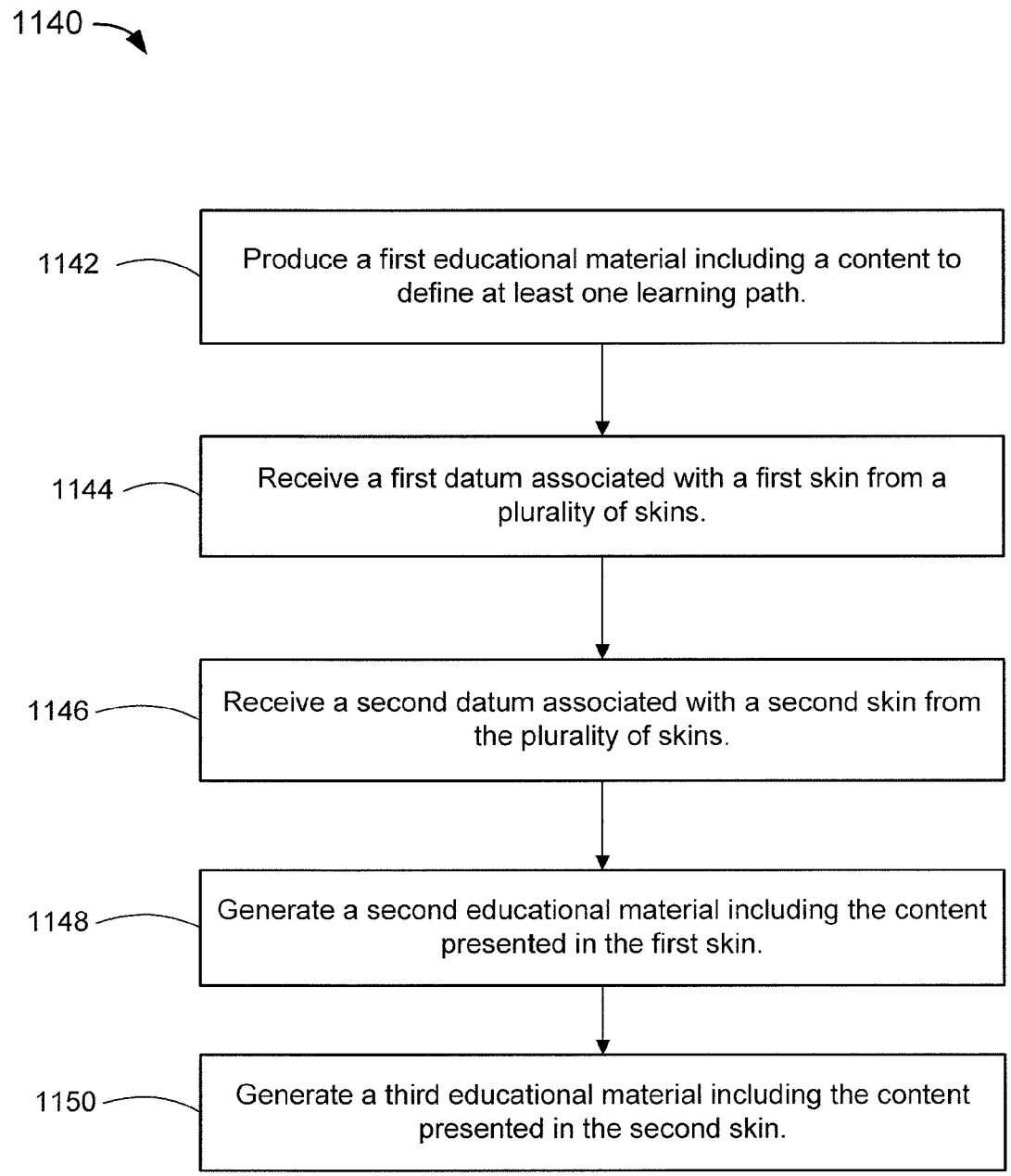
FIG. 20 is a flow chart illustrating a method of applying a skin to educational material, according to an embodiment.

FIG. 20 is a flow chart illustrating a method 1140 of applying a skin to educational material, according to an embodiment. The method 1140 includes producing a first educational material including a content to define at least one learning path, at 1142. The learning path can be similar to the learning paths 602a, 602b shown and described in FIG. 6. A first datum associated with a first skin from a plurality of skins is received, at 1144. A second datum associated with a second skin from the plurality of skins is received, at 1146. The first skin and the second skin can be any of the skins within the skin database 1025, shown and described above.

A second educational material including the content presented within the first skin is generated, at 1148. In some embodiments, a file containing a first metadata associated with the content of the educational material and a second metadata associated with the first skin is generated. Such a file can be used to provide the second educational material to a delivery system. A third educational material including the content presented within the second skin is generated, at 1150. Similarly, the third educational material is provided to a delivery system.

Although described as being published electronically, in some embodiments, the educational material can be physically published. In some embodiments, for example, the educational material can be a text book, a chemistry set, a manipulative and/or the like. In such embodiments, the educational material can be published using a similar process to the electronic educational material. For example, the scope and sequence engine 210 can indicate whether educational material 280 is ready to be published.

In some embodiments, an entire course need not be completed prior to publishing the course. Similarly stated, only a portion of the course can be defined prior to a student beginning the course. In such embodiments, for example, a learning objective sequence similar to the learning objective sequence 502 can be defined prior to a student beginning the course. Not all measurable learning outcomes within the learning objective sequence, however, are associated with course content (e.g., learning activities, assessments, teaching strategy items, etc.) at the time that the initial content is delivered to the student. For example, referring to FIG. 5, measurable learning outcome 510 and measurable learning outcome 520 can be associated with course content while measurable learning outcome 530 and measurable learning outcome 540 might not be associated with course content prior to the student beginning the course.

As the student completes the measurable learning outcomes 510, 520 associated with course content, the course developer can publish the course content associated with the other measurable learning outcomes 530, 540. For example, measurable learning outcome 530 can be associated with a current event that is not yet complete (e.g., an election). Once the current event is completed (e.g., the election is over) the course developer can develop the content associated with the current event and associate the content with the measurable learning outcome 530 prior to delivering the content to the student. In such a manner, the course content can be continually adapted and/or modified while a student is taking the course.

Figure 21:
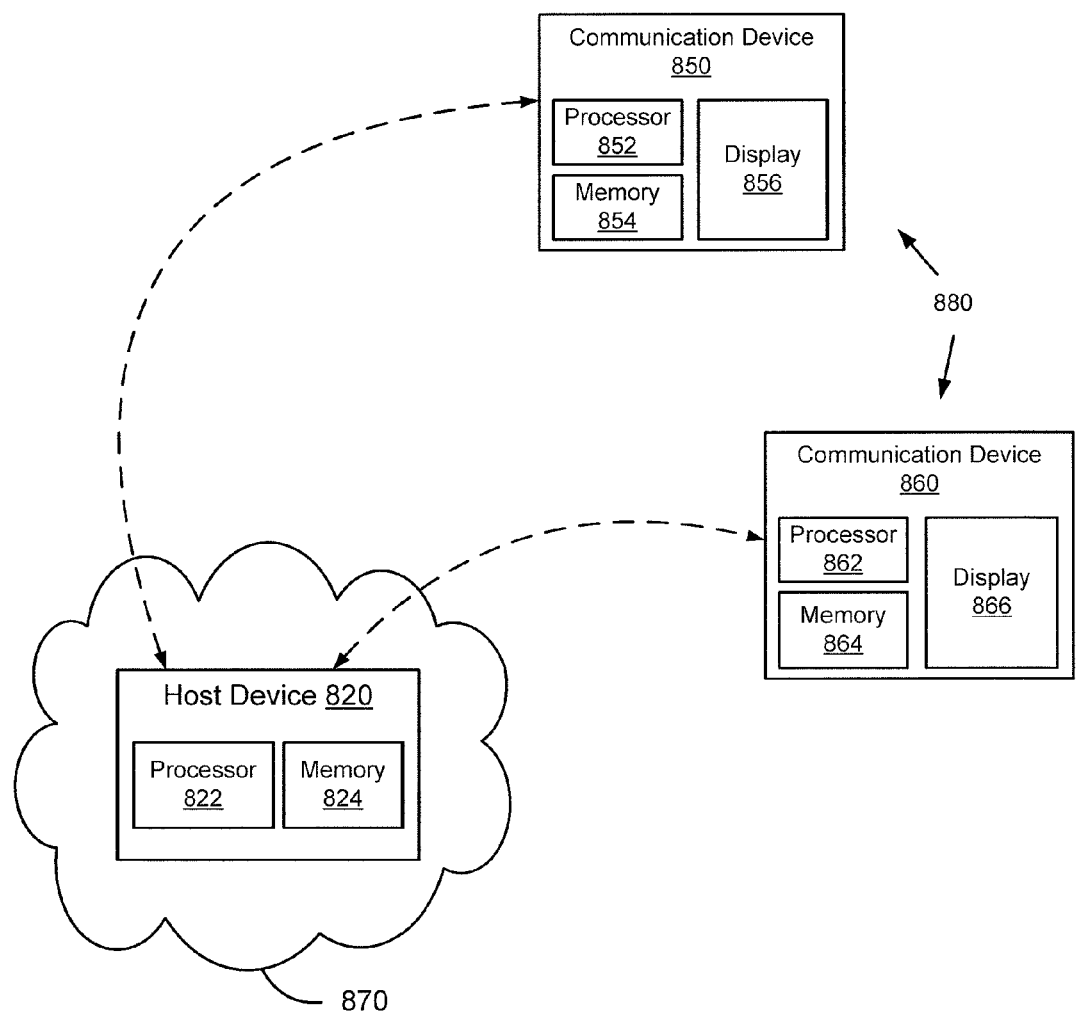
FIG. 21 is an illustration of a network used to deliver educational material, according to an embodiment.

In some embodiments, the systems and methods described herein can be implemented using communications devices in a communications network. For example, FIG. 21 is a schematic diagram that illustrates communication devices 880 in communication with a host device 820 via a network 870, according to an embodiment. The network 870 can be any type of network (e.g., a local area network (LAN), a wide area network (WAN), a virtual network, a telecommunications network) implemented as a wired network and/or wireless network.

The host device 820 can be any type of device configured to send data over the network 870 to and/or receive data from one or more of the communication devices 880. In some embodiments, the host device 820 can be configured to function as, for example, a server device (e.g., a web server device), a network management device, and/or so forth.

The host device 820 includes a memory 824 and a processor 822. The memory 824 can be, for example, a random access memory (RAM), a memory buffer, a hard drive, and/or so forth. In some embodiments, the CMS 140 databases (e.g., the learning objectives database 240, the standards database 250, the learning philosophy database 260, the resources database 232, the learning modules database 220, the activities database 234, the assessments database 274 and the assessment items database 272) can be stored in the memory 824 of the host device 820. In some embodiments, the databases and/or content associated with the LMS 120 and the SIS 130 can also be stored in the memory 824 of the host device 820. In other embodiments, a portion of one or more databases associated with the CMS, the LMS and/or the SIS can be stored in a memory associated with a communication device.

In some embodiments, the processor 822 of the host device 820 can execute the processes pertaining to the CMS 140. In such embodiments, for example, the processes associated with the scope and sequence engine 210, the learning activity generator 230, the assessment generator 270 and/or the processes associated with any other portion of the CMS 140 can be executed by the processor 822.

As shown in FIG. 21, the communication device 860 has a processor 862, a memory 864, and a display 866. The memory 864 can be, for example, a random access memory (RAM), a memory buffer, a hard drive, and/or so forth. The display 866 can be any display through which a student can receive educational material. Similar to communication device 860, the communication device 850 has a processor 852, a memory 854, and a display 856.

In some embodiments, each of the communication devices 880 can be, for example, a computing entity (e.g., a personal computing device such as a desktop computer, a laptop computer, etc.), a mobile phone, a monitoring device, a personal digital assistant (PDA), and/or so forth. Although not shown, in some embodiments, each of the communication devices 880 can have one or more network interface devices (e.g., a network interface card). In some embodiments, the communication devices 880 can be referred to as client devices.

In some embodiments, one or more portions of the host device 820 and/or one or more portions of the communication devices 880 can include a hardware-based module (e.g., a digital signal processor (DSP), a field programmable gate array (FPGA)) and/or a software-based module (e.g., a module of computer code, a set of processor-readable instructions that can be executed at a processor). In some embodiments, one or more of the functions associated with the host device 820 (e.g., the functions associated with the processor 822) can be included in one or more modules. In some embodiments, one or more of the functions associated with the communication devices 880 (e.g., functions associated with processor 852 or processor 862) can be included in one or more modules. In some embodiments, one or more of the communication devices 880 can be configured to perform one or more functions associated with the host device 820, and vice versa.

In use, the host device 820 can establish a connection with one or more of the communication devices 880. Through the connection, the host device 820 can send educational material to communication devices 880. In some embodiments, for example, the LMS 120 delivers educational material to a student 150, teacher 164 or a learning coach 162 using the communication device 850 via the connection between the host device 820 and the communication device 850. The processor 852 of the communication device 850 receives the educational material from the host device 820 and displays the educational material on the display 856 of the communication device 850. In some embodiments, for example, the educational material can be displayed using a web browser. In other embodiments, the educational material can be displayed using any program configured to display the educational material on the display 856.

Similarly, the host device 820 can receive data from the communication devices 880. For example, a student 160, a teacher 164 and/or a learning coach 162 can use a communication device 850 to send data to the LMS 120 and/or the CMS 140 at the host device 820. As discussed above, such data can include an indication that a learning activity has been completed, an indication that a learning activity has been skipped, an indication of attendance, an indication of the time spent on a learning activity, an indication of the time spent on an assessment, responses to assessment items (e.g., answers to test questions), responses to surveys, an indication that a student 160 has received educational material needed for a learning activity, and/or the like.

Some embodiments described herein relate to a computer storage product with a computer- or processor-readable medium having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as general purpose microprocessors, microcontrollers, Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

In some embodiments, various database records (e.g., learning objective records 312 from the learning objective database 240, standards records from the standards database 250, learning philosophy records 400 from the learning philosophy database 260, etc.) are associated with additional information, such as, for example, other database records in the same database, other database records in another database, identifying keywords, and/or the like. In such embodiments, the database records can be associated with the additional information in any suitable manner. For example, the database records can include one or more fields containing the additional information (e.g., a metadata field), a pointer, link and/or reference to a memory address where the additional information is stored, a pointer, link and/or reference to a record containing the additional information in another database and/or the same database, and/or the like.

For example, while teaching strategy items are shown and described above as being associated with teaching strategy records 420a-420n within the learning philosophy database 260, in other embodiments, the teaching strategy items are metadata associated with various learning concept records 405a-405n, underlying concept records 410a-410n and/or misconception records 430a-430n. In such embodiments, for example, a learning concept record 410a can include a metadata field containing a teaching strategy item. Similarly, an underlying concept record 410a and/or a misconception record 430a can include a metadata field containing a teaching strategy item associated with the underlying concept record 410a or the misconception record 430a, respectively.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

For example, while the assessment items database 272 is shown and described as being separate from the resources database 232, in other embodiments, the assessment items and the resources can be stored in a common database. Similarly, in some embodiments, the activity generator 230 and the assessment generator 270 can be a combined learning activity and assessment generator. In such embodiments, when a learning activity or an assessment is defined by the learning activity and assessment generator, the learning activity and assessment generator can indicate the type of item (e.g., resource or assessment item) to be included in the learning activity or assessment and query the common database for such an item.

In other embodiments, functions described herein can be performed by any of the systems described herein and/or any combination of the systems described herein. For example, although the CMS 140 is shown and described as including a learning objectives database 240, a standards database 250 and a learning philosophy database 260, in other embodiments, a CMS need not include a learning objectives database, a standards database and/or a learning philosophy database. For example, in some embodiments, each database shown and described herein can be a part of a separate and/or distinct system that conveys data to the CMS. For example, in some embodiments, the standards database can be included in a remote database from which the CMS retrieves data. In such embodiments, for example, each state can have a database containing standards associated with the state and the CMS can be configured to retrieve the applicable standards from the applicable database. In some embodiments, the standards database and the learning objectives database are a single database including both the standard records and the learning objective records. In other embodiments, the CMS can include a portion of the standards database. In such embodiments, for example, the CMS can store standards associated with some organizations but link to remote databases storing standards associated with other organizations. In other embodiments, any other portion of the system can be remote and/or included in another system.

In some embodiments, the scope and sequence engine 210 can automatically produce a portion of a course and a course developer can manually produce another portion of the course. In such embodiments, for example, the scope and sequence engine 210 can automatically produce a rough draft of the course and the course developer can manually revise and/or rearrange the learning activities, the assessments, the teaching strategy items, the learning modules, the units and/or the lessons included within the course.

In some embodiments, the scope and sequence engine 210 is configured to receive (e.g., from a course developer), one or more measurable learning outcomes to be presented to the end-user of the educational material 280 to ensure that the learning activities, assessments and/or teaching strategy items associated with and/or related to the supplied measurable learning outcomes are included in the educational material 280. Additionally, in some embodiments, the scope and sequence engine 210 is configured to receive the requirements to pass a course (e.g., from a course developer). For example, a course developer can require that a student get a particular score on an assessment, complete a certain number of activities, and/or the like to pass the course and demonstrate that they have mastered the measurable learning outcomes associated with the course. In other embodiments, the scope and sequence engine is configured to receive one or more standards or learning concepts to be satisfied by the course. The learning activities, assessments and/or teaching strategy items associated with the measurable learning outcomes linked to the standards and/or learning concepts can then be used to produce, develop and/or revise educational material.

In some embodiments, the scope and sequence engine 210 is configured to receive (e.g., from a course developer), rules to define adaptive learning paths. For example, the scope and sequence engine 210 can receive the logic used by the LMS 120 to determine which learning path a student should take. In such embodiments, the CMS 140 defines the rules and the LMS 120 executes the rules. In other embodiments, the CMS defines and executes the rules. In still other embodiments, execution of the rules can be performed in both the CMS and the LMS.

While shown and described above in relation to FIG. 7 as being specific to a particular course, in some embodiments, a compliance report (e.g., compliance report 750) can be generated for a particular student to determine which standards the student has satisfied. Using such student specific compliance reports, a teacher, administrator and/or a learning coach can ensure that a student has complied with the applicable standards.

In some embodiments, a learning objective sequence (e.g., learning objective sequence 502 in FIG. 5) can include two alternate measurable learning outcomes. In such embodiments, one of the two alternate measurable learning outcomes is presented to the student during completion of the course. Further, in such embodiments, one of the two measurable learning outcomes can be met to complete the course. In some embodiments, a first learning objective sub-sequence can include a first measurable learning outcome and a second learning objective sub-sequence can include a second measurable learning outcome. In some embodiments, the first sequence is the same as the second sequence except for the alternate measurable learning outcomes. In this manner, a course can include various sequences and can be tailored to a particular student's needs and/or abilities. In other embodiments, any number of alternate measurable learning outcomes can be included within the educational material presented to the end-user.

In some embodiments, a course developer can be provided templates to assist in developing a course, a unit, a learning module, an activity and/or an assessment. In some embodiments, the templates can include placeholders for activities and/or assessments and the course developer can define a learning path by adding activities and/or assessments to the placeholders. In some embodiments, the templates can also include adaptive decision points. In such embodiments, the adaptive decision points can already include any adaptive logic to be used in the learning module. This adaptive logic can be the result of research. For example, if it is determined that a student who achieves below a predetermined score on an assessment needs remedial assistance, the template can include an adaptive decision point that includes the predetermined threshold. Additionally, the template can specify to the course developer which path is the remedial path and the course developer can design the course accordingly. In such a manner, a course developer can easily create a course having statically defined adaptivity that conforms to research.

Although various embodiments have been described as having particular features and/or combinations of components, other embodiments are possible having a combination of any features and/or components from any of embodiments as discussed above. For example, while the portion of the course 500 shown and described in FIG. 6 includes an arrangement of learning activities 650, assessments 652, learning modules 610, 620, 630a, 630b, 640a, 640b, any number of various arrangements can be included within a portion of a course. In some embodiments, for example, a portion of a course can include a measurable learning outcome having a single learning activity and/or assessment. In other embodiments, each learning activity and/or assessment can be associated with a teaching strategy item.

What is claimed is:

1. A method, comprising:

arranging, at a scope and sequence engine implemented in at least one of a memory or a processing device, a plurality of learning objectives to define a learning objective sequence of an educational material, each learning objective from the plurality of learning objectives being associated with a content including at least one of a learning object, an assessment or a teaching strategy item;

inserting a temporal content associated with a temporal event into the learning objective sequence at a position within the learning objective sequence based on a time associated with a presentation of the temporal content to a user; and producing the educational material including the content associated with each learning objective from the plurality of learning objectives and the temporal content, the content and the temporal content arranged to define at least one learning path within the learning objective sequence.

2. The method of claim 1, wherein:

the content associated with at least one learning objective from the plurality of learning objectives includes a plurality of learning objects and a plurality of assessments; and the producing is performed such that the plurality of learning objects and the plurality of assessments are arranged to define a plurality of learning paths within the learning objective sequence, the temporal content included within each learning path from the plurality of learning paths.

3. The method of claim 1, wherein the temporal content includes at least one of a learning object associated with a date, a learning object associated with a historical event or an assessment associated with a time period.

4. The method of claim 1, wherein the educational material is a first educational material associated with a first user, the at least one learning path includes the temporal content at a first position, the method further comprising:
producing a second educational material associated with a second user, the second educational material including the content associated with each learning objective from the plurality of learning objectives and the temporal content, the content and the temporal content arranged to define at least one learning path within the learning objective sequence, the at least one learning path of the second educational material including the temporal content at a second position different from the first position.

5. The method of claim 1, wherein:
the arranging is performed automatically based on an association of each learning objective from the plurality of learning objectives with at least one other learning objective from the plurality of learning objectives; and
the inserting is performed automatically based on a schedule for delivery of the educational material to the user.

6. The method of claim 1, wherein:
the producing is performed over a period of time beginning before a start time corresponding to a delivery of a first portion of the educational material to the user and ending after the start time,
at least one of a portion of the content included within a second portion of the educational material or a portion of the temporal content included within the second portion of the educational material being undefined at the start time.

7. The method of claim 1, wherein at least one of the learning object, the assessment or the temporal content is associated with a physical learning activity.

8. The method of claim 1, wherein at least one of the learning object, the assessment or the temporal content includes a visual depiction of a physical item.

9. The method of claim 1, further comprising:
formatting a portion of the temporal content of the educational material to include a skin associated with the presentation of the temporal content.

10. The method of claim 1, wherein the position within the learning objective sequence is based on at least one of a demographic characteristic of the user or a geographical location of the user.

11. A computer system for developing an educational material, the computer system comprising:
a memory; and
a plurality of modules configured to develop the educational material for delivery to a user via a delivery system operatively coupled to the computer system, the plurality of modules including:
a scope and sequence engine implemented in at least one of the memory or a processing device, the scope and sequence engine configured to arrange a plurality of learning objectives to define a learning objective sequence, each learning objective from the plurality of learning objectives being associated with a content; and
a temporal events manager configured to insert a temporal content associated with a temporal event at a position within the learning objective sequence based on a time associated with a presentation of the temporal content to a user; and
a publication engine configured to produce the educational material including the content associated with each learning objective from the plurality of learning objectives and the temporal content, the content and the temporal content arranged to define at least one learning path within the learning objective sequence.

12. The computer system of claim 11, wherein:
the content associated with at least one learning objective from the plurality of learning objectives includes a plurality of learning objects and a plurality of assessments; and
the publication engine is configured to arrange the plurality of learning objects and the plurality of assessments to define a plurality of learning paths within the learning objective sequence, the temporal content being included within each learning path from the plurality of learning paths.

13. The computer system of claim 11, wherein the temporal content includes at least one of a learning object associated with a date, a learning object associated with a historical event or an assessment associated with a time period.

14. The computer system of claim 11, wherein:
the educational material is a first educational material associated with a first user:
the at least one learning path includes the temporal content at a first position; and
the publication engine is configured to produce a second educational material associated with a second user, the second educational material including the content associated with each learning objective from the plurality of learning objectives and the temporal content, the content and the temporal content arranged to define at least one learning path within the learning objective sequence, the at least one learning path of the second educational material including the temporal content at a second position different from the first position.

15. The computer system of claim 11, wherein:
the publication engine is configured to produce the educational material over a period of time beginning before a start time corresponding to a delivery of a first portion of the educational material to the user and ending after the start time,
at least one of a portion of the content included within a second portion of the educational material or a portion of the temporal content included within the second portion of the educational material being undefined at the start time.

16. The computer system of claim 11, wherein the publication engine is configured to format a portion of the temporal content of the educational material to include a skin associated with the presentation of the temporal content.

17. One or more non-transitory processor-readable media storing code representing instructions to cause one or more processors to:
arrange a plurality of learning objectives to define a learning objective sequence, each learning objective from the plurality of learning objectives being associated with a content including at least one of a learning object, an assessment or a teaching strategy item;
insert a temporal content associated with a temporal event into the learning objective sequence at a position within the learning objective sequence based on a time associated with a presentation of the temporal content to a user; and produce an educational material including the content associated with each learning objective from the plurality of learning objectives and the temporal content, the content and the temporal content arranged to define at least one learning path within the learning objective sequence.

18. The one or more non-transitory processor-readable media of claim 17, wherein:
the content associated with at least one learning objective from the plurality of learning objectives includes a plurality of learning objects and a plurality of assessments; and
the code representing instructions to cause the one or more processors to produce the educational material includes code to arrange the plurality of learning objects and the plurality of assessments to define a plurality of learning paths within the learning objective sequence, the temporal content included within each learning path from the plurality of learning paths.

19. The one or more non-transitory processor-readable media of claim 17, wherein:
the educational material is a first educational material associated with a first user, the at least one learning path includes the temporal content at a first position; and
the code representing instructions to cause the one or more processors to produce the educational material includes code to produce a second educational material associated with a second user, the second educational material including the content associated with each learning objective from the plurality of learning objectives and the temporal content, the content and the temporal content arranged to define at least one learning path within the learning objective sequence, the at least one learning path of the second educational material including the temporal content at a second position different from the first position.

20. The one or more non-transitory processor-readable media of claim 17, wherein the code representing instructions to cause the one or more processors to produce the educational material includes code to produce the educational material over a period of time beginning before a start time corresponding to a delivery of a first portion of the educational material to the user and ending after the start time,
at least one of a portion of the content included within a second portion of the educational material or a portion of the temporal content included within the second portion of the educational material being undefined at the start time.

21. The one or more non-transitory processor-readable media of claim 17, further comprising code representing instructions to cause the one or more processors to:
format a portion of the temporal content of the educational material to include a skin associated with the presentation of the temporal content.

\* \* \* \* \*